(12) United States Patent
Ueki et al.

(10) Patent No.: US 8,817,887 B2
(45) Date of Patent: Aug. 26, 2014

(54) APPARATUS AND METHOD FOR SPLICING ENCODED STREAMS

(75) Inventors: Eiji Ueki, Kanagawa (JP); Hideki Arai, Kanagawa (JP); Shinji Wakai, Tokyo (JP)

(73) Assignee: Sony Corporation, Tokyo (JP)

(*) Notice: Subject to any disclaimer, the term of this patent is extended or adjusted under 35 U.S.C. 154(b) by 1583 days.

(21) Appl. No.: 11/897,337

(22) Filed: Aug. 30, 2007

(65) Prior Publication Data

US 2008/0056383 A1    Mar. 6, 2008

(30) Foreign Application Priority Data

Sep. 5, 2006  (JP) ................. P2006-240254

(51) Int. Cl.
*H04N 7/12*   (2006.01)
*H04N 11/02*  (2006.01)
*H04N 11/04*  (2006.01)
*H04N 7/26*   (2006.01)

(52) U.S. Cl.
CPC ... *H04N 19/00193* (2013.01); *H04N 19/00472* (2013.01); *H04N 19/00163* (2013.01)
USPC .................................. 375/240.26

(58) Field of Classification Search
CPC ............ H04N 19/00193; H04N 19/00472; H04N 19/00163
USPC ................................. 375/240.26
See application file for complete search history.

(56) References Cited

U.S. PATENT DOCUMENTS

| 5,534,944 | A | * | 7/1996 | Egawa et al. ................. 348/584 |
| 5,696,557 | A |   | 12/1997 | Yamashita et al. |
| 5,835,662 | A |   | 11/1998 | Inoue et al. |
| 6,085,020 | A | * | 7/2000 | Saito et al. ..................... 386/327 |

(Continued)

FOREIGN PATENT DOCUMENTS

| JP | 10 108200 | 4/1998 |
| JP | 11 196376 | 7/1999 |

(Continued)

OTHER PUBLICATIONS

Structuring Internet Media Streams With Cueing Protocols; Jack Brassil; IEE/ACM Transactions on Networking, vol. 10, No. 4, Aug. 2002.*

(Continued)

*Primary Examiner* — Bradley Holder
*Assistant Examiner* — James Turchen
(74) *Attorney, Agent, or Firm* — Sony Corporation

(57) ABSTRACT

Disclosed herein is an information processing apparatus that performs a process of splicing encoded streams together at a splicing point, the apparatus including: control means for determining a section to be subjected to re-encoding in the encoded streams; decoding means for decoding the encoded streams to generate baseband signals; and encoding means for encoding an edited baseband signal generated by splicing the baseband signals generated by the decoding means together at the splicing point to generate an edited encoded stream. The control means provisionally determines a first section to be subjected to re-encoding in first and second encoded streams to be spliced together at a first splicing point. When a second splicing point exists in the first section or a predetermined section that follows the first section, the control means determines a second section to be subjected to re-encoding based on the second splicing point.

18 Claims, 30 Drawing Sheets

(56) References Cited

U.S. PATENT DOCUMENTS

| | | | |
|---|---|---|---|
| 6,137,834 A * | 10/2000 | Wine et al. | 375/240 |
| 6,256,451 B1 * | 7/2001 | Mitsui | 386/283 |
| 6,301,428 B1 * | 10/2001 | Linzer | 386/278 |
| 6,414,998 B1 * | 7/2002 | Yoshinari et al. | 375/240.25 |
| 6,414,999 B1 | 7/2002 | Igi et al. | |
| 6,529,550 B2 | 3/2003 | Tahara et al. | |
| 6,529,555 B1 | 3/2003 | Saunders et al. | |
| 6,567,471 B1 | 5/2003 | Yoshinari | |
| 6,983,015 B1 * | 1/2006 | Saunders et al. | 375/240.1 |
| 7,643,513 B2 * | 1/2010 | Yang et al. | 370/503 |
| 2003/0128766 A1 * | 7/2003 | Tahara et al. | 375/240.26 |
| 2003/0212810 A1 * | 11/2003 | Tsusaka et al. | 709/231 |
| 2006/0045188 A1 | 3/2006 | Fuchie | |
| 2006/0045467 A1 | 3/2006 | Fuchie | |
| 2006/0120466 A1 * | 6/2006 | Yoshinari et al. | 375/259 |

FOREIGN PATENT DOCUMENTS

| | | |
|---|---|---|
| JP | 11 289541 | 10/1999 |
| JP | 2001 54110 | 2/2001 |
| JP | 2001 54118 | 2/2001 |
| JP | 2003 52010 | 2/2003 |
| JP | 2003 52040 | 2/2003 |
| JP | 2003 54529 | 2/2003 |
| JP | 2006 54530 | 2/2006 |
| JP | 2006 67095 | 3/2006 |
| JP | 2006 67097 | 3/2006 |
| WO | WO 99 05864 | 2/1999 |
| WO | WO 2006 022221 | 3/2006 |

OTHER PUBLICATIONS

Frame Accuracy Seamless Splicing of MPEG-2 Video Streams in Compressed Domain; Guohua Cheng et al.; IEEE Transactions on Consumer Electronics, vol. 50, No. 1, Feb. 2004.*

* cited by examiner

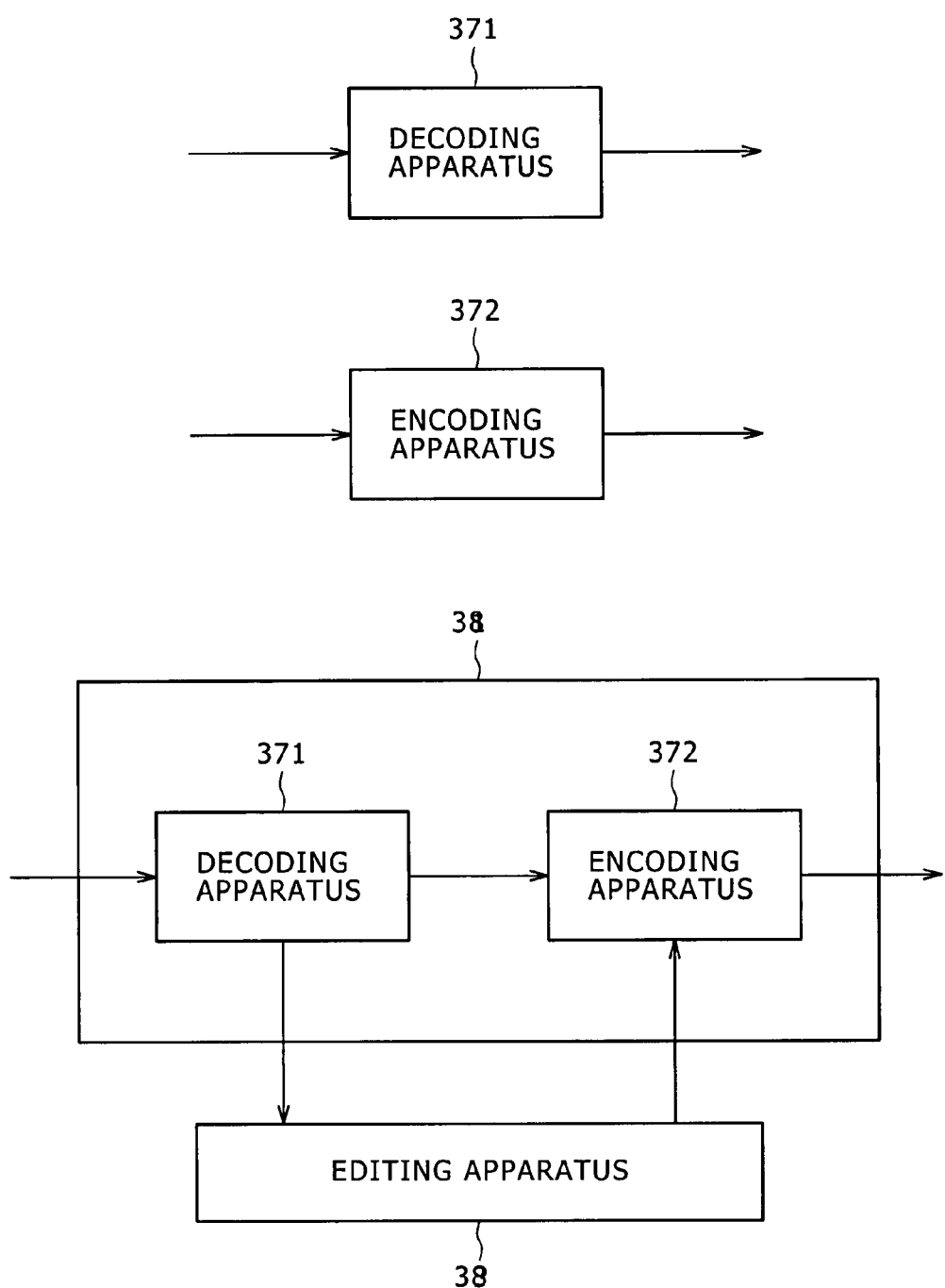

APPARATUS AND METHOD FOR SPLICING ENCODED STREAMS

CROSS REFERENCES TO RELATED APPLICATIONS

The present invention contains subject matter related to Japanese Patent Application JP 2006-240254, filed with the Japan Patent Office on Sep. 5, 2006, the entire contents of which being incorporated herein by reference.

BACKGROUND OF THE INVENTION

1. Field of the Invention

The present invention relates to an information processing apparatus and an information processing method. In particular, the present invention relates to an information processing apparatus and an information processing method, which are suitably used when editing video data compressed using inter-frame prediction.

2. Description of the Related Art

In an image compression system typified by MPEG (Moving Picture Coding Experts Group/Moving Picture Experts Group) or the like, a video signal is compression-coded using the inter-frame prediction to achieve high compression efficiency. In images that are compressed using the inter-frame prediction, however, frames are interrelated because of prediction, making it difficult to edit video. That is, it is difficult to splice video materials together when video signals thereof are in a compressed state. Therefore, in a system which is expected to edit the video materials, encoding is generally performed using only intraframe compression without using the inter-frame prediction.

However, in the case where a high-definition video signal with a large amount of information, such as an HD (High Definition) signal, is handled, for example, encoding using only the intraframe compression results in low compression efficiency, and therefore demands an expensive system having a high transfer rate, large storage capacity, or a high processing rate to transfer or accumulate a large amount of data. Therefore, in order to handle the high-definition video signal with a large amount of information using an inexpensive system, it is necessary to increase the compression efficiency by using the inter-frame prediction.

In order to edit MPEG streams, a technique is currently employed of once decoding pictures near an edition point (i.e., a splicing point), then splicing resulting uncompressed image signals together at the splicing point, and thereafter encoding the signals again (see, for example, PCT Patent Publication No. WO99/05864).

In MPEG, a compression coding system using bidirectional inter-frame prediction using I pictures, P pictures, and B pictures is called a "Long GOP (Group of Pictures) compression system".

The I picture is an intra-frame coded picture, i.e., a picture coded without reference to any other picture. Decoding of the I picture is possible without using any other information. The P picture is a forward-predicted, inter-frame coded picture, i.e., a forward-predicted coded picture expressed by a difference from a previous (in terms of time) frame (arranged in a forward direction). The B picture is a bidirectionally predicted coded picture, i.e., a picture coded by motion-compensated inter-frame prediction using a previous (in terms of time) picture (arranged in a forward direction), or a subsequent picture (arranged in a reverse direction), or both the previous and subsequent pictures (arranged in the forward and reverse directions).

Because the P picture and the B picture are lower in data amount than the I picture, it is possible to increase a compression ratio of video by increasing the length of a GOP (i.e., increasing the number of pictures that constitute a long GOP). Therefore, the P and B pictures are suitable for use in digital broadcasting, a DVD (Digital Versatile Disk) Video, or the like. However, when the GOP is too long, edit control with frame-by-frame precision becomes difficult, causing an operational problem in business-purpose edition in particular.

With reference to FIG. 1, an editing process of splicing two pieces of video data compressed in accordance with the Long GOP system together at a specified splicing point will now be described below.

First, each of to-be-edited compressed video data 1 and to-be-edited compressed video data 2 is partially decoded near a splicing point to obtain partial uncompressed video signals 1 and 2. Then, the uncompressed video signals 1 and 2 are spliced together at the splicing point, and the resulting signal is subjected to application of an effect near the splicing point as necessary, and encoded again. Then, the resulting re-encoded compressed video data is combined with the remaining parts of the original compressed video data (i.e., the other parts of the original compressed video data than the parts thereof near the splicing point which have been partially decoded), which have not been subjected to the decoding and re-encoding.

The method described above with reference to FIG. 1 has an advantage over a method of decoding the whole of the to-be-edited compressed video data, splicing the resulting video signals together at the splicing point, and encoding the resulting video signals in its entirety again to obtain edited compressed video data in that degradation of image quality resultant from re-encoding can be limited to a local region and that a time demanded for the editing process can be shortened significantly.

SUMMARY OF THE INVENTION

In the case where data edition is performed by partially decoding the data near the splicing point, splicing the resulting uncompressed video signals together, re-encoding the spliced uncompressed video signals, and combining the resulting signal with the remaining parts of the original compressed video data which have not been subjected to decoding and re-encoding as described above, it is necessary to maintain continuity in VBV buffer occupancy between the re-encoded part and the part that has not been subjected to re-encoding.

The continuity in the VBV buffer occupancy will now be described below with reference to FIG. 2.

In order to prevent collapse of a VBV buffer in the edited compressed video data, it is necessary to control occupancy of start and end locations of the re-encoded part to coincide with the occupancy of locations at which the remaining parts of the original compressed video data which have not been subjected to re-encoding are combined with the re-encoded part. Specifically, the occupancy (indicated by C in the figure) of a first I picture in the re-encoded part (indicated by E in the figure) of the edited compressed video needs to coincide with the occupancy (indicated by A in the figure) of pre-edited compressed video material 1, whereas the occupancy (indicated by D in the figure) of an I picture next to the re-encoded part (indicated by E in the figure) of the edited compressed video needs to coincide with the occupancy (indicated by B in the figure) of pre-edited compressed video material 2.

The occupancy prior to edition and the occupancy after edition need to coincide both in the case of a closed GOP and in the case of an open GOP, which is not a closed GOP. In the case where the continuity in the VBV buffer occupancy is not maintained, a buffer in a decoder collapses during decoding, which may cause a phenomenon such as picture skipping, freezing, or the like.

In a program stream (PS) and a transport stream (TS), it is possible to obtain the VBV buffer occupancy of each picture from a system clock reference (SCR) or a program clock reference (PCR), and a presentation time stamp (PTS) and a decoding time stamp (DTS). In an elementary stream (ES), however, it is not easy to obtain the VBV buffer occupancy.

In the ES, it is possible to obtain the VBV buffer occupancy of each picture from a value of a VBV delay in a picture header. However, because a parameter of the VBV delay in the picture header does not always have an accurate value, the value of the occupancy calculated from the parameter of the VBV delay may not be reliable (accurate). Moreover, in an ES encoded with variable bit rate (VBR), the VBV delay has a fixed value and therefore may not be used to obtain the VBV buffer occupancy.

As described above, it is not easy to obtain the VBV buffer occupancy in the case of the ES. Thus, if, when editing the ES, re-encoding is not accomplished properly such that the continuity in the VBV buffer is maintained, the buffer may experience overflow or underflow, causing in decoded video a phenomenon such as the picture skipping, the freezing, or the like.

In a system used for producing a broadcast program, for example, occurrence of the picture skipping or the freezing in video is not permitted. However, when editing an ES that has not time stamps inserted therein, it has been difficult in the past to maintain the continuity in the VBV buffer occupancy.

The present invention has been devised in view of the above situation, and makes it possible to maintain the continuity in the VBV buffer occupancy when editing the ES.

According to one embodiment of the present invention, there is provided an information processing apparatus that performs a process of splicing a plurality of encoded streams together at a splicing point, the apparatus including: a control unit; a decoding unit; and an encoding unit. The control unit is configured to determine a section to be subjected to re-encoding in the plurality of encoded streams. The decoding unit is configured to decode the plurality of encoded streams to generate a plurality of baseband signals. The encoding unit is configured to encode an edited baseband signal generated by splicing the plurality of baseband signals generated by the decoding unit together at the splicing point to generate an edited encoded stream. The control unit provisionally determines a first section to be subjected to re-encoding in a first encoded stream and a second encoded stream to be spliced together at a first splicing point. When a second splicing point different from the first splicing point exists in the provisionally determined first section or a predetermined section that follows the first section, the control unit determines a second section to be subjected to re-encoding based on the second splicing point.

When the second splicing point does not exist in the provisionally determined first section or the predetermined section that follows the first section, the control unit may determine the provisionally determined first section as the second section to be subjected to re-encoding.

The encoding unit may perform the encoding in accordance with an MPEG long GOP format, and the predetermined section may be a section corresponding to one GOP.

The information processing apparatus may further include: a managing unit configured to manage the quantity of bits generated in the encoding performed by the encoding unit; and a supply control unit configured to control supply of the encoded streams to the decoding unit.

The managing unit may be configured to determine whether, in the second section, continuity in occupancy has been maintained between an end point of the edited encoded stream generated by the encoding unit and a corresponding point in the encoded stream that has not been encoded by the encoding unit. When the managing unit has determined that the continuity in the occupancy has not been maintained, the control unit may determine the section to be subjected to re-encoding in the encoded streams based on either a first operation mode in which the re-encoding is further performed with a predetermined section that follows the second section set as a third section to be subjected to re-encoding, or a second operation mode in which the encoding is performed again on the second section.

When, in the first operation mode, a third splicing point different from the first or second splicing point exists in the third section or a predetermined section that follows the third section, the control unit may determine a fourth section to be subjected to re-encoding based on the third splicing point. When, in the first operation mode, the third splicing point does not exist in the third section or the predetermined section that follows the third section, the control unit may determine the third section as a fourth section to be subjected to re-encoding.

When, in the first operation mode, the third splicing point does not exist in the third section or the predetermined section that follows the third section, the managing unit may manage the quantity of bits generated in encoding performed by the encoding unit on the fourth section based on the occupancy of a corresponding point in the encoded stream that has not been encoded by the encoding unit.

In the second operation mode, the managing unit may manage the quantity of bits generated in next encoding performed by the encoding unit on the second section based on the occupancy of the end point of the previous encoding when it has been determined that the continuity in the occupancy has not been maintained.

The encoding unit may perform the encoding in accordance with an MPEG long GOP format, and the third section may be a section corresponding to one GOP.

The encoding unit may perform the encoding in accordance with an MPEG long GOP format, and when the managing unit has determined that the continuity in the occupancy has been maintained, the control unit may further add, as a fifth section to be subjected to re-encoding, a frame or frames that precede a first forward reference frame in a GOP that immediately follows the second, third, or fourth section that has been subjected to re-encoding.

The encoding unit may perform the encoding in accordance with an MPEG long GOP format, and the control unit may set a section starting with a starting location of a GOP that includes the splicing point in the first encoded stream and ending with an end location of a GOP that includes the splicing point in the second encoded stream as a standard section, and determine the first section based on the number of frames included in the standard section.

The control unit may set the standard section as the first section when the number of frames, M, included in the standard section satisfies $N/2 \leq M \leq N$, where N is the number of frames included in one standard GOP.

The control unit may set a section composed of the standard section and one additional GOP as the first section when the number of frames, M, included in the standard section satisfies $0 \leq M \leq N/2$, where N is the number of frames included in one standard GOP.

The control unit may divide the standard section into a plurality of GOPs and set the standard section as the first section when the number of frames, M, included in the standard section satisfies N+1≤M≤2N−1, where N is the number of frames included in one standard GOP.

The control unit may divide the standard section into two GOPs at the splicing point when the number of frames, M, included in the standard section satisfies N+1≤M≤2N−1, and the number of frames, A, in a part of the standard section that precedes the splicing point satisfies A≥N/2, where N is the number of frames included in one standard GOP.

The encoding unit may encode the edited baseband signal to generate the edited encoded stream such that the latter one of the two GOPs divided at the splicing point starts with an I2 picture in display order.

The control unit may set a section composed of the standard section and one additional GOP as the first section when the number of frames, R, included in the latter one of the two GOPs divided at the splicing point does not satisfy N/2≤R, and set the standard section as the first section when N/2≤R is satisfied.

According to one embodiment of the present invention, there is provided an information processing method employed in an information processing apparatus that performs a process of splicing a plurality of encoded streams together at a splicing point, the method including the steps of: provisionally determining and encoding. The provisionally determining step determines a first section to be subjected to re-encoding in a first encoded stream and a second encoded stream to be spliced together at a first splicing point, when a second splicing point different from the first splicing point exists in the provisionally determined first section or a predetermined section that follows the first section, determining a second section to be subjected to re-encoding based on the second splicing point. The decoding step decodes the plurality of encoded streams including a part of the first and second encoded streams that falls within the second section to generate a plurality of baseband signals, and encoding an edited baseband signal generated by splicing the plurality of baseband signals together at the one or more splicing points to generate an edited encoded stream.

The term "network" as used herein refers to a system in which at least two devices are connected to one another such that information can be transferred from one device to another. The devices that communicate with each other via a network may be either independent devices or internal blocks contained in a single device.

The term "communication" as used herein naturally encompasses wireless communication and wired communication as well as a mixture of wireless and wired communications, in which the wireless communication is performed in one section while the wired communication is performed in another section. Further, communication from one device to another device may be performed through wire, while communication from the latter device to the former device is performed in a wireless manner.

An editing apparatus may be either an independent apparatus or a block for performing an editing process contained in a recording/reproducing apparatus or an information processing apparatus.

As described above, according to one embodiment of the present invention, it is possible to perform the editing process, and in particular, it is possible to determine a re-encoding section based on a plurality of splicing points located close to each other to perform re-encoding.

BRIEF DESCRIPTION OF THE DRAWINGS

FIG. 32 is a diagram for explaining about structures of other apparatuses to which an embodiment of the present invention is applicable.

DETAILED DESCRIPTION OF THE PREFERRED EMBODIMENTS

Hereinafter, embodiments of the present invention will be described with reference to the accompanying drawings.

Figure 1:
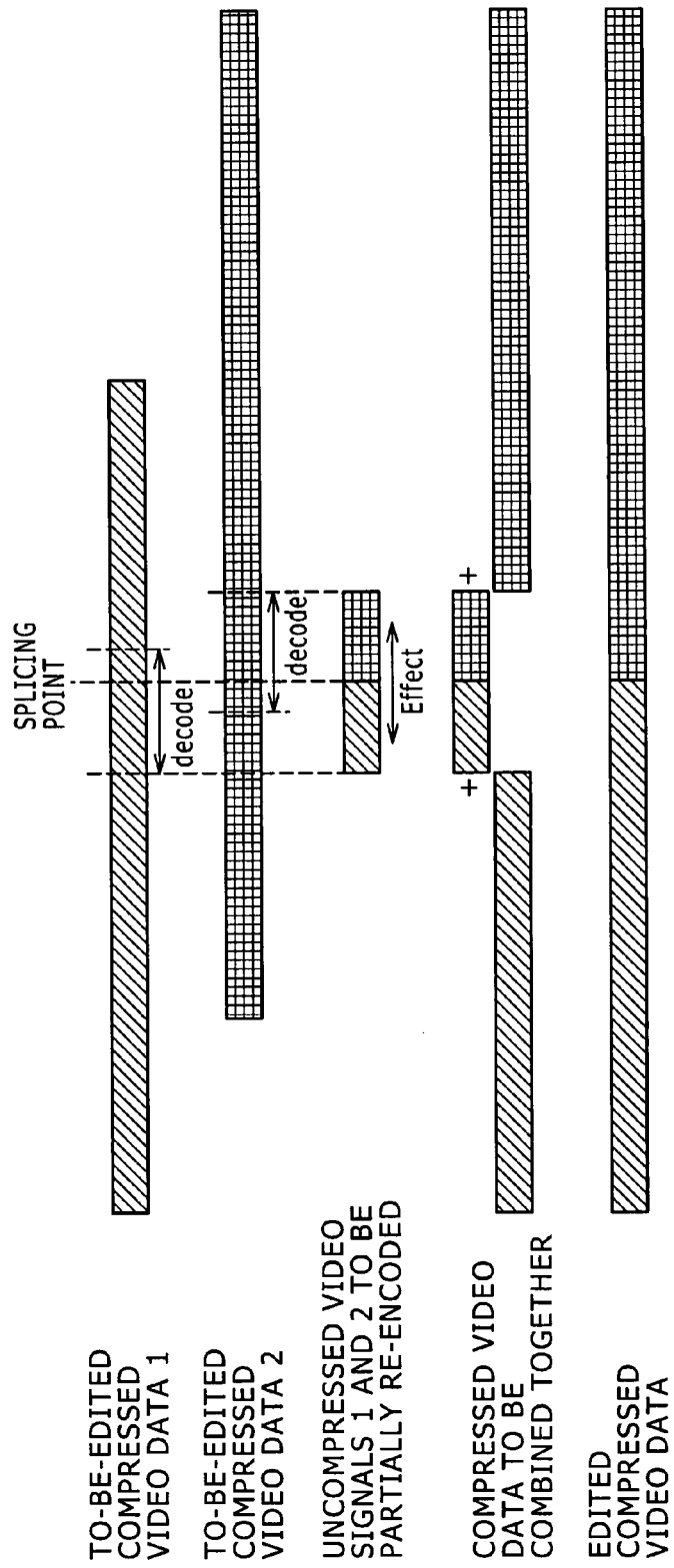
FIG. 1 is a diagram for explaining about edition and partial re-encoding.
Figure 2:
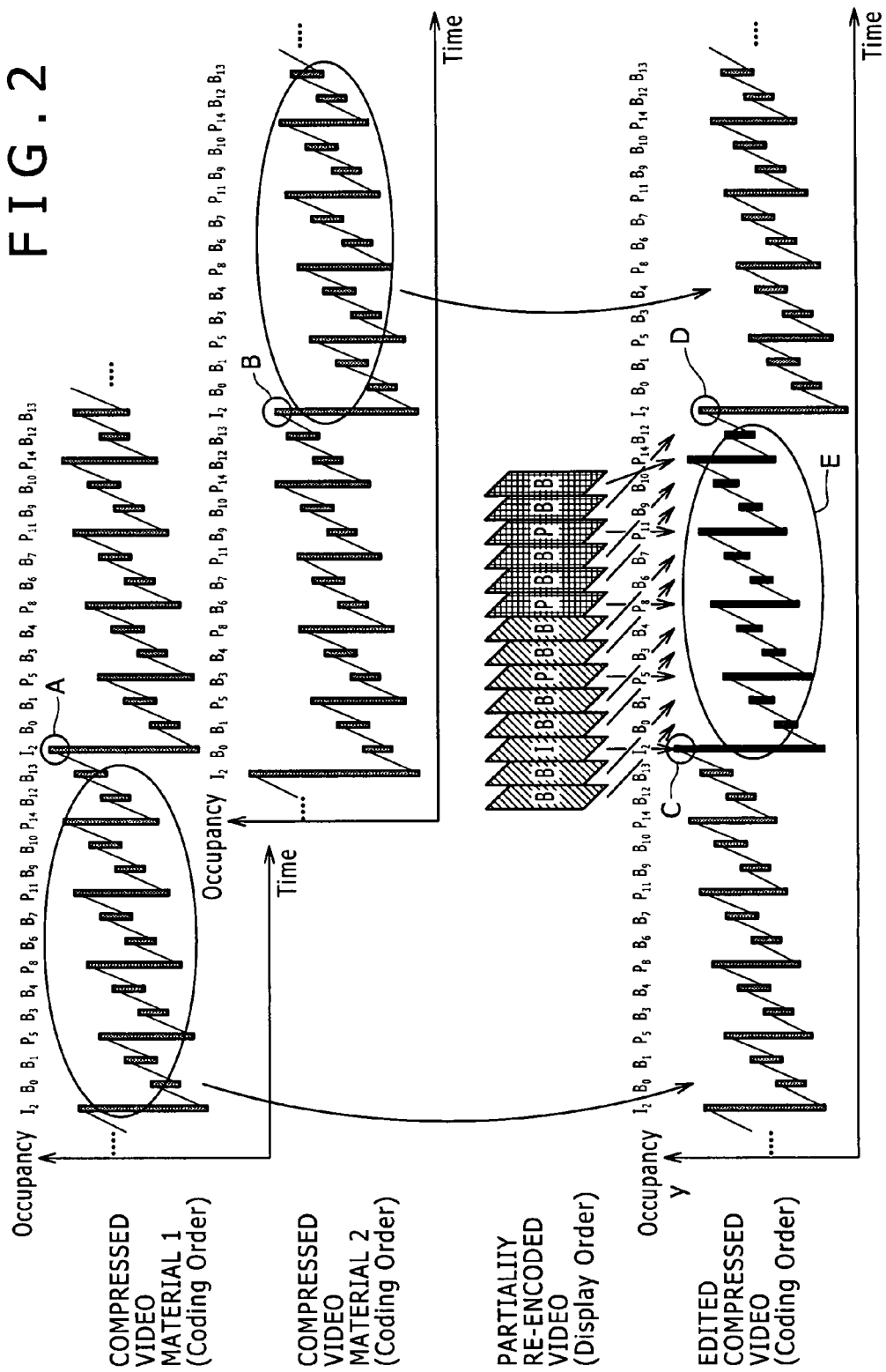
FIG. 2 is a diagram for explaining about a VBV buffer when the partial re-encoding and an editing process are performed.
Figure 3:
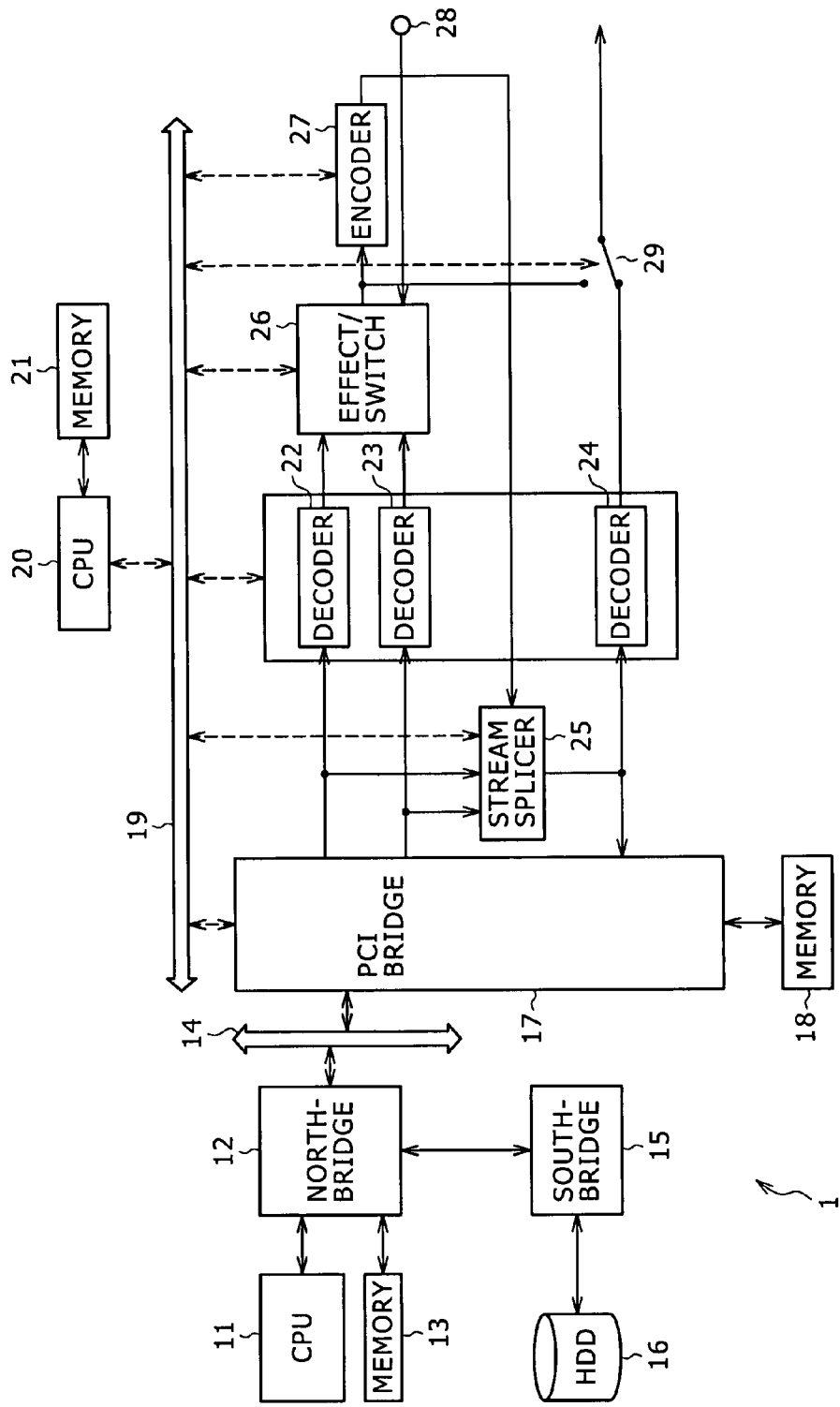
FIG. 3 is a block diagram illustrating a structure of an editing apparatus.

FIG. 3 is a block diagram illustrating a hardware structure of an editing apparatus 1 according to one embodiment of the present invention.

A central processing unit (CPU) 11 is connected to a northbridge 12. For example, the CPU 11 controls a process such as reading data stored in a hard disk drive (HDD) 16, and generates and outputs a command, a control signal, or the like for controlling an editing process executed by a CPU 20. The northbridge 12 is connected to a peripheral component interconnect/interface (PCI) bus 14. For example, under control of the CPU 11, the northbridge 12 accepts supply of the data stored in the HDD 16 via a southbridge 15, and supplies the data to a memory 18 via the PCI bus 14 and a PCI bridge 17. The northbridge 12 is also connected to a memory 13, and receives and transmits data necessary for processing by the CPU 11.

The memory 13 stores the data necessary for the processing by the CPU 11. The southbridge 15 controls writing and reading of data to or from the HDD 16. The HDD 16 stores a compression-coded material used for edition.

The PCI bridge 17 controls the writing and reading of data to and from the memory 18, and controls supply of compression-coded data to decoders 22 to 24 or a stream splicer 25. In addition, the PCI bridge 17 controls transmission and reception of data to and from the PCI bus 14 and a control bus 19. Under control of the PCI bridge 17, the memory 18 stores the compression-coded data (i.e., the material used for edition) read from the HDD 16, and edited compression-coded data supplied from the stream splicer 25.

In accordance with the control signal or the command supplied from the CPU 11 via the northbridge 12, the PCI bus 14, the PCI bridge 17, and the control bus 19, the CPU 20 controls processes executed by the PCI bridge 17, the decoders 22 to 24, the stream splicer 25, an effect/switch 26, an encoder 27, and a switch 29. A memory 21 stores data necessary for processing by the CPU 20.

Under control of the CPU 20, each of the decoders 22 to 24 decodes the supplied compression-coded data, i.e., an encoded stream, to output an uncompressed video signal (i.e., baseband image data). The decoders 22 to 24 may be provided as an independent device not contained in the editing apparatus 1. In the case where the decoder 24 is provided as an independent device, for example, the decoder 24 accepts supply of edited compressed video data generated by the editing process described below, and decodes and outputs the data.

Under control of the CPU 20, the stream splicer 25 supplies the supplied encoded stream (i.e., the compressed video data) to the decoder 24, or supplies the supplied encoded stream to the memory 18 via the PCI bridge 17 to be stored in the memory 18. In addition, the stream splicer 25 is capable of accepting supply of data obtained by an encoding process from the encoder 27, and supplying the received data to the memory 18 via the PCI bridge 17 to be stored in the memory 18.

Under control of the CPU 20, the effect/switch 26 selectively outputs an uncompressed video signal supplied from the decoder 22, the decoder 23, or an input terminal 28. In other words, the effect/switch 26 combines the supplied uncompressed video signals at a specified frame, and applies an effect to a specified range as necessary to supply the resulting signal to the encoder 27, or supplies the uncompressed video signal supplied from the input terminal 28 to the encoder 27. Under control of the CPU 20, the encoder 27 encodes the supplied uncompressed video signal, i.e., the baseband signal, to generate a compression-coded encoded stream, and supplies the generated compression-coded encoded stream to the stream splicer 25.

Under control of the CPU 20, the switch 29 outputs either a baseband image signal outputted from the effect/switch 26 or a baseband image signal supplied from the stream splicer 25 and decoded by the decoder 24 to an external device, such as a display device.

Next, an operation of the editing apparatus 1 will now be described below.

In the HDD 16, a plurality of pieces of compressed video material data which are compressed in accordance with an open GOP system using long GOPs are stored. The CPU 11 accepts a user operation input from an operation input section (not shown) to receive information concerning two streams to be edited and splicing points therein.

Based on information representing the splicing points and GOP structures of the plurality of streams, which are compression-coded, compressed video material data, the CPU 11 determines a section of the streams to be edited that is to be subjected to re-encoding.

At this time, the CPU 11 determines a minimum re-encoding section as a minimum section that is to be re-encoded. Determination of the minimum re-encoding section will now be described below with reference to FIGS. 4 to 7.

Figure 4:
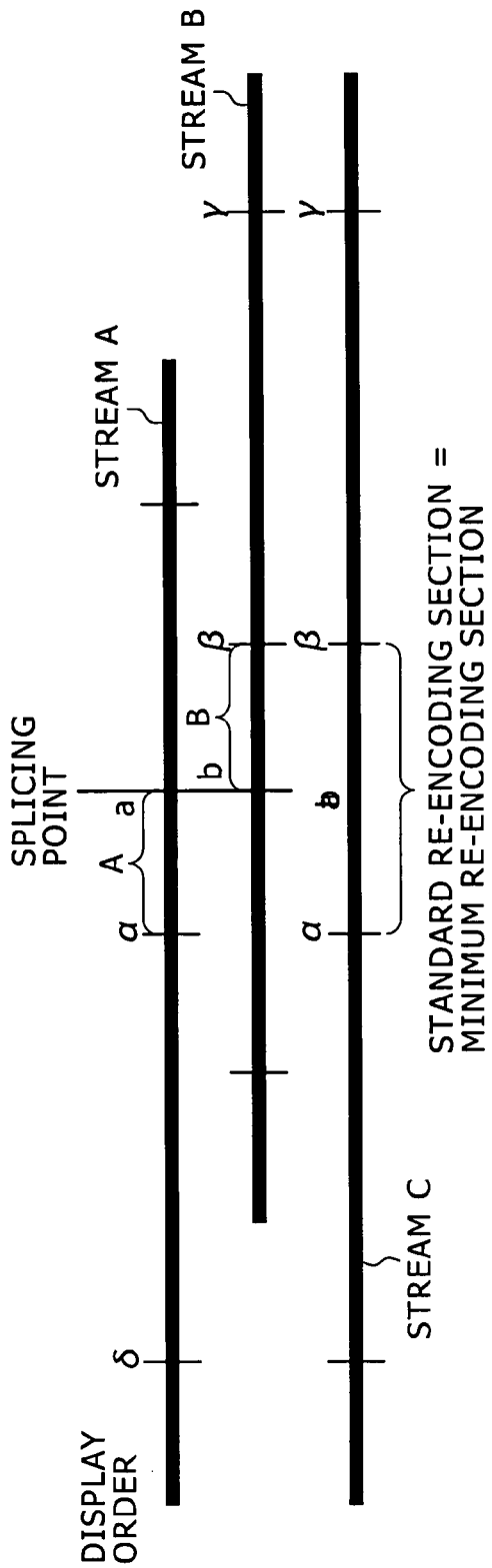
FIGS. 4 to 7 are diagrams for explaining about setting of a minimum re-encoding section.

Referring to FIG. 4, assuming that a starting location of a GOP that contains splicing point a in stream A, which is a first editing material, is denoted by $\alpha$, and an end location of a GOP that contains splicing point b in stream B, which is a second editing material, is denoted by $\beta$, a standard re-encoding section in stream C, which is generated by splicing stream A and stream B together at the splicing points, is a section beginning with $\alpha$ and ending with $\beta$ including splicing points a and b.

In the case where the number of frames, A+B, included in the section beginning with $\alpha$ and ending with $\beta$ including splicing points a and b, i.e., the standard re-encoding section, satisfies $N/2 \leq A+B \leq N$ where N is the number of frames included in one standard GOP, which is a basic unit of these streams, the standard re-encoding section is provisionally set as the minimum re-encoding section as shown in FIG. 4.

Figure 5:
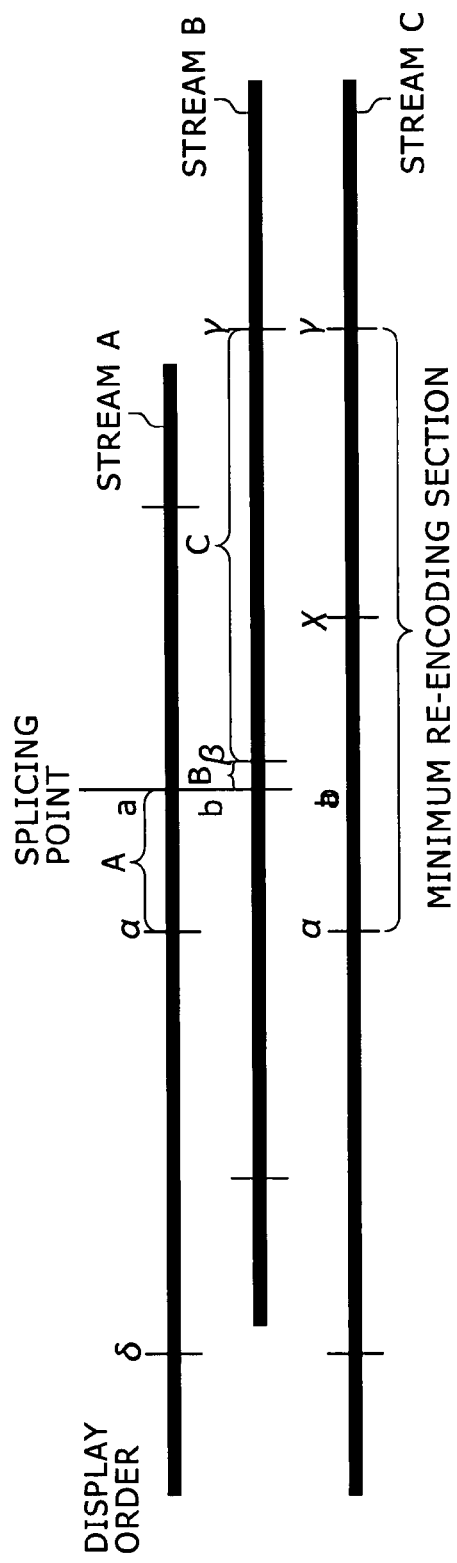

In the case where the number of frames, A+B, included in the section beginning with $\alpha$ and ending with $\beta$ including splicing points a and b, i.e., the standard re-encoding section, satisfies $0 \leq A+B \leq N/2$ where N is the number of frames included in one standard GOP, which is the basic unit of these streams, a section beginning with a and ending with $\gamma$ is provisionally set as the minimum re-encoding section as shown in FIG. 5. $\gamma$ is an end point of a GOP next to the GOP that includes splicing point b in stream B.

Then, assuming that the number of frames included in the next GOP is C, it is determined whether A+B+C (i.e., the sum of A+B, or the number of frames included in the standard re-encoding section, and the number of frames in the next GOP in stream B) satisfies $N/2 \leq A+B+C \leq N$. If $N/2 \leq A+B+C \leq N$ is satisfied, the section beginning with $\alpha$ and ending with $\gamma$ is, as one GOP, provisionally set as the minimum re-encoding section. Meanwhile, if $N/2 \leq A+B+C \leq N$ is not satisfied, i.e., if $N < A+B+C$, the section beginning with $\alpha$ and ending with $\gamma$ is divided into two or more GOPs such that each GOP satisfies $N/2 \leq x \leq N$, and the two or more GOPs are provisionally set as the minimum re-encoding section.

In the case where the minimum re-encoding section is divided into the plurality of GOPs, it is preferable that the number of frames included in each of the GOPs be as equal as possible. In the case where the minimum re-encoding section is divided into two GOPs, for example, if the total number of frames, A+B+C, is even, the minimum re-encoding section is evenly divided, whereas if the total number of frames, A+B+C, is odd, the minimum re-encoding section is divided such that the second GOP includes more frames than the first GOP by one frame, and the two GOPs are set as the minimum re-encoding section.

In the case where the number of frames in the section beginning with $\alpha$ and ending with $\gamma$ is indivisible by the number of GOPs, it is preferable that the number of frames in a later (in terms of time) GOP be greater than the number of frames in an earlier (in terms of time) GOP. Specifically, in the case where the number of frames in the section beginning with $\alpha$ and ending with $\gamma$ is 19, for example, it is preferable that the number of frames in the first GOP be 9 and that the number of frames in the second GOP be 10. This is because, in a decoding and encoding process for adjusting occupancy of a part at which the re-encoded part of the encoded stream and a part of the encoded stream that has not been re-encoded are combined, the degree of flexibility in bit allocation is increased when the number of frames in the later (in terms of time) GOP is greater than the number of frames in the earlier (in terms of time) GOP.

Moreover, instead of dividing the number of frames, A+B+C, as evenly as possible, division of the GOPs may be performed in such a manner that a GOP has a predetermined number of frames. For example, the division of the GOPs may be performed such that the number of frames that constitute the earlier (in terms of time) one of two GOPs is necessarily the predetermined number (e.g., N/2 or the smallest integer greater than N/2). Preferably, the predetermined number is determined such that each GOP will satisfy $N/2 \leq x \leq N$.

Specifically, suppose N=15, for example. In this case, if A+B+C=16, the number of frames in the first GOP and the second GOP may both be 8. If A+B+C=17, the number of frames in the first GOP and the second GOP may be 8 and 9, respectively. If A+B+C=18, the number of frames in the first GOP and the second GOP may be 8 and 10, respectively. If A+B+C=22, the number of frames in the first GOP and the second GOP may be 8 and 14, respectively. That is, the number of frames in the first GOP may be fixed at the predetermined number, while varying the number of frames in the second GOP.

Figure 6:
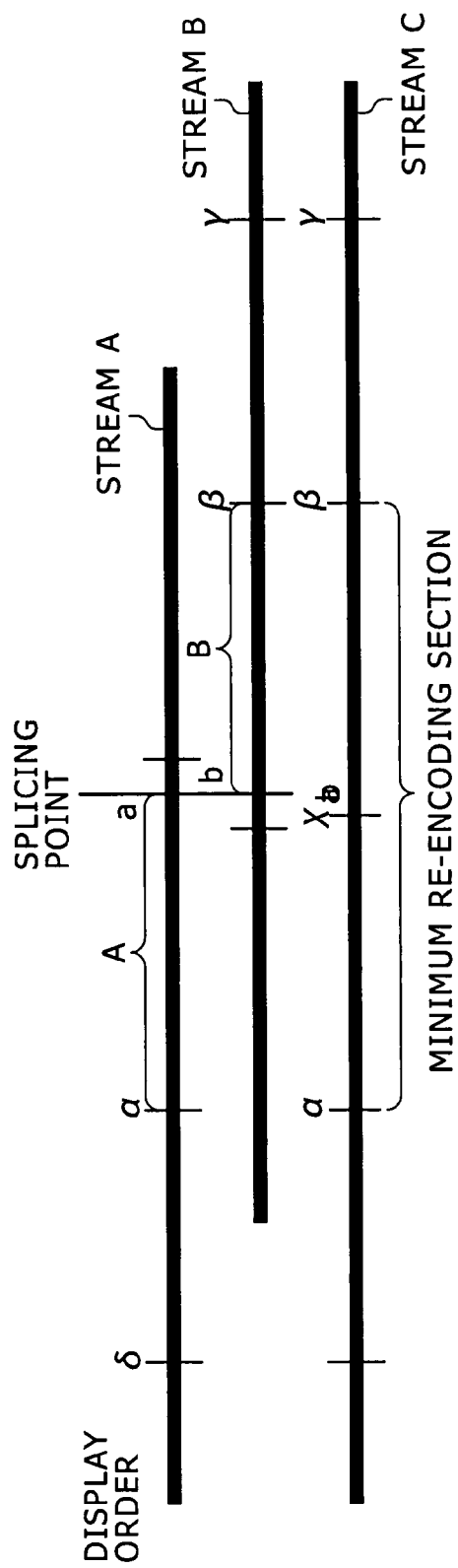

In the case where the number of frames, A+B, included in the section beginning with α and ending with β including splicing points a and b, i.e., the standard re-encoding section, satisfies $N+1 \leq A+B \leq 2N-1$ where N is the number of frames included in one standard GOP, which is the basic unit of the streams, referring to FIG. 6, the standard re-encoding section is evenly divided into two GOPs when the number of frames in the standard re-encoding section is even, whereas when the number of frames in the standard re-encoding section is odd, the standard re-encoding section is divided into two GOPs such that the second GOP includes more frames than the first GOP by one frame, and the two GOPs are provisionally set as the minimum re-encoding section.

In this case also, when the number of frames in the section beginning with α and ending with β is indivisible by two, it is preferable that the number of frames in the later (in terms of time) GOP be greater than that of the earlier (in terms of time) GOP.

Moreover, in this case also, instead of dividing the number of frames, A+B, as evenly as possible, the division of the GOPs may be performed in such a manner that a GOP has a predetermined number of frames. For example, the division of the GOPs may be performed such that the number of frames that constitute the earlier (in terms of time) one of the two GOPs is necessarily the predetermined number (e.g., N/2 or the smallest integer greater than N/2).

Further, it may be so arranged that in the case where $N+1 \leq A+B \leq 2N-1$ is satisfied, it is determined whether $A \geq N/2$ is satisfied, and when $A \geq N/2$ is satisfied, a boundary between the GOPs is set at the splicing point. In this case, the top of the later GOP that follows the splicing point may be an I2 picture, while B0 and B1 pictures are omitted.

When the GOPs are divided at the splicing point, i.e., a point where an image undergoes a considerable change, and the top of the later GOP that follows the splicing point in display order is the I2 picture while the B0 and B1 pictures are omitted as described above, the degradation of image quality of the GOP that follows the splicing point can be reduced, favorably.

Further, in the case where $N+1 \leq A+B \leq 2N-1$ and $A \geq N/2$, if the number of frames in a section, in the minimum re-encoding section provisionally set, that follows the splicing point, i.e., the number of frames, B, is small (e.g., if $B \geq N/2$ is not satisfied), the subsequent GOP in stream B may be added to the minimum re-encoding section provisionally set so that the number of frames in the section that follows the splicing point will be equal to or greater than a predetermined number (e.g., N/2). This prevents a GOP composed of an extremely small number of frames from being included in a re-encoding section. Favorably, this makes it easy to allocate an appropriate quantity of generated bits to each frame in the GOP in the section that follows the splicing point while maintaining continuity in VBV occupancy.

In the case where $N+1 \leq A+B \leq 2N-1$ is satisfied but $A \geq N/2$ is not satisfied, the number of frames, A+B, may be divided as evenly as possible into two GOPs in the same manner as described above, or alternatively, as described above, the number of frames, A+B, may be divided into two GOPs such that one GOP has a predetermined number of frames while each GOP satisfies $N/2 \leq x \leq N$.

By provisionally determining the minimum re-encoding section in the above-described manner, it is possible to prevent too short a GOP from remaining in setting the re-encoding section, which prevents unnecessary degradation of image quality.

Moreover, because encoding can be performed such that each GOP in the section that is subjected to re-encoding will not experience degradation of image quality and have as great a GOP length as possible, encoding efficiency is improved to achieve encoding that allows better image quality.

In the case where a next splicing point exists in the section that is subjected to re-encoding, a VBV target point will change in the GOP being encoded. Further, in the case where a splicing point exists in the GOP next to the minimum re-encoding section, the re-encoding section will continue.

Figure 7:
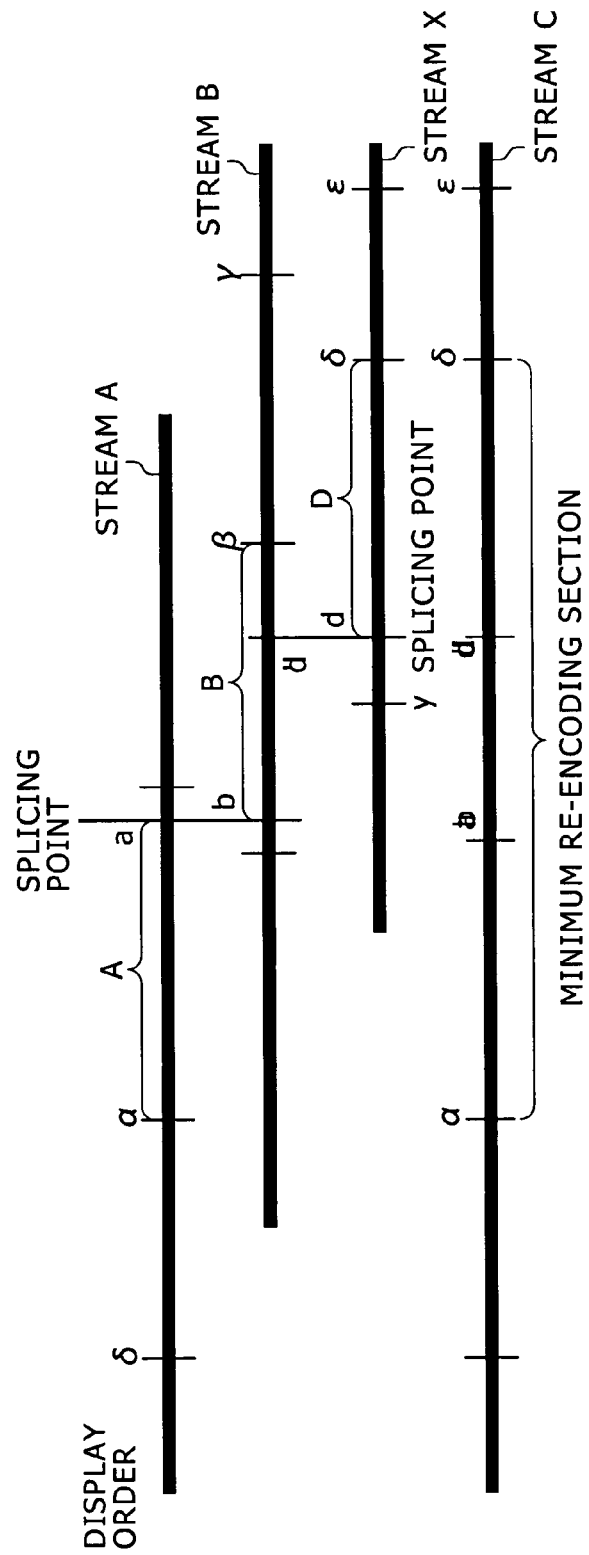

Such a situation occurs, for example: when a very short second stream is inserted into a first stream; or when, referring to FIG. 7, while stream A and stream B share splicing point ab, another splicing point d'd shared with another stream X is included stream B, before an end location β of the GOP that includes splicing point b in stream B, for example.

For example, referring to FIG. 7, in the case where the other splicing point exists in the minimum re-encoding section provisionally set in the above-described manner, the minimum re-encoding section is extended to an end location δ of a GOP that includes splicing point d in stream X, which will be spliced to stream B at splicing point d'd. That is, a part of the minimum re-encoding section that follows splicing point d'd uses data corresponding to stream X, and a VBV target value in the encoding of the minimum re-encoding section is changed to VBV occupancy in the end location δ of the GOP that includes splicing point d in stream X.

In the case where the number of frames, Z, included in the newly-set minimum re-encoding section satisfies $0 \leq Z < N/2$, it is preferable that a next GOP in stream X be added to the minimum re-encoding section. In this case, needless to say, it is determined whether another splicing point exists in the next GOP in stream X or a GOP next to that GOP, and if another splicing point exists therein, a new minimum re-encoding section is set again in a similar manner. Note that $0 \leq X \leq N/2$ is satisfied when, for example, splicing point d in stream X is close to splicing point ab in stream A and stream B and, in addition, the end location δ of the GOP that includes splicing point d in stream X is close to splicing point d'd.

As described above, in the case where a plurality of splicing points exists close to each other, those splicing points are taken into account when setting the minimum re-encoding section. Note that whether the minimum re-encoding section that is set based on the plurality of splicing points as illustrated in FIG. 7 (i.e., the minimum re-encoding section that is newly set when the other splicing point exists in the provisionally set minimum re-encoding section or the next GOP) is encoded as one GOP or as a plurality of GOPs is determined in the same manners as described above with reference to FIGS. 4 to 6. Also note that in the case where the newly-set minimum re-encoding section is encoded as a plurality of GOPs, the manner of dividing the GOPs is the same as described above with reference to FIGS. 4 to 6.

Then, the CPU 11 executes a process of splicing the plurality of streams, i.e., the materials for edition, at the splicing point(s) into a single stream while maintaining the continuity in the VBV occupancy of a VBV buffer model.

Specifically, in the case where streams necessary for re-encoding to be performed on the minimum re-encoding section, e.g., stream A and stream B, are spliced together at splicing point ab, the CPU 11 generates the control signal so that: a part of stream A included in the minimum re-encoding section and ending with splicing point a will be supplied to the decoder 22; a part of stream B included in the minimum re-encoding section and starting with splicing point b (in the case where a part of stream B that precedes splicing point b includes a frame that is necessary for decoding the part that follows splicing point b, including that frame as well) will be supplied to the decoder 23; and the effect/switch 26 will splice the two parts together at the splicing point and apply the effect thereto when necessary. The CPU 11 sends the generated control signal to the CPU 20 via the northbridge 12, the PCI bus 14, the PCI bridge 17, and the control bus 19.

In the case where an instruction for display of the re-encoding section and parts preceding and following the re-encoding section has been issued, since the CPU 11 controls supply of the parts of the plurality of streams (i.e., the materials that are used to form edited data) that correspond to the re-encoding section (in the case where any frame outside of the re-encoding section is necessary for decoding or encoding the re-encoding section, including that frame as well) to the memory 18, the CPU 20 controls data of a part, preceding the minimum re-encoding section, of the encoded stream that includes a first splicing point to be supplied to the decoder 24 via the stream splicer 25 and then to be outputted to the external display device or the like via the switch 29, and then controls the baseband image data of the edited part outputted from the effect/switch 26 to be outputted to the external display device or the like via the switch 29.

In the case where adjustment of the quantity of generated bits at the time of re-encoding the minimum re-encoding section has ended in failure (i.e., when the continuity in the VBV occupancy between the section that has been subjected to re-encoding and the section that has not been subjected to re-encoding has not been maintained at the time of splicing), the editing apparatus 1 is capable of performing the re-encoding again on the minimum re-encoding section, i.e., executing a so-called retry operation. At this time, the editing apparatus 1 is capable of perform the re-encoding again on the minimum re-encoding section based on a prior result of encoding previously performed on the minimum re-encoding section.

This makes it possible to reduce, as greatly as possible, the section that is subjected to the re-encoding while maintaining the continuity in the VBV occupancy. This reduces occurrence of regions that may experience degradation of image quality as a result of re-encoding.

Meanwhile, the retry operation (i.e., an operation of encoding again) may sometimes not satisfy a user demand when immediacy is important, such as when an edited image should be displayed in real time.

As such, when adjustment of the VBV occupancy has ended in failure at the time of splicing, the editing apparatus 1 is not only capable of performing the so-called retry operation (i.e., the operation of encoding again) but also capable of extending the re-encoding section to be subjected to the re-encoding. Thus, a complicated operation such as speed adjustment for the encoder, the decoders, and a switcher that performs a combining operation (e.g., the effect/switch 26 in FIG. 3) inside the apparatus is necessary only once, resulting in easy implementation. Such a process is suitably used when the immediacy is important such as when the edited image should be displayed in real time.

First, the re-encoding (i.e., decoding and encoding) of the minimum re-encoding section as described above with reference to FIGS. 4 to 7 is performed. The CPU 11 allows the plurality of encoded streams (i.e., the materials used for edition) to be read from the HDD 16 and supplied to the memory 18 via the southbridge 15, the northbridge 12, the PCI bus 14, and the PCI bridge 17. Then, the CPU 11 controls the data of the minimum re-encoding section in stream A and stream B to be supplied to and decoded in the decoder 22 and the decoder 23, respectively, and spliced together and, as necessary, subjected to the application of the effect in the effect/switch 26, and supplied to the encoder 27.

Figure 8:
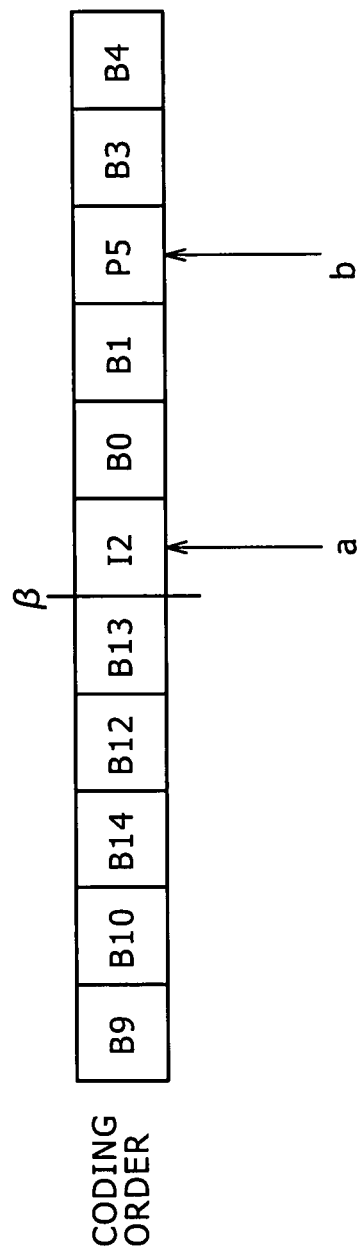
FIG. 8 is a diagram for explaining about an encoding termination process.

Here, the CPU 20 regards original VBV occupancy at the top of the minimum re-encoding section, e.g., the top of the GOP that includes splicing point a in stream A (i.e., the first editing material), as a starting value of the VBV occupancy in re-encoding. In addition, the CPU 20 regards the VBV occupancy at a corresponding part in an editing material corresponding to the end point of the minimum re-encoding section as a target value of the VBV occupancy at the end of the re-encoding. Specifically, in the case where the end of the minimum re-encoding section is point β as illustrated in FIG. 8, the VBV occupancy of an I2 picture (indicated by a in the figure) at the top of the next GOP is regarded as a first target value of the VBV occupancy at the end of the re-encoding.

Then, the CPU 20 uses an arbitrary method of adjusting the quantity of generated bits to control the re-encoding such that the encoding of the minimum re-encoding section will end with a value of the VBV occupancy greater than the first target value of the VBV occupancy.

Then, if an actual value of the VBV occupancy is greater than the target value of the VBV occupancy at the end of the encoding of the minimum re-encoding section, zero stuff can be used to make the VBV occupancy continuous, and it is possible to terminate the operation at this point to obtain a result of re-encoding.

In the case where the actual value of the VBV occupancy is successfully made greater than the first target value of the VBV occupancy, frames up to, but not including, a first (in coding order) P picture (i.e., a picture indicated by b in FIG. 8) in the next GOP are supplied to the stream splicer 25 and the decoder 23, and the frames supplied to the decoder 23 are decoded therein and thereafter supplied to the encoder 27 via the effect/switch 26 and encoded in the encoder 27.

At this time, the VBV occupancy at the first (in coding order) P picture (i.e., the picture indicated by b in FIG. 8) in the next GOP is set as a second target value, and with the quantity of bits of the I picture (i.e., the picture indicated by a in FIG. 8) regarded as the quantity of bits of the corresponding I picture in original stream B, the frames (IBB or IB) from the top of the next GOP up to, but not including, the first P picture (i.e., the picture indicated by b in FIG. 8) are subjected to a re-encoding process using the arbitrary method of adjusting the quantity of generated bits so that the VBV occupancy will be continuous at the P picture (i.e., the VBV occupancy will be greater than the second target value).

If the VBV occupancy is successfully made continuous at the target P picture using zero stuff as necessary, the CPU 20 replaces bits of the I picture with bits of the corresponding I picture in original stream B to form the result of encoding, and completes the splicing operation.

Meanwhile, in the case where the VBV occupancy has not been successfully made continuous at the target P picture, the CPU 20 completes the splicing operation with the result of encoding corresponding to the re-encoding section that ends with point β in FIG. 8, where the VBV occupancy is continuous at the boundary between the GOPs. In other words, regarding the frames that follow the re-encoding section ending with point β in FIG. 8 and precede the first (in coding order) P picture in the next GOP (e.g., a range of frames that starts with the picture indicated by a in FIG. 8 and precedes the picture indicated by b), the frames included in the original stream and supplied to the stream splicer 25 are adopted as edited compressed image data, instead of re-encoded compressed image data.

When the splicing operation has been completed, the CPU 20 supplies to the CPU 11 a control signal for stopping the supply of the stream to the decoder 22 or the decoder 23. In the case where an instruction for display of only the re-encoding section has been issued, the CPU 11 stops transfer of a part of the encoded stream that follows the last splicing point to the memory 18. Meanwhile, in the case where an instruction for display of the parts that follow and precede the re-encoding section has been issued, the CPU 11 continues to transfer the part of the encoded stream that follows the last splicing point to the memory 18. Under control of the CPU 20, after the edited part of the baseband image data outputted from the effect/switch 26 is outputted to the external display device or the like via the switch 29, the part of the encoded stream that follows the last splicing point is supplied to the decoder 24 via the stream splicer 25, and outputted to the external display device or the like via the switch 29.

On the other hand, in the case where the value of the occupancy is lower than the target value of the VBV occupancy at the end of the encoding of the minimum re-encoding section, it is impossible to make the VBV occupancy continuous using zero stuff; therefore, the CPU 20 controls relevant parts of the editing apparatus 1 so that the re-encoding process will be performed on the minimum re-encoding section again based on the prior result of the encoding previously performed on the minimum re-encoding section, i.e., the above-described retry operation will be performed, or the re-encoding will be continued with the next GOP as an additional object of encoding, using a method of adjusting the quantity of generated bits described later.

In the case where the re-encoding process on the minimum re-encoding section is retried, the CPU 20 determines bit allocation in the minimum re-encoding section based on the prior result of the first encoding process previously performed on the minimum re-encoding section. By doing this, it is possible to prevent, in the second re-encoding, the occupancy from becoming lower than the target value of the VBV occupancy at the end of the encoding of the minimum re-encoding section. An operation mode in which the above process is performed will be referred to as a "two-pass encoding mode".

Figure 9:
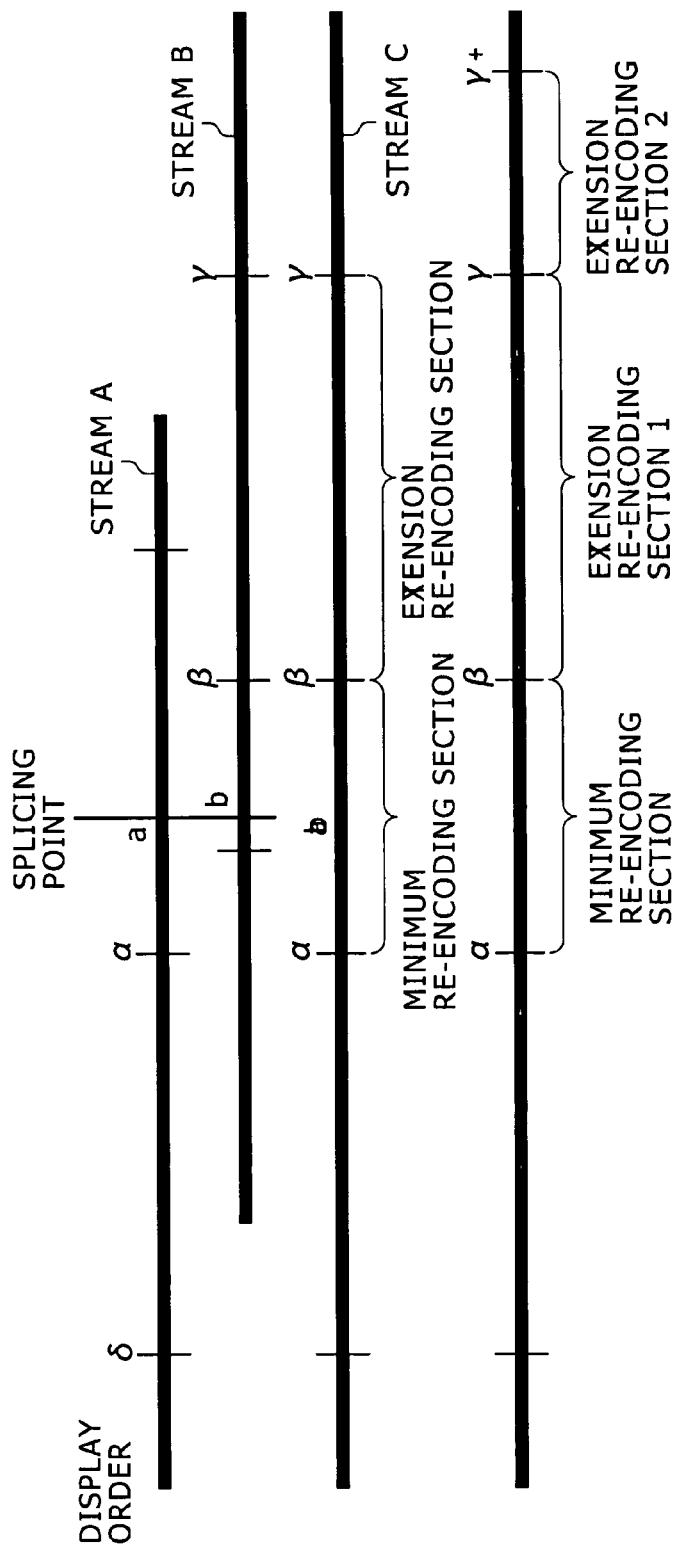
FIGS. 9 and 10 are diagrams for explaining about extension of a re-encoding section.

Meanwhile, in the case where, instead of performing the retry operation, the object of re-encoding is extended to the next GOP when the occupancy is lower than the target value of the VBV occupancy at the end of the encoding of the minimum re-encoding section, the CPU 20 sets the GOP next to the minimum re-encoding section as an extension re-encoding section as illustrated in FIG. 9, and performs re-encoding thereon while setting a target quantity of generated bits so that the encoding of the extension re-encoding section will end with a value of the VBV occupancy greater than the target value of the VBV occupancy, using the arbitrary method of adjusting the quantity of generated bits. The VBV occupancy of the top (indicated by $\gamma$ in the figure) of a GOP that follows the extension re-encoding section is set as the target value of the VBV occupancy at the end of the re-encoding of the extension re-encoding section in the case where the re-encoding section has been extended thereto.

Then, in the case where the actual value of the VBV occupancy becomes greater than the target value of the VBV occupancy as a result of progressing the re-encoding up to point $\gamma$ as shown in FIG. 9, the re-encoding is performed in the same manner as described above while setting the VBV occupancy of the first (in coding order) P picture (i.e., the picture indicated by b in FIG. 8) in the following GOP as the target value. Meanwhile, in the case where the actual value of the VBV occupancy does not become greater than the target value of the VBV occupancy as a result of progressing the re-encoding up to point $\gamma$ as shown in FIG. 9, a GOP that follows the extension re-encoding section is set as a next extension re-encoding section, and the VBV occupancy of the top (indicated by $\gamma^+$ in FIG. 9) of the following GOP is set as the target value of the VBV occupancy at the end of the re-encoding on the extension re-encoding section in the case where the re-encoding section has been extended thereto. An operation mode in which the above process is performed will be referred to as an "extension re-encoding section setting mode".

Note that in the case where, in the GOP that follows the minimum re-encoding section or the extension re-encoding section, no B picture is arranged before the first (in coding order) P picture, the splicing operation is completed with an encoding result in which the VBV occupancy is continuous at the boundary between the GOPs. Also note that, referring to FIG. 9, in the case where stream A and stream B are spliced together at the first splicing point, for example, if splicing point a in stream A is the top (in display order) of a GOP, the top of the minimum re-encoding section may be set at splicing point b in stream B.

In short, in the case where the VBV occupancy has not been successfully made continuous at the end of the minimum re-encoding section (i.e., the boundary between the end of the minimum re-encoding section and the top of the following GOP) in the editing apparatus 1, either the re-encoding is performed again on the minimum re-encoding section based on the prior result of the first re-encoding, or the encoding section is extended to the end of the next GOP to set the next GOP as the extension re-encoding section, and the extension re-encoding section is extended until the VBV occupancy achieves continuity. Then, in the case where the VBV occupancy is successfully made continuous at the end of the re-encoding section, original bits are used for the I picture in the GOP next to the re-encoding section, while the frames up to, but not including, the first P picture in the GOP next to the re-encoding section are re-encoded. Then, in the case where the VBV occupancy is successfully made continuous at the P picture, the re-encoding is terminated immediately before this P picture. Meanwhile, in the case where the VBV occupancy is not successfully made continuous at the P picture, the re-encoding is terminated at the end of the re-encoding section.

Moreover, in the case where the next splicing point exists before the end of the extension re-encoding section, the VBV target point will change in the GOP being encoded. Further, in the case where a splicing point exists in the GOP next to the extension re-encoding section, the re-encoding section will continue.

Figure 10:
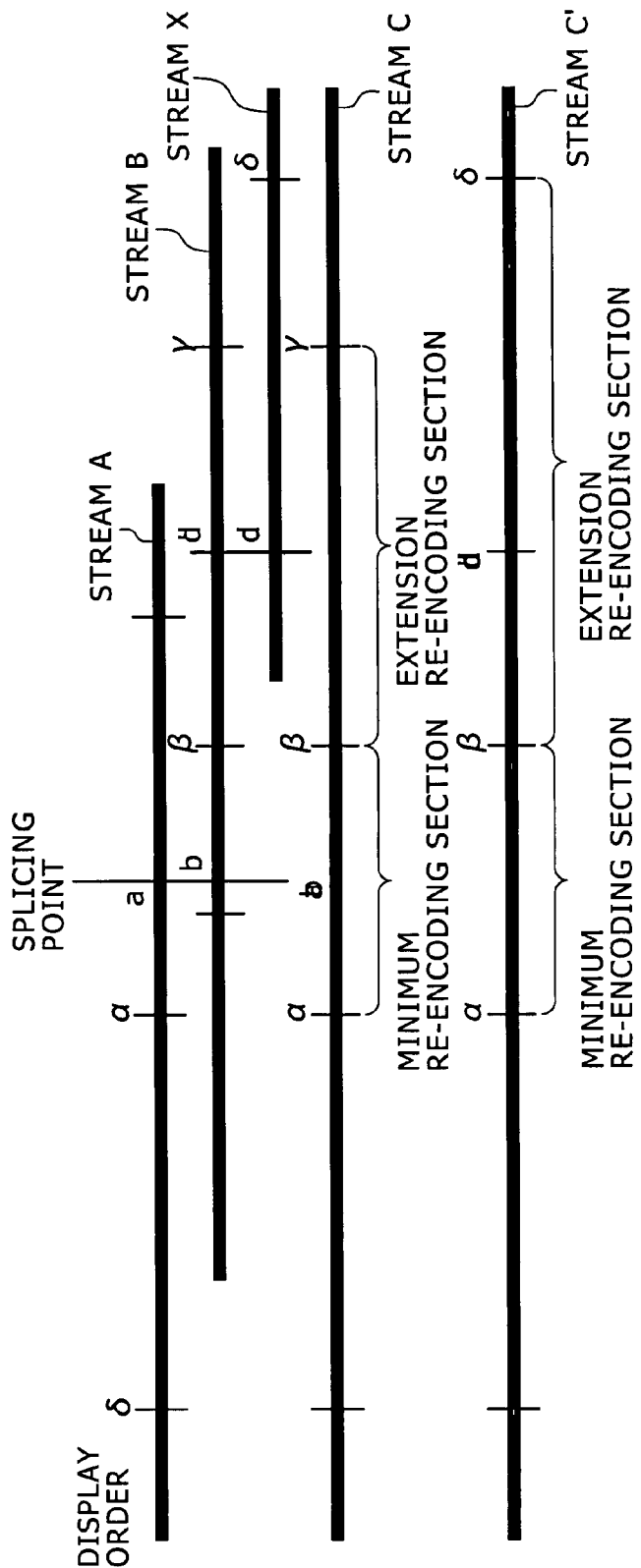

For example, referring to FIG. 10, in the case where another splicing point exists in the extension re-encoding section, the extension re-encoding section is extended to an end location δ of a GOP that includes splicing point d in stream X, which is spliced to stream B at splicing point d'd. That is, a part of the extension re-encoding section that follows splicing point d'd uses data corresponding to stream X, and a VBV target value in the encoding of the extension re-encoding section is changed to the VBV occupancy in the end location δ of the GOP that includes splicing point d in stream X.

As described above, in the case where the extension re-encoding section has been set, it is detected whether a new splicing point exists in that section or the GOP next to that section, and when the new splicing point exists therein, these splicing points are taken into account to set the extension re-encoding section again.

Note that, in FIG. 10, the extension re-encoding section which has been set based on the plurality of splicing points may be encoded always as one GOP. Alternatively, it may be determined based on the number of frames included in the newly-set extension re-encoding section whether the extension re-encoding section should be encoded as a plurality of GOPs, or the extension re-encoding section may be divided into a plurality of GOPs in the same manner as described above with reference to FIGS. 4 to 6.

Specifically, the number of frames, Z, included in the newly-set extension re-encoding section may be small, for example, in the case where splicing point d' in stream B is close to the end point β of the minimum re-encoding section, and in addition, the end location δ of the GOP that includes splicing point d in stream X is close to splicing point d'd. When a short section is subjected to the encoding process, it is highly probable that the continuity in the VBV occupancy will not be maintained at its end point, and the next GOP in stream X will be set as an additional extension re-encoding section.

As such, in the case where the number of frames, Z, included in the newly-set minimum re-encoding section satisfies 0≤Z<N/2, the next GOP in stream X may be added to this minimum re-encoding section. This does not cause a significant change in the extent to which the re-encoding section is extended, but increases flexibility of the quantity of generated bits in that part. Therefore, even when a frame that is very difficult to encode is included, it is possible to prevent extreme degradation of image quality, favorably. Needless to say, at this time, it is determined whether or not another splicing point exists in the next GOP in stream X or the GOP next to that GOP, and when another splicing point exists therein, the extension re-encoding section is set again in the above-described manner.

In short, the editing apparatus 1 has, as the operation modes at the time of splicing, the two operation modes: the two-pass encoding mode in which the retry operation is performed, and the extension re-encoding section setting mode in which the section that is to be subjected to the re-encoding is extended. In both operation modes, in the case where a plurality of splicing points exist in the section subjected to the re-encoding (i.e., the minimum re-encoding section and/or the extension re-encoding section) and the GOP next to this section, the section that is to be subjected to the re-encoding is set based on these splicing points, and the VBV target value at the end point of that section is set. In the editing apparatus 1, the operation mode is set based on the structure or settings of the editing apparatus 1, the user operation input, or the like, for example, and processing is performed based on the set operation mode.

In the two-pass encoding mode, the re-encoding is performed only on the minimum re-encoding section, which includes the GOP that includes the splicing point, while maintaining the continuity in the VBV occupancy; therefore, a part of the edited stream that may experience degradation of image quality as a result of re-encoding can be limited to a minimum. Therefore, the edition is suitably performed in the two-pass encoding mode when there is a desire to reduce degradation of image quality to a minimum, rather than to reproduce a result of the edition in real time for checking.

Meanwhile, in the extension re-encoding section setting mode, the retry operation is not performed even when the actual value of the VBV occupancy is not successfully made greater than the target value of the VBV occupancy in the minimum re-encoding section composed of the GOPs that include the splicing point. Therefore, implementation thereof is easier compared to the mode in which the retry operation is performed. Moreover, in the extension re-encoding section setting mode, it is possible to reproduce/output the result of the edition nearly in real time, which is difficult in the mode in which the retry operation is performed. Therefore, the edition is suitably performed in the extension re-encoding section setting mode when there is a need to reproduce/output the result of the edition nearly in real time.

Figure 11:
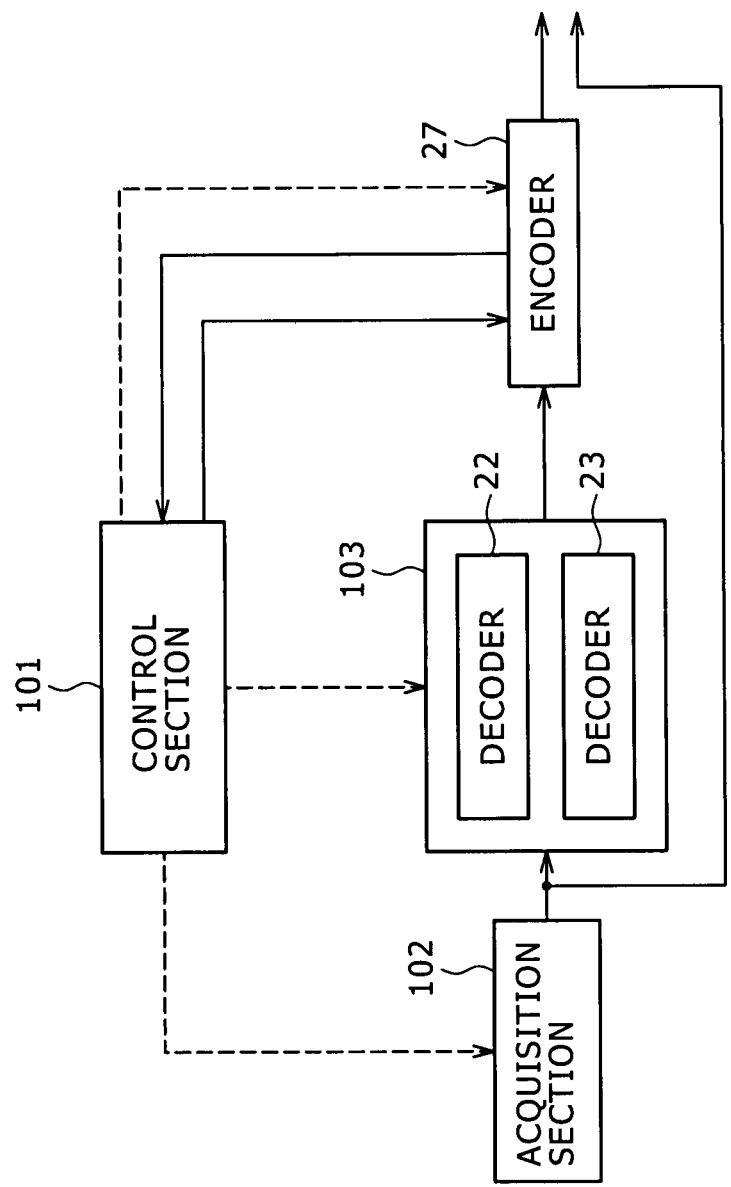
FIG. 11 is a functional block diagram illustrating a functional structure of the editing apparatus.

Next, FIG. 11 is a block diagram illustrating an exemplary functional structure of the editing apparatus 1 of FIG. 3. In FIG. 11, parts that have corresponding parts in FIG. 3 are assigned the same reference numerals as in FIG. 3, and descriptions thereof are omitted as appropriate.

The editing apparatus 1 is composed of a control section 101, an acquisition section 102, a decoder 103 including the decoder 22 and the decoder 23, and the encoder 27.

The control section 101 corresponds to the CPU 11 and the CPU 20, and controls each part of the editing apparatus 1. Under control of the control section 101, the acquisition section 102 acquires the compressed video material data from the HDD 16 or the memory 18, and supplies the part of the compressed video material data that corresponds to the re-encoding section to the decoder 103, which includes the decoder 22 and the decoder 23. Note that the HDD 16 in which the compressed video material data is stored or the memory 18 may be contained in the acquisition section 102. Also note that the compressed video material data may be acquired by the acquisition section 102 from another device connected to the editing apparatus 1. The acquisition section 102 also acquires, as necessary, the part of the compressed video material data that does not correspond to the re-encoding section, and outputs that part (to the stream splicer 25 in FIG. 3) in order that that part will be spliced to the re-encoded region to generate the edited image.

The decoder 103 decodes the compressed video material data supplied from the acquisition section 102, and supplies the resulting uncompressed video signal to the encoder 27. Note that the editing apparatus 1 as illustrated in FIG. 11 contains the two decoders 22 and 23 as decoders for decoding the compressed video material data, and the decoder 24 as a decoder for decoding the edited stream. However, the number of decoders contained in the editing apparatus 1 may be one, two, or more than three.

Figure 12:
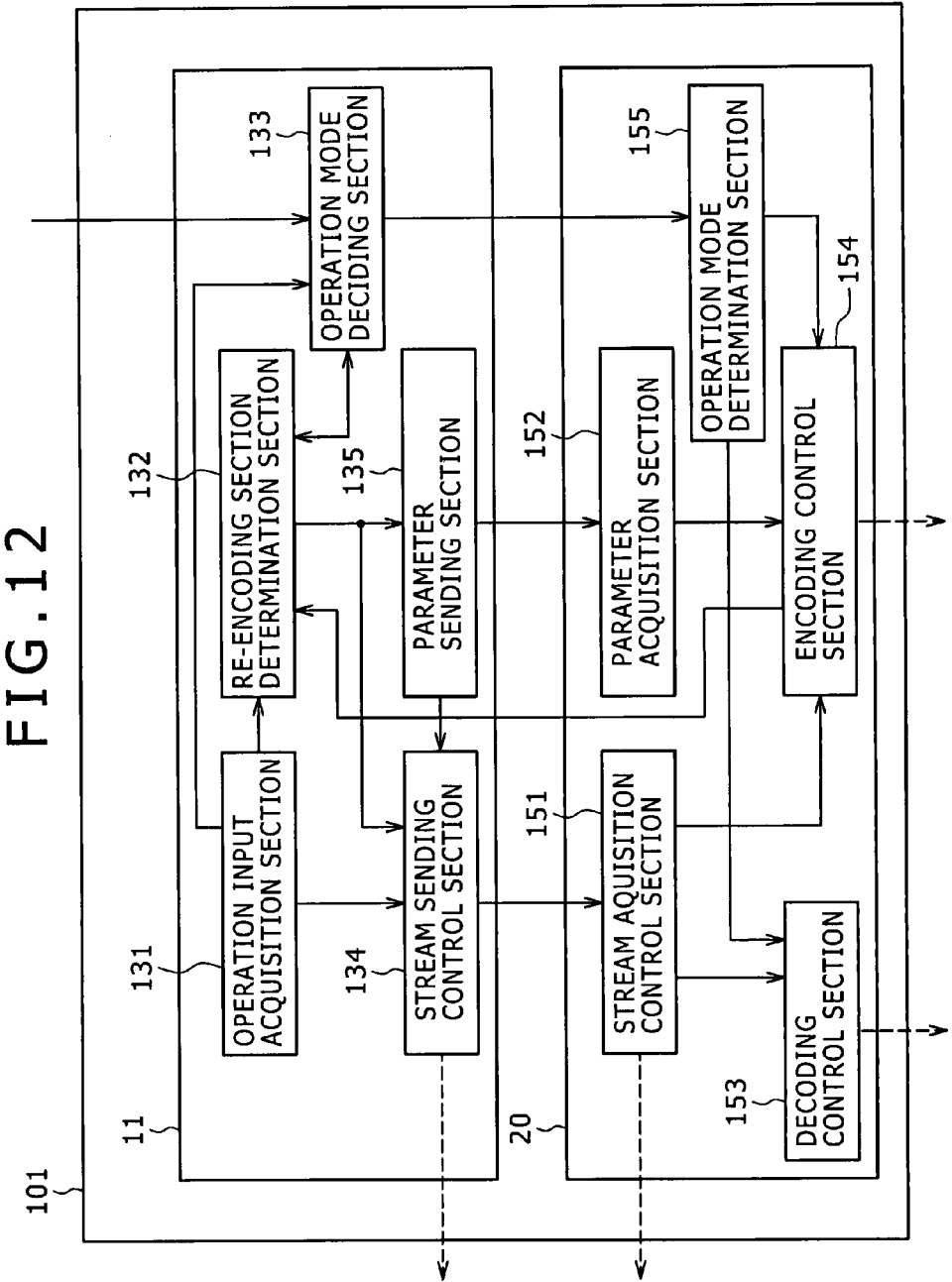
FIG. 12 is a functional block diagram illustrating a functional structure of a control section.

In more detail, the control section 101 has functions as illustrated in FIG. 12.

That is, the control section 101 is defined as a unit that combines functions executable by the CPU 11 and functions executable by the CPU 20. The CPU 11 includes an operation input acquisition section 131, a re-encoding section determination section 132, an operation mode deciding section 133, a stream sending control section 134, and a parameter sending section 135, whereas the CPU 20 includes a stream acquisition control section 151, a parameter acquisition section 152, a decoding control section 153, an encoding control section 154, and an operation mode determination section 155.

The operation input acquisition section 131 accepts an operation input by a user to acquire information corresponding to the user operation, such as the information concerning the streams to be edited and the splicing point, and supplies the acquired information to the re-encoding section determination section 132 or the stream sending control section 134. In addition, when the operation input acquisition section 131 has accepted from the user an operation input for setting or changing the operation mode, the operation input acquisition section 131 supplies a content of the operation input concerning the operation mode to the operation mode deciding section 133.

Based on the information concerning the streams to be edited and the splicing point supplied from the operation input acquisition section 131, the re-encoding section determination section 132 first determines the minimum re-encoding section. The re-encoding section determination section 132 supplies information representing the determined minimum re-encoding section to the parameter sending section 135 and the stream sending control section 134. In the case where the operation mode is the extension re-encoding section setting mode and a request for stopping the supply of the stream has not been received from the encoding control section 154, i.e., in the case where as a result of the re-encoding process performed on the minimum re-encoding section, the VBV occupancy has become lower than the target value, and accordingly a request for setting the next GOP as the extension re-encoding section has been made, the re-encoding section determination section 132 determines whether any splicing point exists in the next GOP, determines the extension re-encoding section based on a result of this determination, and supplies information representing the extension re-encoding section to the parameter sending section 135 and the stream sending control section 134.

Based on the operation input by the user supplied from the operation input acquisition section 131 or the settings of the editing apparatus 1, the operation mode deciding section 133 decides the operation mode, and supplies the decided operation mode to the re-encoding section determination section 132 and the operation mode determination section 155.

Based on the information representing the minimum re-encoding section or the extension re-encoding section supplied from the re-encoding section determination section 132, the parameter sending section 135 supplies various types of parameters necessary for the re-encoding of the streams to the parameter acquisition section 152.

Based on the information supplied from the operation input acquisition section 131 and the re-encoding section determination section 132, the stream sending control section 134 controls the acquisition section 102 so that the part of the stream to be edited that has been set as the re-encoding section will be sent to the decoder 22 or the decoder 23. In addition, the stream sending control section 134 controls, as necessary, the acquisition section 102 so that the part of the stream to be edited that has not been set as the re-encoding section will also be acquired to be spliced to the re-encoded part. In addition, based on the information supplied from the operation input acquisition section 131, the stream sending control section 134 supplies, to the stream acquisition control section 151, a control signal for performing a process corresponding to the user operation, such as editing, storing, or displaying of the stream.

Based on the control signal supplied from the stream sending control section 134, the stream acquisition control section 151 controls acquisition of the stream to be edited. In addition, the stream acquisition control section 151 controls the decoding control section 153 to decode the part of the stream to be edited that should be re-encoded, and also controls the encoding control section 154 to encode it.

Based on the operation mode determined by the operation mode determination section 155, the decoding control section 153 controls the decoding of the stream. The parameter acquisition section 152 acquires from the parameter sending section 135 the various types of parameters necessary for the re-encoding of the stream, and supplies the acquired parameters to the encoding control section 154.

Based on the operation mode determined by the operation mode determination section 155, the encoding control section 154 controls the re-encoding of the stream using the parameters supplied from the parameter acquisition section 152. In the case where the operation mode is the two-pass encoding mode and as a result of the re-encoding process performed on the minimum re-encoding section, the VBV occupancy has become lower than the target value, the encoding control section 154 acquires from the encoder 27 various types of parameters (e.g., a prior result of the quantity of generated bits) obtained as a result of the first encoding process, and uses the acquired parameters to determine the bit allocation for the second encoding process. In addition, in the case where the operation mode is the extension re-encoding section setting mode and as a result of the re-encoding process performed on the minimum re-encoding section, the VBV occupancy has become lower than the target value, the encoding control section 154 does not supply the request for stopping the supply of the stream to the re-encoding section determination section 132 but makes the request for setting the extension re-encoding section so that the extension re-encoding section will be set.

Based on the operation mode decided by the operation mode deciding section 133, the operation mode determination section 155 determines whether the operation mode is the two-pass encoding mode or the extension re-encoding section setting mode, and supplies a result of determination to the decoding control section 153 and the encoding control section 154.

Next, with reference to flowcharts of FIGS. 13 to 15, processing by the CPU 11 will now be described below.

At step S1, the CPU 11 accepts input of the information representing the splicing points and the GOP structures of the plurality of streams, which are the compression-coded, compressed video material data. In addition, in the case where the instruction to display the parts preceding and following the re-encoding section has been issued, the CPU 11 generates the control signal for controlling relevant parts of the editing apparatus 1 so that data of the part, preceding the minimum re-encoding section, of the stream corresponding to a part that precedes the first splicing point will be supplied to the decoder 24 via the stream splicer 25, and outputted to the external display device or the like via the switch 29, and sends the generated control signal to the CPU 20 via the northbridge 12, the PCI bus 14, the PCI bridge 17, and the control bus 19.

At step S2, a minimum re-encoding section determination process described below with reference to FIGS. 16 and 17 or FIGS. 18 to 20 is performed; so that the minimum re-encoding section is determined as described above with reference to FIGS. 4 to 7.

At step S3, the CPU 11 determines whether the minimum re-encoding section has been determined at step S2. If it is determined at step S3 that the minimum re-encoding section has not been determined, this process is finished.

If it is determined at step S3 that the minimum re-encoding section has been determined, the CPU 11, at step S4, acquires the parameters necessary for the re-encoding process to be performed on the minimum re-encoding section.

In the case where stream A and stream B are spliced together at the first splicing point and stream B and stream C are spliced together at the second splicing point, for example, the parameters necessary for the re-encoding process to be performed on the minimum re-encoding section include: information representing the location of the first splicing point in stream A, such as the number of GOPs arranged before the GOP that includes the first splicing point in stream A; information representing the location of the first splicing point in the GOP that includes the first splicing point in stream A; information representing the location of the first splicing point in stream B, such as the number of GOPs arranged from the GOP that includes the first splicing point to the end of stream B; information representing the location of the first splicing point in the GOP that includes the first splicing point in stream B; information representing the location of the second splicing point in stream B, such as the number of GOPs arranged before the GOP that includes the second splicing point in stream B; information representing the location of the second splicing point in the GOP that includes the second splicing point in stream B; information representing the location of the second splicing point in stream C, such as the number of GOPs arranged from the GOP that includes the second splicing point to the end of stream C; information representing the location of the second splicing point in the GOP that includes the second splicing point in stream C; a VBV value corresponding to a starting location of the minimum re-encoding section; a VBV value of a frame corresponding to an end location of the minimum re-encoding section (i.e., the VBV target value in the minimum re-encoding section); and information representing whether the effect should be applied or a type of the effect.

At step S5, the CPU 11 acquires parameters necessary for an encoding termination process for the minimum re-encoding section. The encoding termination process refers to the re-encoding process performed on the first few frames up to the first P picture in the GOP next to the minimum re-encoding section, and a process of generating edited stream C based on a result of this re-encoding process, as described above with reference to FIG. 8.

Examples of the parameters necessary for the encoding termination process for the minimum re-encoding section include: a VBV target value in a relevant GOP; a VBV value in the first P picture in the GOP next to the relevant GOP; the quantity of generated bits of the I picture in the GOP next to the relevant GOP; the number of B pictures arranged before the first P picture in the GOP next to the relevant GOP; and a quantization matrix in the B picture(s) arranged before the first P picture in the GOP next to the relevant GOP.

At step S6, the CPU 11 controls the sending of the streams necessary for the re-encoding process to be performed on the minimum re-encoding section to the decoder 22 and the decoder 23. Specifically, in the case where stream A and stream B are spliced together at the first splicing point and stream B and stream C are spliced together at the second splicing point, for example, the CPU 11 generates the control signal for controlling relevant parts of the editing apparatus 1 so that: a part of stream A that starts with the starting location of the minimum re-encoding section and ends with the first splicing point will be supplied to the decoder 22; a part of stream B that starts with the first splicing point and ends with the second splicing point will be supplied to the decoder 23; a part of stream C that follows the second splicing point will be supplied to the decoder 22 (note that, regarding each of streams A, B, and C, in the case where any frame necessary for decoding the minimum re-encoding section exists outside of this section, that frame will also be supplied to the corresponding one of the decoders 22 and 23); and those parts of streams A to C will be spliced together at the splicing points and, as necessary, subjected to the application of the effect by the effect/switch 26. Then, the CPU 11 sends the generated control signal to the CPU 20 via the northbridge 12, the PCI bus 14, the PCI bridge 17, and the control bus 19.

At step S7, the CPU 11 sends the parameters necessary for the re-encoding process to be performed on the minimum re-encoding section and the parameters necessary for the encoding termination process to the CPU 20 via the northbridge 12, the PCI bus 14, the PCI bridge 17, and the control bus 19.

At step S8, the CPU 11 sends a control signal for controlling the switch 29 so that the streams to be outputted/displayed in the minimum re-encoding section will be inputted to the encoder 27, to the CPU 20 via the northbridge 12, the PCI bus 14 the PCI bridge 17, and the control bus 19.

At step S9, the CPU 11 determines whether the operation mode is the two-pass encoding mode. If it is determined at step S9 that the operation mode is the two-pass encoding mode, control proceeds to step S19, which will be described later.

If it is determined at step S9 that the operation mode is not the two-pass encoding mode, which means that the operation mode is the extension re-encoding section setting mode, the CPU 11 provisionally sets the next GOP as the extension re-encoding section at step S10.

At step S11, the CPU 11 determines whether or not the next splicing point exists in the extension re-encoding section provisionally set at step S10 or the GOP next to the extension re-encoding section.

If it is determined at step S11 that the next splicing point exists therein, the CPU 11, at step S12, sets the extension re-encoding section based on a part of the streams spliced together at the splicing point that follows the splicing point, as described above with reference to FIG. 10.

If it is determined at step S11 that the next splicing point does not exist therein, the CPU 11, at step S13, sets the provisionally set extension re-encoding section as the extension re-encoding section that is to be re-encoded next.

After the process of step S12 or step S13, the CPU 11, at step S14, acquires parameters necessary for the re-encoding process to be performed on the extension re-encoding section that is to be re-encoded next.

At step S15, the CPU 11 acquires parameters necessary for the encoding termination process for the extension re-encoding section that is to be re-encoded next.

At step S16, the CPU 11 controls sending to the decoder 23 of the GOP that follows the minimum re-encoding section in the stream necessary for the re-encoding process to be performed on the extension re-encoding section that is to be re-encoded next.

At step S17, the CPU 11 sends the parameters necessary for the re-encoding process to be performed on the extension re-encoding section that is to be re-encoded next and the parameters necessary for the encoding termination process to the CPU 20 via the northbridge 12, the PCI bus 14, the PCI bridge 17, and the control bus 19.

At step S18, the CPU 11 determines whether the request for stopping the supply of the stream to the decoder 22 or the decoder 23 has been received from the CPU 20 via the control bus 19, the PCI bridge 17, the PCI bus 14, and the northbridge 12.

Specifically, in the case where in the re-encoding process on the minimum re-encoding section, the encoding of the minimum re-encoding section has ended with a value of the VBV occupancy greater than the target value of the VBV occupancy, the CPU 20 sends to the CPU 11 the request for stopping the supply of the stream to the decoder 22 or the decoder 23.

If it is determined at step S18 that the request for stopping the supply of the stream to the decoder 22 or the decoder 23 has not been received from the CPU 20, i.e., if it is determined that in the re-encoding process on the minimum re-encoding section, the encoding of the minimum re-encoding section has not ended with a value of the VBV occupancy greater than the target value of the VBV occupancy, control returns to step S10, and the subsequent processes are repeated. If it is determined at step S18 that the request for stopping the supply of the stream to the decoder 22 or the decoder 23 has been received from the CPU 20, control proceeds to step S22, which will be described later.

If it is determined at step S9 that the operation mode is the two-pass encoding mode, the CPU 11, at step S19, controls sending of the streams necessary for the re-encoding process to be performed on the minimum re-encoding section to the decoder 22 and the decoder 23. Specifically, the CPU 11 generates the control signal for controlling relevant parts of the editing apparatus 1 so that the streams necessary for the re-encoding process to be performed on the minimum re-encoding section will be supplied to the decoder 22 or the decoder 23, and spliced together at the splicing point and, as necessary, subjected to the application of the effect by the effect/switch 26. Then, the CPU 11 sends the generated control signal to the CPU 20 via the northbridge 12, the PCI bus 14, the PCI bridge 17, and the control bus 19.

At step S20, the CPU 11 sends the parameters necessary for the re-encoding process to be performed on the minimum re-encoding section and the parameters necessary for the encoding termination process to the CPU 20 via the northbridge 12, the PCI bus 14, the PCI bridge 17, and the control bus 19.

At step S21, the CPU 11 determines whether notification that the encoding of the minimum re-encoding section has been successful has been received from the CPU 20 via the control bus 19, the PCI bridge 17, the PCI bus 14, and the northbridge 12. If it is determined at step S21 that the notification that the encoding of the minimum re-encoding section has been successful has not been received, control returns to step S19, and the subsequent processes are repeated.

If it is determined at step S18 that the request for stopping the supply of the stream to the decoder 22 or the decoder 23 has been received from the CPU 20, or if it is determined at step S21 that the notification that the encoding of the minimum re-encoding section has been successful has been received, the CPU 11, at step S22, determines whether in frames that follow the final re-encoding section, any B picture is arranged so as to immediately follow the I picture. If it is determined at step S22 that no B picture immediately follows the I picture, i.e., if it is determined that the P picture immediately follows the I picture, control proceeds to step S25, which will be described later.

If it is determined at step S22 that any B picture immediately follows the I picture, the CPU 11, at step S23, determines whether the I picture, one or more B pictures, and the P picture that follow the final re-encoding section, i.e., a plurality of frames from the frame indicated by a to the frame indicated by b in FIG. 8, have been read from the HDD 16 and supplied to the memory 18 via the southbridge 15, the northbridge 12, the PCI bus 14, and the PCI bridge 17. If it is determined at step S23 that the I picture, the one or more B pictures, and the P picture have been supplied to the memory 18, control proceeds to step S25, which will be described later.

If it is determined at step S23 that the I picture, the one or more B pictures, and the P picture have not been supplied to the memory 18, the CPU 11 controls the supply of the I picture, the one or more B pictures, and the P picture that follow the final re-encoding section to the decoder 23 at step S24.

If it is determined at step S22 that no B picture immediately follows the I picture, i.e., if it is determined that the P picture immediately follows the I picture, or if it is determined at step S23 that the I picture, the one or more B pictures, and the P picture have been supplied to the memory 18, or after the process of step S24, the CPU 11, at step S25, generates the control signal for controlling relevant parts of the editing apparatus 1 so that the stream to be outputted/displayed outside of the re-encoding section will be supplied to the decoder 24 via the stream splicer 25 and decoded by the decoder 24, and supplied to the external display device or the like, and sends the generated control signal to the CPU 20 via the northbridge 12, the PCI bus 14, the PCI bridge 17, and the control bus 19. Then, this process is finished.

In accordance with the above process, the CPU 11 determines the minimum re-encoding section; sends the parameters necessary for the re-encoding process on the minimum re-encoding section and the encoding termination process to the CPU 20 via the northbridge 12, the PCI bus 14, the PCI bridge 17, and the control bus 19; and controls the supply of the streams corresponding to the re-encoding section to the memory 18 via the northbridge 12, the PCI bus 14, and the PCI bridge 17, and the supply thereof to the decoder 23 (or the decoder 22 as necessary).

In addition, in the two-pass encoding mode, the CPU 11 exercises various controls so that the re-encoding of the minimum re-encoding section will be performed repeatedly until the VBV occupancy becomes continuous as a result of the re-encoding performed on the minimum re-encoding section; therefore, it is possible to limit the re-encoding section to a minimum while satisfying a constraint of the VBV. Thus, it is possible to prevent degradation of image quality.

Moreover, in the extension re-encoding section setting mode, the CPU 11 sets the extension re-encoding section repeatedly until the VBV occupancy becomes continuous in the case where the VBV occupancy has not become continuous as a result of the re-encoding performed on the minimum re-encoding section. This makes it possible to output/display the result of the edition in real time, and perform the editing process while satisfying the constraint of the VBV.

Further, the CPU 11 determines at the time of setting the extension re-encoding section whether a new splicing point exists in that section or the GOP next to that section, and when the new splicing point exists therein, the CPU 11 sets the extension re-encoding section based on the splicing point.

Still further, in the extension re-encoding section setting mode, the CPU 11 is able to send, in advance, the parameters necessary for the re-encoding process to be performed on the extension re-encoding section that is to be re-encoded next and the encoding termination process to the CPU 20 via the northbridge 12, the PCI bus 14, the PCI bridge 17, and the control bus 19, and also supply the stream that will subsequently be subjected to re-encoding if the re-encoding section is extended to the memory 18 via the northbridge 12, the PCI bus 14, and the PCI bridge 17 and then to the decoder 23 (or the decoder 22 as necessary). Therefore, even when the re-encoding section is extended and the extension re-encoding section is set, the editing apparatus 1 does not suffer delay or stop in processing. Because of this, the editing apparatus 1 is able to reproduce/output the edited image continuously.

Next, minimum re-encoding section determination process 1, which is a first example of the process performed at step S2 in FIG. 13, will now be described below with reference to flowcharts of FIGS. 16 and 17.

At step S41, the CPU 11 determines the standard re-encoding section in the manner as described above with reference to FIG. 4 based on the information of the location of the splicing point in each of the streams to be edited. That is, assuming that the starting location of the GOP that includes splicing point a in stream A that is to be spliced to stream B at splicing point ab is indicated by α and that the end location of the GOP that includes splicing point b in stream B is indicated by β, the section starting with location α and ending with location β that includes splicing points a and b is set as the standard re-encoding section in stream C, which is to be generated by splicing stream A and stream B together at the splicing point.

At step S42, the CPU 11 determines whether the number of frames, A+B, included in the standard re-encoding section satisfies N/2≤A+B≤N, where N is the number of frames in one standard GOP.

If it is determined at step S42 that the number of frames, A+B, satisfies N/2≤A+B≤N, the CPU 11 provisionally sets, as one GOP, the standard re-encoding section as the minimum re-encoding section at step S43. Then, control proceeds to step S51 in FIG. 17.

If it is determined at step S42 that the number of frames, A+B, does not satisfy N/2≤A+B≤N, the CPU 11, at step S44, determines whether the number of frames, A+B, included in the standard re-encoding section satisfies N+1≤A+B≤2N−1, where N is the number of frames in one standard GOP.

If it is determined at step S44 that the number of frames, A+B, satisfies N+1≤A+B≤2N−1, the CPU 11, at step S45, divides the standard re-encoding section into two GOPs and provisionally sets the two GOPs as the minimum re-encoding section in the manner as described above with reference to FIG. 6. More specifically, in the case where the number of frames included in the standard re-encoding section is even, the standard re-encoding section is evenly divided into the two GOPs, whereas in the case where the number of frames included in the standard re-encoding section is odd, the standard re-encoding section is divided into the two GOPs such that the second GOP includes more frames than the first GOP by one frame. Then, control proceeds to step S51 in FIG. 17.

At this time, in the case where the number of frames, A+B, is indivisible, it is preferable that the number of frames of the later (in terms of time) GOP be greater than that of the earlier (in terms of time) GOP. This is because, in the decoding and encoding process for adjusting the occupancy of the part at which the re-encoded part of the encoded stream and the part of the encoded stream that has not been re-encoded are combined, the degree of flexibility in bit allocation is increased when the number of frames in the later (in terms of time) GOP is greater than the number of frames in the earlier (in terms of time) GOP.

If it is determined at step S44 that the number of frames, A+B, does not satisfy N+1≤A+B≤2N−1, the CPU 11, step S46, determines whether the number of frames, A+B, included in the standard re-encoding section satisfies 0≤A+B<N/2, where N is the number of frames in one standard GOP.

If it is determined at step S46 that the number of frames, A+B, does not satisfy 0≤A+B<N/2, the number of frames, A+B, is equal to or greater than 2N, and accordingly, the CPU 11 performs error handling at step S47. Then, control returns to step S2 in FIG. 13, and proceeds to step S3.

If it is determined at step S46 that the number of frames, A+B, satisfies 0≤A+B<N/2, the CPU 11 determines at step S48 whether the sum, A+B+C, of the number of frames, A+B, included in the standard re-encoding section and the number of frames in the next GOP in stream B satisfies N/2≤A+B+C≤N.

If it is determined at step S48 that A+B+C does not satisfy N/2≤A+B+C≤N, i.e., if N<A+B+C, the CPU 11, at step S49, divides a section composed of the standard re-encoding section and the next GOP in stream B into two or more GOPs such that each GOP satisfies N/2≤x≤N, and provisionally sets the two or more GOPs as the minimum re-encoding section in the manner as described above with reference to FIG. 5. At this time, it is preferable that the number of frames included in each of the two or more GOPs be as equal as possible. In the case where the above section is divided into two GOPs, for example, if the total number of frames, A+B+C, is even, that section is evenly divided, whereas if the total number of frames, A+B+C, is odd, that section is divided such that the second GOP includes more frames than the first GOP by one frame, and the two GOPs are set as the minimum re-encoding section.

At this time, in the case where the number of frames, A+B+C, is indivisible, it is preferable that the number of frames of the later (in terms of time) GOP be greater than that of the earlier (in terms of time) GOP. This is because, in the decoding and encoding process for adjusting the occupancy of the part at which the re-encoded part of the encoded stream and the part of the encoded stream that has not been re-encoded are combined, the degree of flexibility in bit allocation is increased when the number of frames in the later (in terms of time) GOP is greater than the number of frames in the earlier (in terms of time) GOP.

Moreover, instead of dividing the number of frames, A+B+C, as evenly as possible, division of the GOPs may be performed in such a manner that a GOP has the predetermined number of frames. For example, the division of the GOPs may be performed such that the number of frames that constitute the earlier (in terms of time) one of the two GOPs is necessarily the predetermined number (e.g., N/2 or the smallest integer greater than N/2). Preferably, the predetermined number is determined such that each GOP will satisfy N/2≤x≤N.

Figure 17:
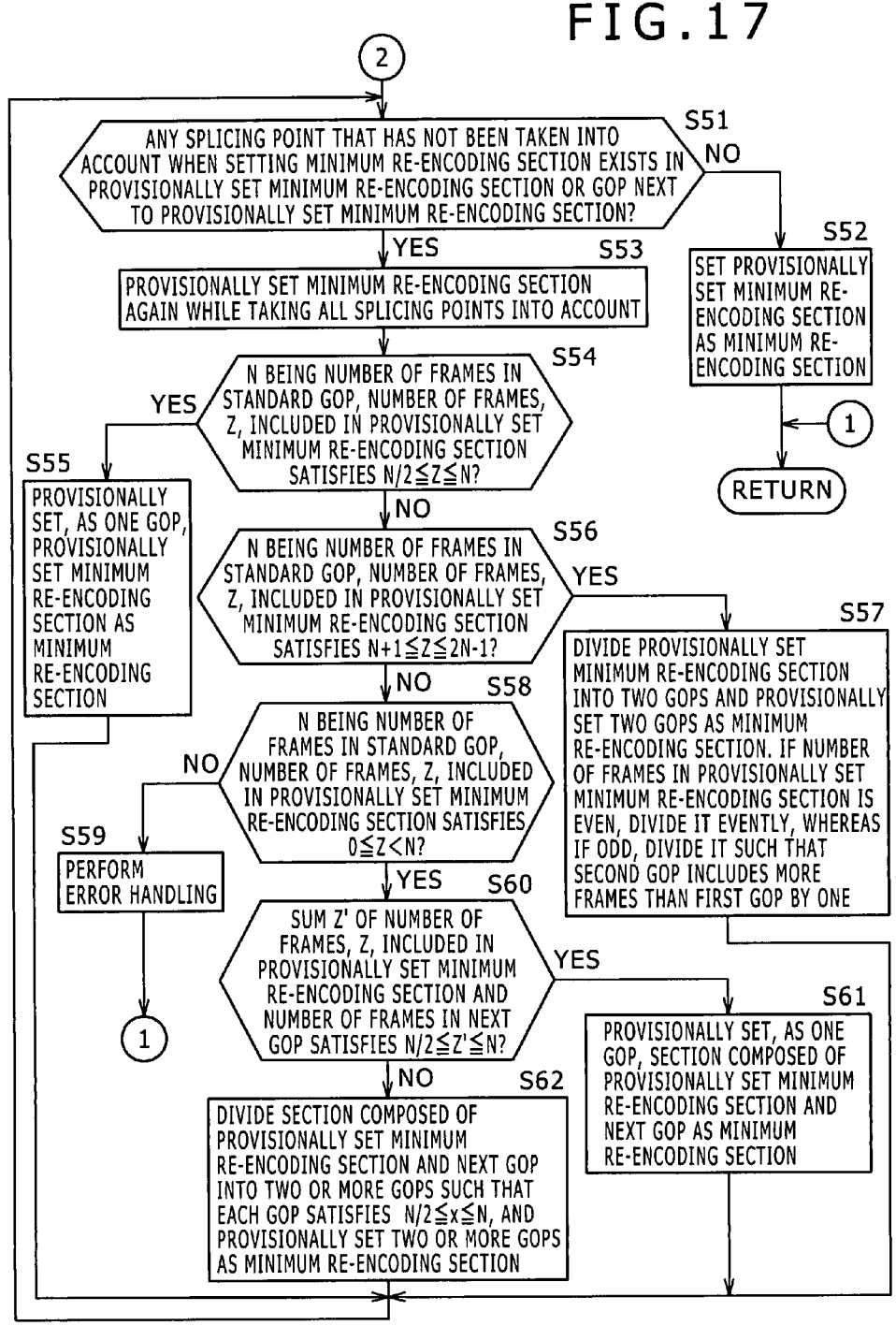

After the process of step S49, control proceeds to step S51 in FIG. 17.

If it is determined at step S48 that A+B+C satisfies N/2≤A+B+C≤N, the CPU 11 provisionally sets, as one GOP, the section composed of the standard re-encoding section and the next GOP in stream B as the minimum re-encoding section at step S50.

After the process of step S43, step S45, step S49, or step S50, the CPU 11 determines at step S51 whether any splicing point that has not been taken into account when setting the minimum re-encoding section exists in the provisionally set minimum re-encoding section or the GOP next to the provisionally set minimum re-encoding section.

If it is determined at step S51 that such a splicing point does not exist therein, the CPU 11 sets the provisionally set minimum re-encoding section as the minimum re-encoding section at step S52. Then, control returns to step S2 in FIG. 13, and proceeds to step S3.

If it is determined at step S51 that such a splicing point exists therein, the CPU 11, at step S53, provisionally sets the minimum re-encoding section again while taking all splicing points into account in the manner as described above with reference to FIG. 7.

At step S54, the CPU 11 determines whether the number of frames, Z, included in the provisionally set minimum re-encoding section satisfies $N/2 \leq Z \leq N$, where N is the number of frames in one standard GOP.

If it is determined at step S54 that the number of frames, Z, satisfies $N/2 \leq Z \leq N$, the CPU 11, at step S55, provisionally sets, as one GOP, the provisionally set minimum re-encoding section as the minimum re-encoding section. Then, control returns to step S51, and the subsequent processes are repeated.

If it is determined at step S54 that the number of frames, Z, does not satisfy $N/2 \leq Z \leq N$, the CPU 11 determines at step S56 whether the number of frames, Z, included in the provisionally set minimum re-encoding section satisfies $N+1 \leq Z \leq 2N-1$, where N is the number of frames in one standard GOP.

If it is determined at step S56 that the number of frames, Z, satisfies $N+1 \leq Z \leq 2N-1$, the CPU 11, at step S57, divides the provisionally set minimum re-encoding section into two GOPs and provisionally sets the two GOPs as the minimum re-encoding section. More specifically, in the case where the number of frames included in the provisionally set minimum re-encoding section is even, the provisionally set minimum re-encoding section is evenly divided into the two GOPs, whereas in the case where the number of frames included in the provisionally set minimum re-encoding section is odd, the provisionally set minimum re-encoding section is divided into the two GOPs such that the second GOP includes more frames than the first GOP by one frame. Then, control returns to step S51, and the subsequent processes are repeated.

If it is determined at step S56 that the number of frames, Z, does not satisfy $N+1 \leq Z \leq 2N-1$, the CPU 11 determines at step S58 whether the number of frames, Z, included in the provisionally set minimum re-encoding section satisfies $0 \leq Z < N$, where N is the number of frames in one standard GOP.

If it is determined at step S58 that the number of frames, Z, does not satisfy $0 \leq Z < N$, the CPU 11 performs the error handling at step S59. Then, control returns to step S2 in FIG. 13, and proceeds to step S3.

If it is determined at step S58 that the number of frames, Z, satisfies $0 \leq Z < N$, the CPU 11 determines at step S60 whether the sum Z' of the number of frames, Z, included in the provisionally set minimum re-encoding section and the number of frames in the next GOP satisfies $N/2 \leq Z' \leq N$.

If it is determined at step S60 that Z' satisfies $N/2 \leq Z' \leq N$, the CPU 11, at step S61, provisionally sets, as one GOP, a section composed of the provisionally set minimum re-encoding section and the next GOP as the minimum re-encoding section. Then, control returns to step S51, and the subsequent processes are repeated.

If it is determined at step S60 that Z' does not satisfy $N/2 \leq Z' \leq N$, the CPU 11, at step S62, divides the section composed of the provisionally set minimum re-encoding section and the next GOP into two or more GOPs such that each GOP satisfies $N/2 \leq x \leq N$, and provisionally sets the two or more GOPs as the minimum re-encoding section. Then, control returns to step S51, and the subsequent processes are repeated.

The above-described process makes it possible, even when a plurality of splicing points exist concerning the setting of the minimum re-encoding section, to set the minimum re-encoding section appropriately in accordance with the plurality of splicing points, and prevent too short a GOP from remaining as a result, which prevents unnecessary degradation of image quality. Moreover, because encoding can be performed such that each GOP in the section that is subjected to re-encoding has as great a GOP length as possible, a maximum encoding efficiency is obtained to achieve encoding with better image quality.

Note that in the process of step S45 or step S57, the number of frames included in the standard re-encoding section or the provisionally set minimum re-encoding section may not necessarily be divided as evenly as possible as described above. Instead of dividing the number of frames, A+B or Z, as evenly as possible, the division of the GOPs may be performed in such a manner that a GOP has a predetermined number of frames.

Next, minimum re-encoding section determination process 2, which is a second example of the process performed at step S2 in FIG. 13 will now be described below with reference to flowcharts of FIGS. 18 to 20.

Figure 18:
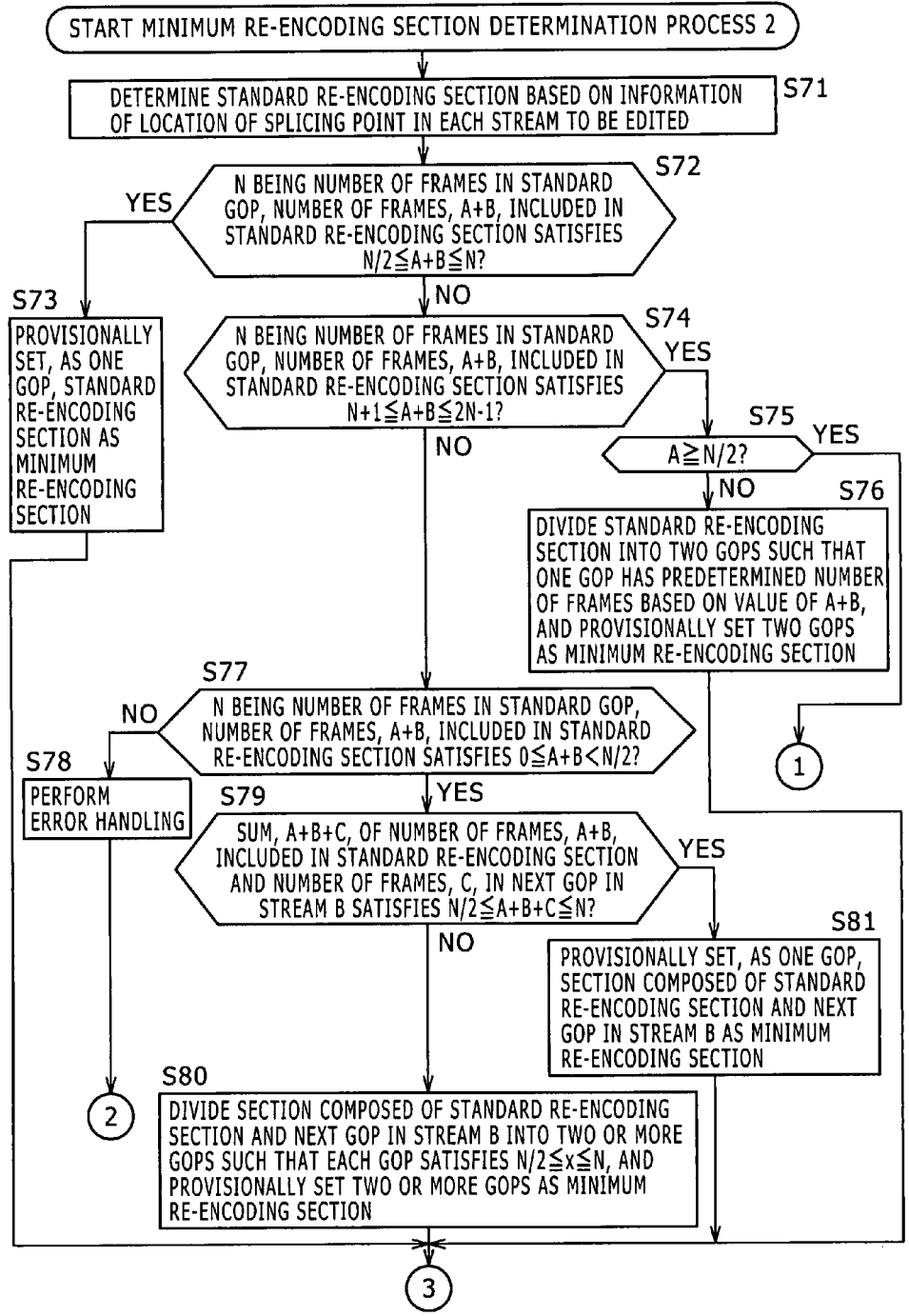
FIGS. 18 to 20 are flowcharts illustrating second minimum re-encoding section determination process.
Figure 19:
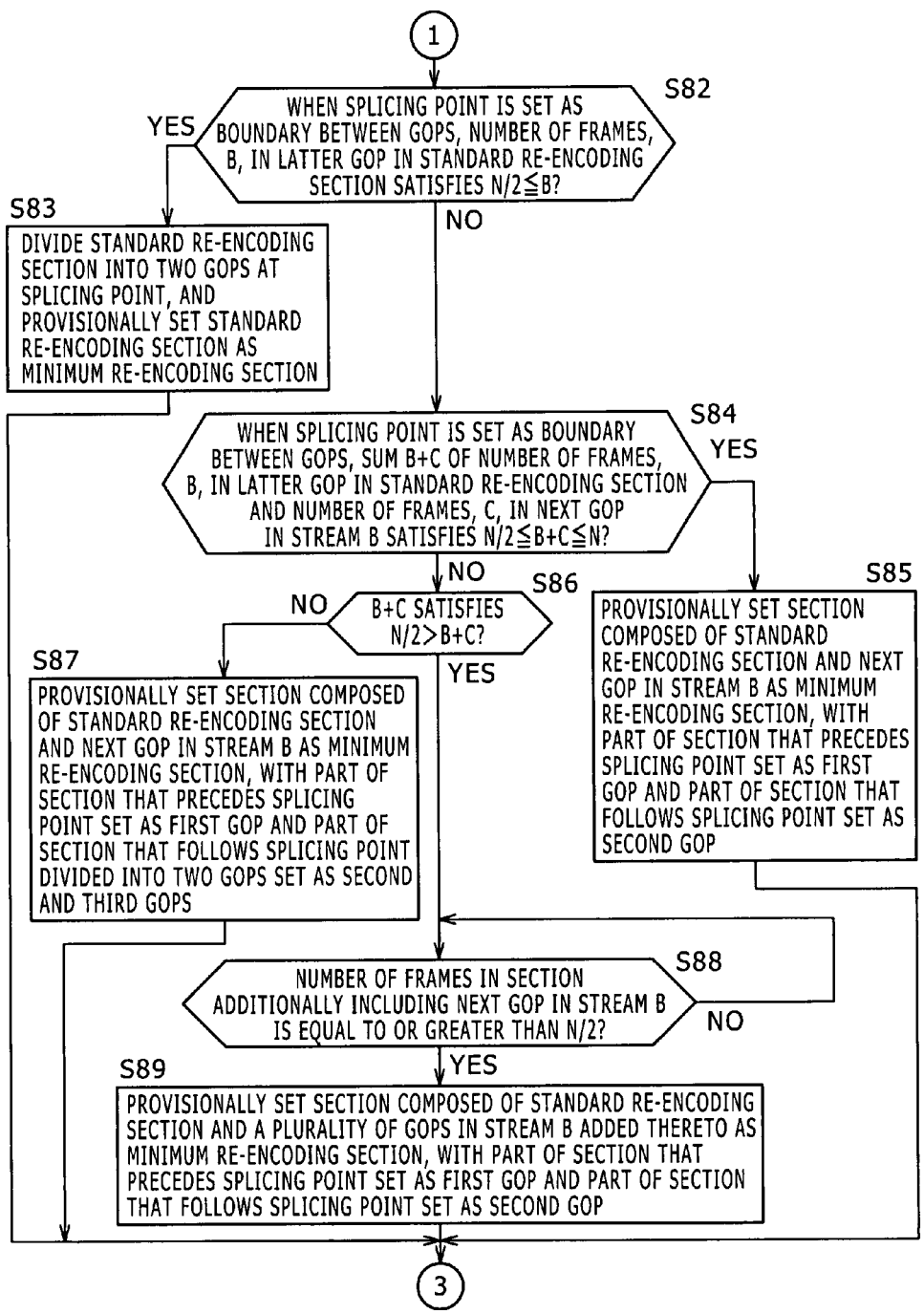

At steps S71 to S74, basically the same processes as those of steps S41 to S44 in FIG. 18 are performed.

Specifically, the CPU 11 determines the standard re-encoding section in the manner as described above with reference to FIG. 4 based on the information of the location of the splicing point in each of the streams to be edited. Then, if it is determined that the number of frames, A+B, included in the standard re-encoding section satisfies $N/2 \leq A+B \leq N$, where N is the number of frames in one standard GOP, the CPU 11 provisionally sets, as one GOP, the standard re-encoding section as the minimum re-encoding section.

Meanwhile, if it is determined that the number of frames, A+B, does not satisfy $N/2 \leq A+B \leq N$, it is determined whether the number of frames, A+B, included in the standard re-encoding section satisfies $N+1 \leq A+B \leq 2N-1$, where N is the number of frames in one standard GOP. If it is determined that the number of frames, A+B, does not satisfy $N+1 \leq A+B \leq 2N-1$, control proceeds to step S77, which will be described later.

If it is determined that the number of frames, A+B, satisfies $N+1 \leq A+B \leq 2N-1$, the CPU 11 determines at step S75 whether the number of frames, A, that are included in the standard re-encoding section and precede the splicing point satisfies $A \geq N/2$. If it is determined at step S75 that $A \geq N/2$ is satisfied, control proceeds to step S82, which will be described later.

If it is determined at step S75 that $A \geq N/2$ is not satisfied, the CPU 11, at step S76, divides the standard re-encoding section into two GOPs such that one GOP has the predetermined number of frames based on the number of frames, A+B, and provisionally sets the two GOPs as the minimum re-encoding section. Then, control proceeds to step S90 in FIG. 20.

At this time, the division of the GOPs may be performed, for example, such that the number of frames that constitute the earlier (in terms of time) one of the two GOPs is necessarily the predetermined number (e.g., N/2 or the smallest integer greater than N/2). Specifically, suppose N=15, for example. In this case, if A+B=16, the number of frames in the first GOP and the second GOP may both be 8. If A+B=17, the number of frames in the first GOP and the second GOP may be 8 and 9, respectively. If A+B=18, the number of frames in the first GOP and the second GOP may be 8 and 10, respectively. If A+B=22, the number of frames in the first GOP and the second GOP may be 8 and 14, respectively. That is, the number of frames in the first GOP may be fixed at the predetermined number, while varying the number of frames in the second GOP.

As described above, the number of frames in the earlier (in terms of time) GOP may be fixed at the predetermined value that does not make the re-encoding difficult while the number of frames in the later GOP is set at a greater value. This is preferable because, in the decoding and encoding process for adjusting the occupancy of the part at which the re-encoded part of the encoded stream and the part of the encoded stream that has not been re-encoded are combined, the degree of flexibility in bit allocation is increased when the number of frames in the later (in terms of time) GOP is greater than the number of frames in the earlier (in terms of time) GOP.

Figure 16:
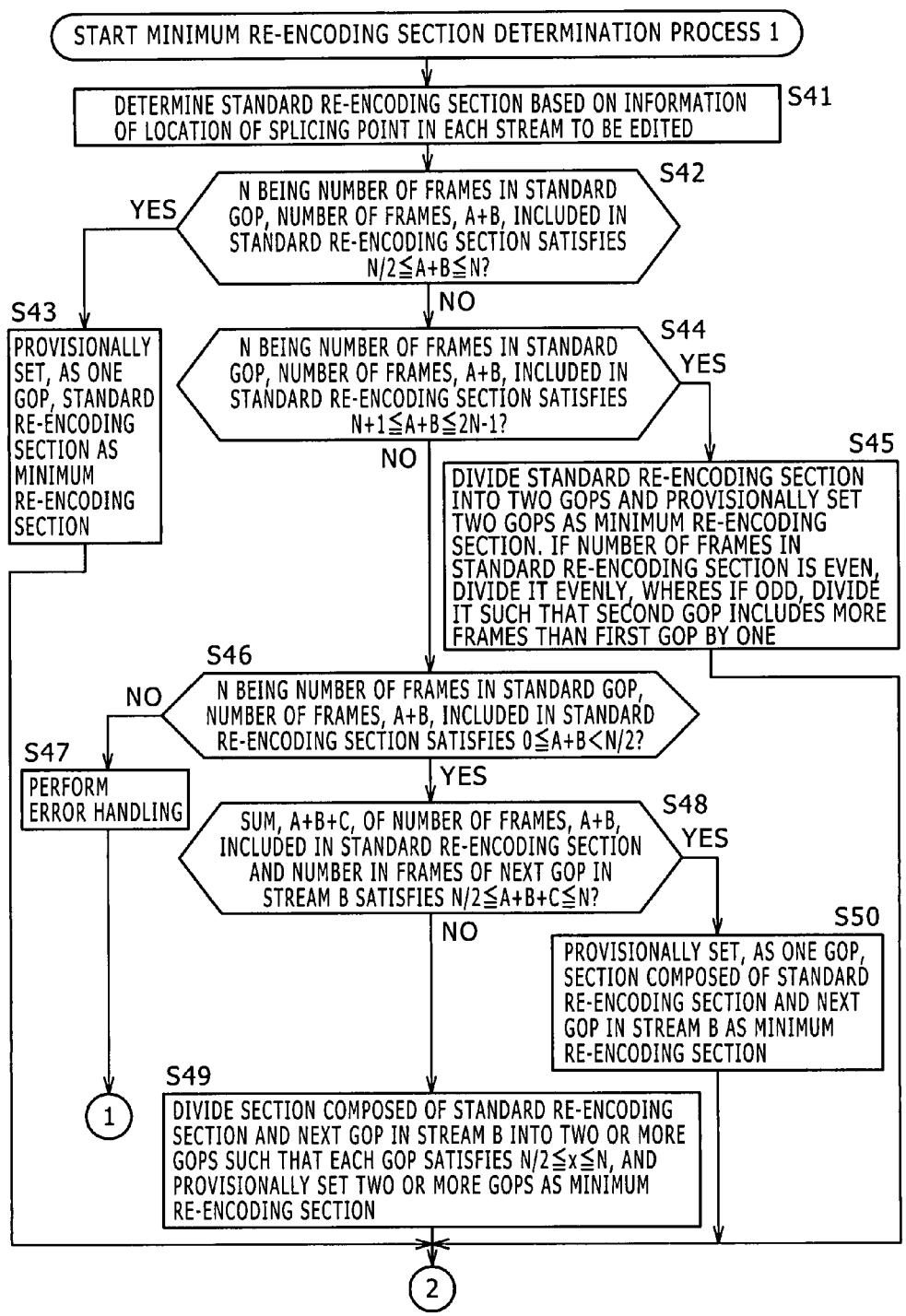
FIGS. 16 and 17 are flowcharts illustrating first minimum re-encoding section determination process.

If it is determined at step S74 that the number of frames, A+B, does not satisfy N+1≤A+B≤2 N−1, basically the same processes as those of steps S46 to S50 in FIG. 16 are performed at steps S77 to S81.

Specifically, it is determined whether the number of frames, A+B, included in the standard re-encoding section satisfies 0≤A+B<N/2, where N is the number of frames in one standard GOP. If it is determined that the number of frames, A+B, does not satisfy 0≤A+B<N/2, the number of frames, A+B, is equal to or greater than 2N, and accordingly, the error handling is performed, and control returns to step S2 in FIG. 13, and proceeds to step S3. If it is determined that the number of frames, A+B, satisfies 0≤A+B<N/2, it is determined whether the sum, A+B+C, of the number of frames, A+B, included in the standard re-encoding section and the number of frames in the next GOP in stream B satisfies N/2≤A+B+C≤N.

If it is determined that A+B+C does not satisfy N/2≤A+B+C≤N, i.e., if N<A+B+C, the section composed of the standard re-encoding section and the next GOP in stream B is divided into two or more GOPs such that each GOP satisfies N/2≤x≤N, and the two or more GOPs are provisionally set as the minimum re-encoding section in the manner as described above with reference to FIG. 5. Then, control proceeds to step S90 in FIG. 20. At this time, the GOPs may be divided such that the number of frames, A+B+C, is allocated as evenly as possible, or alternatively, the division of the GOPs may be performed based on the predetermined number of frames such that each GOP satisfies N/2≤x≤N as described above.

Figure 20:
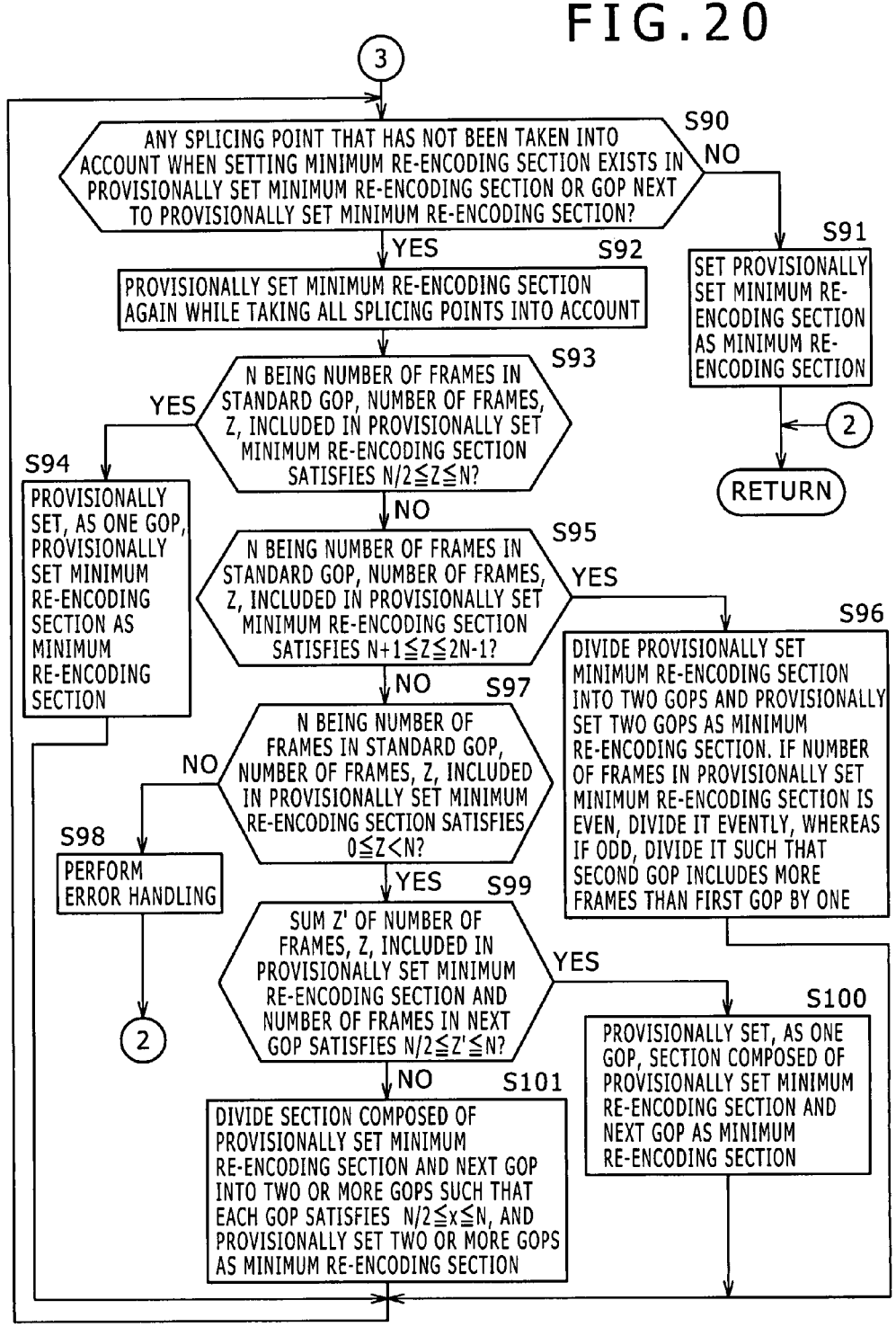

If it is determined that A+B+C satisfies N/2≤A+B+C≤N, the section composed of the standard re-encoding section and the next GOP in stream B is provisionally set, as one GOP, as the minimum re-encoding section, and control proceeds to step S90 in FIG. 20.

If it is determined at step S75 that A≥N/2 is satisfied, CPU 11 determines at step S82 whether, when the splicing point is set as a boundary between GOPs, the number of frames, B, in the GOP that is included in the standard re-encoding section and follows the splicing point satisfies N/2≤B.

If it is determined at step S82 that the number of frames, B, in the latter GOP in the standard re-encoding section satisfies N/2≤B, the CPU 11, at step S83, divides the standard re-encoding section into two GOPs at the splicing point, and provisionally sets the two GOPs as the minimum re-encoding section. Then, control proceeds to step S90 in FIG. 20.

Note that in the case where the process of step S83 is performed, in step S7 in the processing by the CPU 11 as described above with reference to FIG. 13, the CPU 11 sends, as a parameter necessary for the re-encoding, information that indicates that the I2 picture is arranged at the top (in display order) of the GOP that is included in the minimum re-encoding section and follows the splicing point (in other words, the B0 and B1 pictures are omitted) to the CPU 20 via the northbridge 12, the PCI bus 14, the PCI bridge 17, and the control bus 19.

If it is determined at step S82 that the number of frames, B, in the latter GOP in the standard re-encoding section does not satisfy N/2≤B, the CPU 11 determines at step S84 whether, when the splicing point is set as the boundary between the GOPs, the sum B+C of the number of frames, B, in the latter GOP in the standard re-encoding section and the number of frames, C, in the next GOP in stream B satisfies N/2≤B+C≤N.

If it is determined at step S84 that N/2≤B+C≤N is satisfied, the CPU 11, at step S85, provisionally sets a section composed of the standard re-encoding section and the next GOP in stream B as the minimum re-encoding section, with a part of that section that precedes the splicing point set as the first GOP and a part of that section that follows the splicing point set as the second GOP. Then, control proceeds to step S90 in FIG. 20.

If it is determined at step S84 that N/2≤B+C≤N is not satisfied, the CPU 11 determines at step S86 whether B+C satisfies N/2>B+C.

If it is determined at step S86 that N/2>B+C is not satisfied, which means B+C>N, the CPU 11, at step S87, divides the section composed of the standard re-encoding section and the next GOP in stream B into three GOPs such that the part of that section that precedes the splicing point is set as the first GOP, and the part of that section that follows the splicing point, i.e., the part composed of B+C frames, is divided into two GOPs set as the second and third GOPs, and provisionally sets these three GOPs as the minimum re-encoding section. Then, control proceeds to step S90 in FIG. 20.

If it is determined at step S86 that N/2>B+C is satisfied, the CPU 11 determines at step S88 whether or not the number of frames in the above section additionally including a next GOP in stream B is equal to or greater than N/2. If it is determined at step S88 that the number of frames in the thus extended section is smaller than N/2, the process of step S88 is repeated until it is determined that the number of frames in the additionally extended section is equal to or greater than N/2.

If it is determined at step S88 that the number of frames in the thus extended section is equal to or greater than N/2, the CPU 11, at step S89, provisionally sets the section composed of the standard re-encoding section and the plurality of GOPs in stream B added thereto as the minimum re-encoding section such that a part of that section that precedes the splicing point is set as the first GOP and a part of that section that follows the splicing point is set as the second GOP. Then, control proceeds to step S90 in FIG. 20.

After the process of step S73, step S76, step S80, step S81, step S83, step S85, step S87, or step S89, basically the same processes as those of steps S51 to S62 are performed at steps S90 to S101.

Specifically, it is determined whether any splicing point that has not been taken into account when setting the minimum re-encoding section exists in the provisionally set minimum re-encoding section or the GOP next to the provisionally set minimum re-encoding section. If it is determined that such a splicing point does not exist therein, the provisionally set minimum re-encoding section is set as the minimum re-encoding section, and control returns to step S2 in FIG. 13, and proceeds to step S3.

If it is determined that such a splicing point exists therein, the minimum re-encoding section is provisionally set again while taking all splicing points into account in the manner as described above with reference to FIG. 7. Then, if it is determined whether the number of frames, Z, included in the provisionally set minimum re-encoding section satisfies N/2≤Z≤N, where N is the number of frames in one standard GOP. If it is determined that the number of frames, Z, satisfies N/2≤Z≤N, the CPU 11, at step S94, provisionally sets, as one GOP, the provisionally set minimum re-encoding section as the minimum re-encoding section. Then, control returns to step S90, and the subsequent processes are repeated.

Meanwhile, if it is determined that the number of frames, Z, does not satisfy N/2≤Z≤N, it is determined whether the number of frames, Z, included in the provisionally set minimum re-encoding section satisfies N+1≤Z≤2N−1, where N is the number of frames in one standard GOP. If it is determined that the number of frames, Z, satisfies N+1≤Z≤2N−1, the provisionally set minimum re-encoding section is divided into two GOPs, and the two GOPs are provisionally set as the minimum re-encoding section. More specifically, in the case where the number of frames included in the provisionally set minimum re-encoding section is even, the provisionally set minimum re-encoding section is evenly divided into the two GOPs, whereas in the case where the number of frames included in the provisionally set minimum re-encoding section is odd, the provisionally set minimum re-encoding section is divided into the two GOPs such that the second GOP includes more frames than the first GOP by one frame. Then, control returns to step S90, and the subsequent processes are repeated.

If it is determined that the number of frames, Z, does not satisfy N+1≤Z≤2N−1, it is determined whether the number of frames, Z, included in the provisionally set minimum re-encoding section satisfies 0≤Z<N, where N is the number of frames in one standard GOP. If it is determined that the number of frames, Z, does not satisfy 0≤Z<N, the CPU 11 performs the error handling at step S98. Then, control returns to step S2 in FIG. 13, and proceeds to step S3.

If it is determined that the number of frames, Z, satisfies 0≤Z≤N, it is determined whether the sum Z' of the number of frames, Z, included in the provisionally set minimum re-encoding section and the number of frames in the next GOP satisfies N/2≤Z'≤N. If it is determined that Z' satisfies N/2≤Z'≤N, a section composed of the provisionally set minimum re-encoding section and the next GOP is provisionally set, as one GOP, as the minimum re-encoding section. Then, control returns to step S90, and the subsequent processes are repeated.

Meanwhile, if it is determined that Z' does not satisfy N/2≤Z'≤N, the section composed of the provisionally set minimum re-encoding section and the next GOP is divided into two or more GOPs such that each GOP satisfies N/2≤x≤N, and the two or more GOPs are provisionally set as the minimum re-encoding section. Then, control returns to step S90, and the subsequent processes are repeated.

The above-described process makes it possible, even when a plurality of splicing points exist concerning the setting of the minimum re-encoding section, to set the minimum re-encoding section appropriately in accordance with the plurality of splicing points, and provide a GOP structure that prevents unnecessary degradation of image quality based on the number of frames that constitute the GOP and the locations of the splicing points. This awakes expectations of encoding with better image quality.

Note that, in the foregoing description, in the process of step S76 or step S96, the number of frames, A+B, is divided as evenly as possible, or the division of the GOPs is performed in such a manner that a GOP has the predetermined number of frames. Here, however, the number of frames included in the standard re-encoding section may be divided as evenly as possible.

Also note that, in the foregoing description, in the above process, after the minimum re-encoding section is provisionally determined, it is determined whether any other splicing point exists in the provisionally determined minimum re-encoding section or the next GOP, and if any other splicing point exists therein, the minimum re-encoding section is set again. However, it may be so arranged, alternatively, that the standard re-encoding section is provisionally determined, and it is determined whether any other splicing point exists in the provisionally determined standard re-encoding section, and if any other splicing point exists therein, the standard re-encoding section is set again, for example. In this case, the minimum re-encoding section is provisionally determined based on the newly set standard re-encoding section, and it is determined whether any other splicing point exists in the provisionally determined minimum re-encoding section or the next GOP, and if any other splicing point exists therein, the minimum re-encoding section is set again.

Next, processing 1 by the CPU 20 performed in the two-pass encoding mode will now be described below with reference to a flowchart of FIG. 21.

Figure 13:
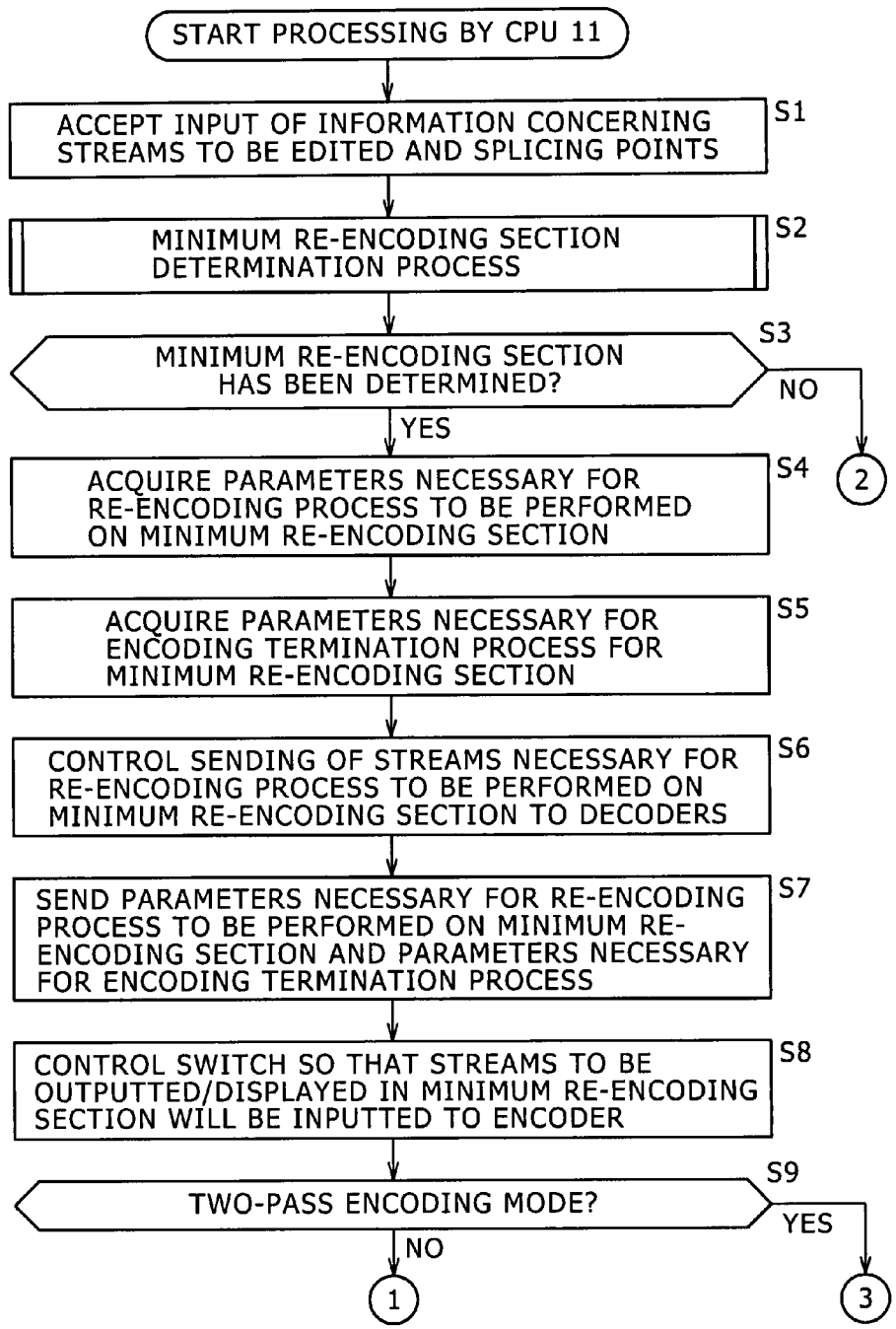
FIGS. 13 to 15 are flowcharts illustrating processing by a CPU.

At step S111, the CPU 20 acquires the parameters necessary for the re-encoding process to be performed on the minimum re-encoding section and the parameters necessary for the encoding termination process, which have been sent by the CPU 11 at step S7 in FIG. 13.

At step S112, the CPU 20 acquires a VBV starting value V1 and a VBV target value V2 of the minimum re-encoding section.

At step S113, a bit allocation determination process for the minimum re-encoding section is performed, as described below with reference to FIG. 23.

At step S114, the CPU 20 starts controlling the decoding and encoding of the minimum re-encoding section and the splicing at the splicing point based on the bit allocation determined. Suppose that stream A and stream B are spliced together at the splicing point, for example. In this case, based on the control signal sent from the CPU 11 via the northbridge 12, the PCI bus 14, the PCI bridge 17, and the control bus 19, the CPU 20 controls operations of the PCI bridge 17, the stream splicer 25, the decoder 24, and the switch 29 so that the data of the part of stream A that precedes the minimum re-encoding section will be supplied to the decoder 24 via the stream splicer 25 and outputted to the external display device or the like via the switch 29. The CPU 20 also controls operations of the PCI bridge 17, the decoder 22, the decoder 23, the effect/switch 26, the encoder 27, and the switch 29 so that the data of the minimum re-encoding section in stream A will be supplied to the decoder 22 and decoded therein. The CPU 20 further controls the operations so that the part of stream B that follows splicing point b (in the case where the part of stream B that precedes splicing point b includes a frame that is necessary for decoding the part that follows splicing point b, including that frame as well) will be supplied to the decoder 23, and the decoded streams will be spliced together at the splicing point and subjected to the application of the effect as necessary by the effect/switch 26. Thereafter the decoded streams will be outputted to the external display device or the like via the switch 29 as well as encoded by the encoder 27.

At step S115, the CPU 20 determines whether the re-encoding of the minimum re-encoding section has been completed. If it is determined that the re-encoding of the minimum re-encoding section has not been completed, the process of step S115 is repeated until it is determined that the re-encoding of the minimum re-encoding section has been completed.

If it is determined at step S115 that the re-encoding of the minimum re-encoding section has been completed, the CPU 20 determines at step S116 whether a VBV value of a re-encoding end point of the minimum re-encoding section coincides with the VBV target value.

Figure 22:
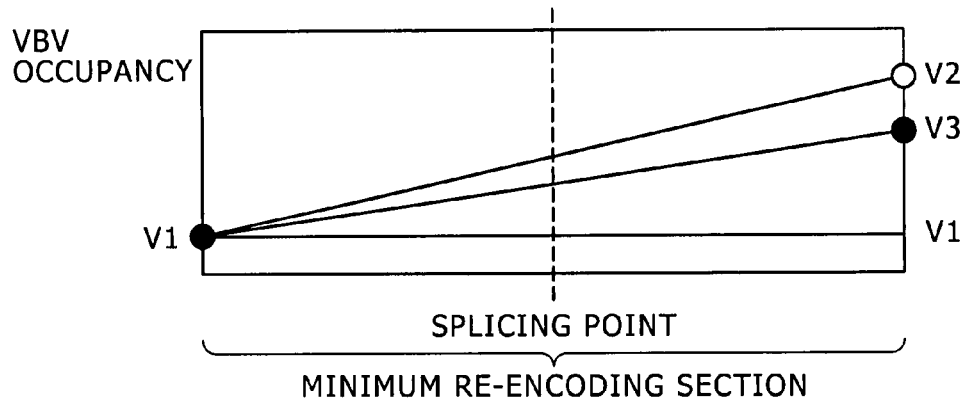
FIG. 22 is a diagram for explaining about VBV occupancy.

For example, the VBV starting value V1 and the VBV target value V2 of the minimum re-encoding section as shown in FIG. 22 are acquired at step S112. Then, it is determined whether the VBV value of the re-encoding end point is greater than the VBV target value V2.

If it is determined at step S116 that the VBV value of the re-encoding end point does not coincide with the VBV target value, the CPU 20, at step. S117, acquires a VBV end point as a result of the actual encoding and a total quantity of generated bits G in the minimum re-encoding section as parameters concerning the re-encoding process performed on the minimum re-encoding section. The VBV end point as a result of the actual encoding is denoted by V3 in FIG. 22.

At step S118, the CPU 20 obtains a difference between the VBV target value and the VBV end value.

Specifically, referring to FIG. 22, based on the VBV starting value V1 and the VBV target value V2 in the minimum re-encoding section, the VBV end point V3 as a result of the actual encoding, and the total quantity of generated bits G in the minimum re-encoding section, the CPU 20 sets V2−V3 as security for an increased amount of the VBV buffer.

At step S119, based on the difference between the VBV target value and the VBV end value obtained at step S118, the CPU 20 re-calculates the quantity of generated bits, and control returns to step S114, and the subsequent processes are repeated.

Specifically, in the case where the minimum re-encoding section is encoded again considering the increased amount of the VBV buffer, V2−V3, the CPU 20 uses G'=G−(V2−V3)−Δ in calculating a target value of generated bits in TM5. Here, Δ0 denotes a margin to be considered in each device in consideration of the image quality.

Figure 25:
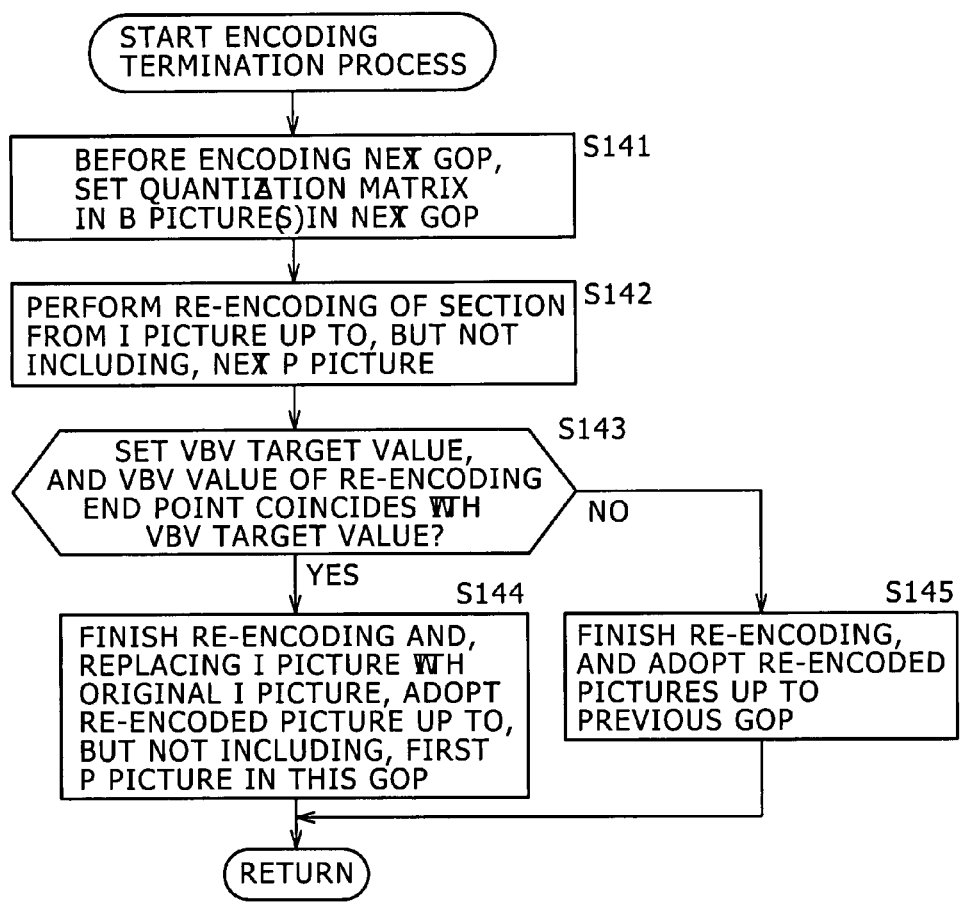
FIG. 25 is a flowchart illustrating the encoding termination process.

If it is determined at step S116 that the VBV value at the re-encoding end point coincides with the VBV target value, i.e., if it is determined that the continuity in the occupancy has been maintained, an encoding termination process described below with reference to FIG. 25 is performed at step S120, and the process is finished.

In accordance with the above process, it is determined whether the VBV value at the end point of the re-encoding section coincides with the VBV target value, and when it does not coincide with the VBV target value, the re-encoding of the minimum re-encoding section is performed again based on the result of the first encoding. Therefore, in the second encoding, it is very probable that the bit allocation will be determined so that the VBV value at the end point of the re-encoding section will coincide with the VBV target value as a result of the re-encoding process.

Figure 23:
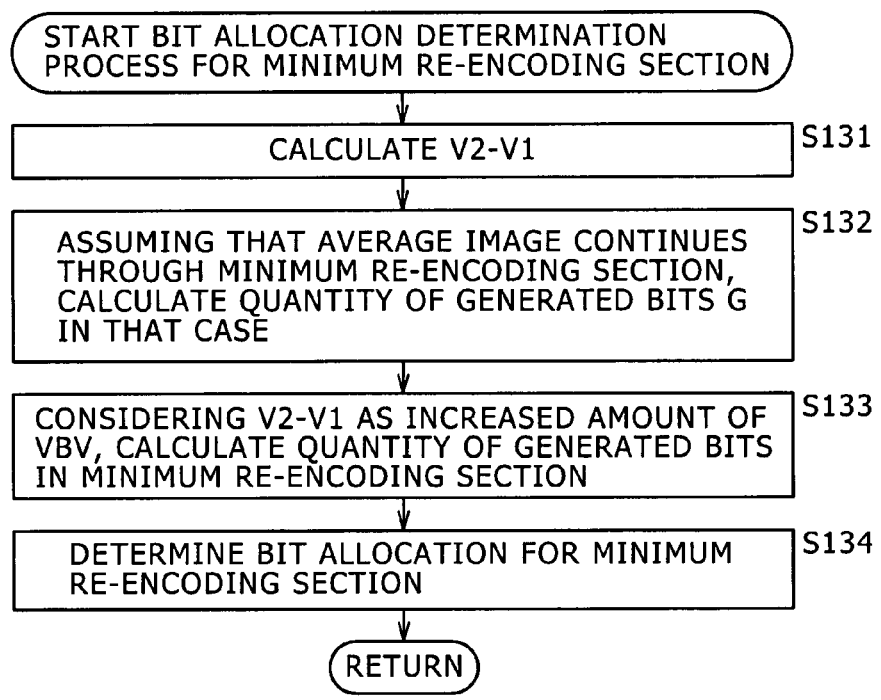
FIG. 23 is a flowchart illustrating a bit allocation determination process for the minimum re-encoding section.

Note that it is assumed here that the bit allocation determination process for the minimum re-encoding section, which will be described below with reference to FIG. 23, is performed at step S113 to determine the bit allocation. However, any method may be used to determine the bit allocation as long as the bit allocation for the minimum re-encoding section can be determined in relation to the VBV target value V2.

Also note that it is assumed here that when the VBV target value has not been reached as a result of the first re-encoding process on the minimum re-encoding section, the minimum re-encoding section is re-encoded again. However, in the case where the minimum re-encoding section is composed of a plurality of GOPs, instead of repeating the re-encoding of all the GOPs, only the last GOP or GOPs may be re-encoded again with the bit allocation changed.

Next, the bit allocation determination process for the minimum re-encoding section performed at step S113 in FIG. 21 will now be described below with reference to a flowchart of FIG. 23.

At step S131, based on the VBV starting value V1 and the VBV target value V2 in the minimum re-encoding section acquired at step S112, the CPU 20 calculates V2−V1.

At step S132, the CPU 20 assumes that an average image continues through the minimum re-encoding section, and calculates the quantity of generated bits G in that case.

Specifically, when the minimum re-encoding section including the splicing point is encoded from a VBV start point to the VBV target point, no prior result exists concerning the encoding process on this section, and therefore, there is no basis available for inferring a value that the VBV occupancy will reach at the end point of the minimum re-encoding section. Therefore, it is not easy to infer the VBV end point at the encoding end point. Accordingly, referring to FIG. 24, the CPU 20 assumes that pictures included in the minimum re-encoding section represent the average image, i.e., that the VBV end point will be V1, and calculates the quantity of generated bits G in that case.

Then, at step S133, considering V2−V1 as the increased amount of the VBV, the CPU 20 calculates the quantity of generated bits in the minimum re-encoding section.

Figure 24:
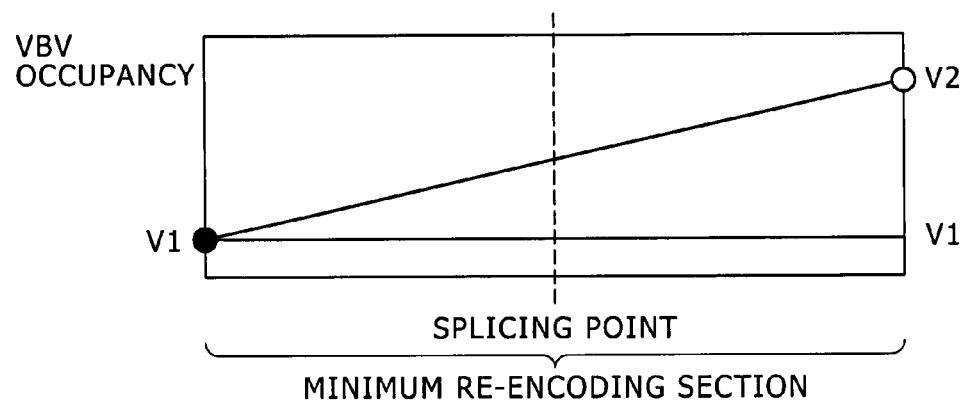
FIG. 24 is a diagram for explaining about the VBV occupancy.

Specifically, on the assumption that the pictures included in the minimum re-encoding section represent the average image, the CPU 20 secures V2−V1 as shown in FIG. 24 as the increased amount of the VBV based on the VBV starting value V1 and the VBV target value V2 in the minimum re-encoding section acquired at step S112. Then, the CPU 20 obtains G'=G−(V2−V1)−Δ in calculating the target value of generated bits in TM5. Here, Δ denotes the margin to be considered in each device in consideration of the image quality.

Figure 21:
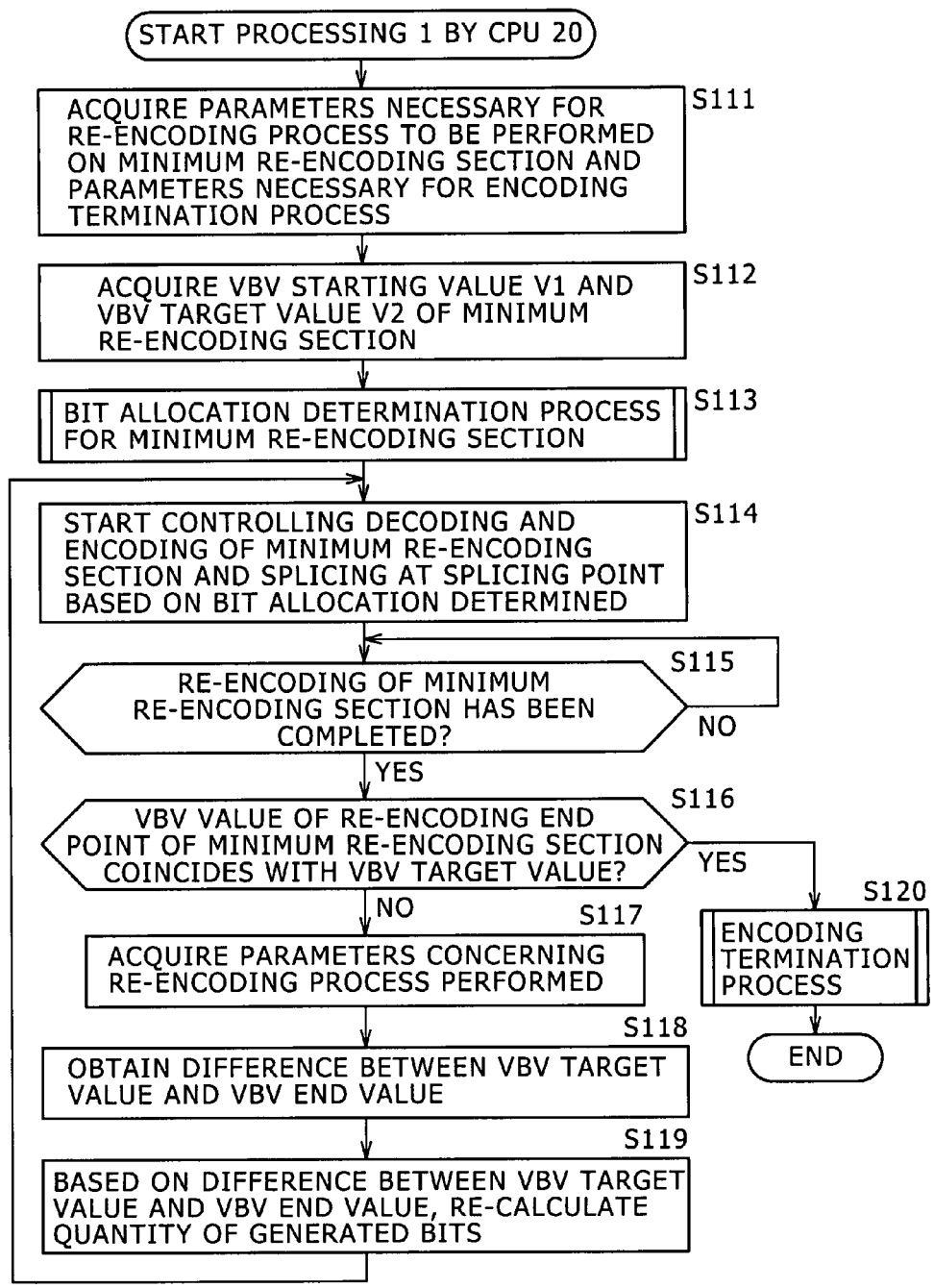
FIG. 21 is a flowchart illustrating first processing by a CPU.

Then, at step S134, based on the quantity of generated bits obtained at step S133, the CPU 20 determines the bit allocation for the minimum re-encoding section, and control returns to step S113 in FIG. 21 and proceeds to step S114.

In accordance with the above process, the allocation of the quantity of generated bits in the first re-encoding of the minimum re-encoding section is determined. Thus, regardless of whether the value of V2−V1 is positive or negative, a more appropriate quantity of generated bits is assigned to the value of G in calculating the target value of generated bits in TM5 than when it is assumed that the pictures included in the minimum re-encoding section represent the average image. This makes it possible to reduce the degradation of image quality while preventing buffer underflow.

Next, the encoding termination process performed at step S120 in FIG. 21 will now be described below with reference to a flowchart of FIG. 25.

At step S141, before encoding the next GOP, the CPU 20 sets the quantization matrix in the B picture(s) in the next GOP.

At step S142, the CPU 20 performs the re-encoding of the section from the I picture up to, but not including, the next P picture.

At step S143, the CPU 20 sets the VBV target value at the VBV value of the frame immediately preceding the first P picture of the next GOP, and determines whether the VBV value of the re-encoding end point coincides with the VBV target value. At this time, the determination of whether the VBV value of the re-encoding end point coincides with the VBV target value is performed using the quantity of bits of the I picture in the original stream (e.g., stream B as shown in FIG. 4 and so on).

If it is determined at step S143 that the VBV value of the re-encoding end point coincides with the VBV target value, i.e., if it is determined that the continuity in the occupancy has been maintained, the CPU 20, at step S144, finishes the re-encoding and controls relevant parts of the editing apparatus 1 so that the re-encoded pictures up to, but not including, the first P picture in this GOP will be adopted for the edited image, replacing the I picture with the I picture in the original stream (e.g., stream B as shown in FIG. 4 and so on). Then, control returns to step S120 in FIG. 21, and the process is finished.

If it is determined at step S143 that the VBV value of the re-encoding end point does not coincide with the VBV target value, the CPU 20, at step S145, finishes the re-encoding. The CPU further performs a process of adopting the re-encoded pictures up to the previous GOP, i.e., adopting for the edited image the one or more B pictures arranged before the first P picture in original stream B supplied to the stream splicer 25 (in other words, discarding the result of the re-encoding of the section from the I picture up to, but not including, the next P picture, which has been performed at step S142). Then, control returns to step S120 in FIG. 21, and the process is finished.

In accordance with the above process, in the case where the VBV becomes continuous at the boundary between the GOPs, the section subjected to the re-encoding is extended to the frame immediately preceding the next P picture, and the re-encoding is controlled so that the VBV will be continuous at the end point of that section subjected to the re-encoding. Then, when the VBV becomes continuous at the next P picture, the B picture(s) arranged before the first P picture in the next GOP is added as edited data.

Next, processing 2 by the CPU 20 in the extension re-encoding section setting mode will now be described below with reference to a flowchart of FIG. 26.

At step S151, the CPU 20 acquires the parameters necessary for the re-encoding process to be performed on the minimum re-encoding section and the parameters necessary for the encoding termination process, which have been sent by the CPU 11 at step S7 in FIG. 13.

At step S152, the CPU 20 acquires the VBV starting value V1 and the VBV target value V2 in the minimum re-encoding section.

At step S153, the bit allocation determination process for the minimum re-encoding section, which has been described above with reference to FIG. 23, is performed.

At step S154, the CPU 20 starts controlling the decoding and encoding of the minimum re-encoding section and the splicing at the splicing point based on the bit allocation determined. Suppose that stream A and stream B are spliced together at the splicing point, for example. In this case, based on the control signal sent from the CPU 11 via the northbridge 12, the PCI bus 14, the PCI bridge 17, and the control bus 19, the CPU 20 controls operations of the PCI bridge 17, the stream splicer 25, the decoder 24, and the switch 29 so that the data of the part of stream A that precedes the minimum re-encoding section will be supplied to the decoder 24 via the stream splicer 25 and outputted to the external display device or the like via the switch 29. The CPU also controls operations of the PCI bridge 17, the decoder 22, the decoder 23, the effect/switch 26, the encoder 27, and the switch 29 so that the data of the minimum re-encoding section in stream A will be supplied to the decoder 22 and decoded therein. The CPU controls the operations so that the part of stream B that follows splicing point b (in the case where the part of stream B that precedes splicing point b includes a frame that is necessary for decoding the part that follows splicing point b, including that frame as well) will be supplied to the decoder 23, and the decoded streams will be spliced together at the splicing point and subjected to the application of the effect as necessary by the effect/switch 26. Thereafter the decoded streams will be outputted to the external display device or the like via the switch 29 as well as encoded by the encoder 27.

Figure 14:
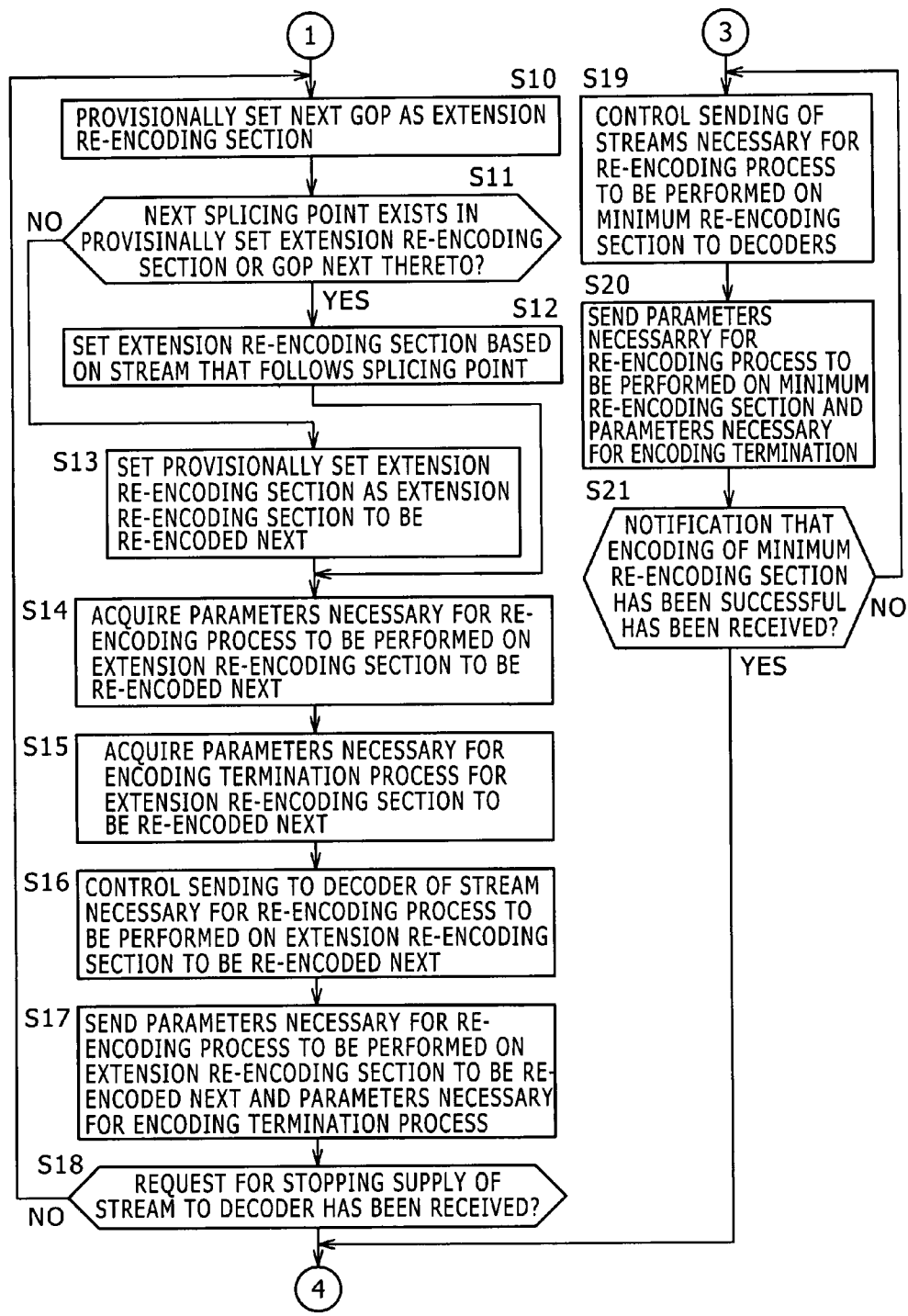
Figure 15:
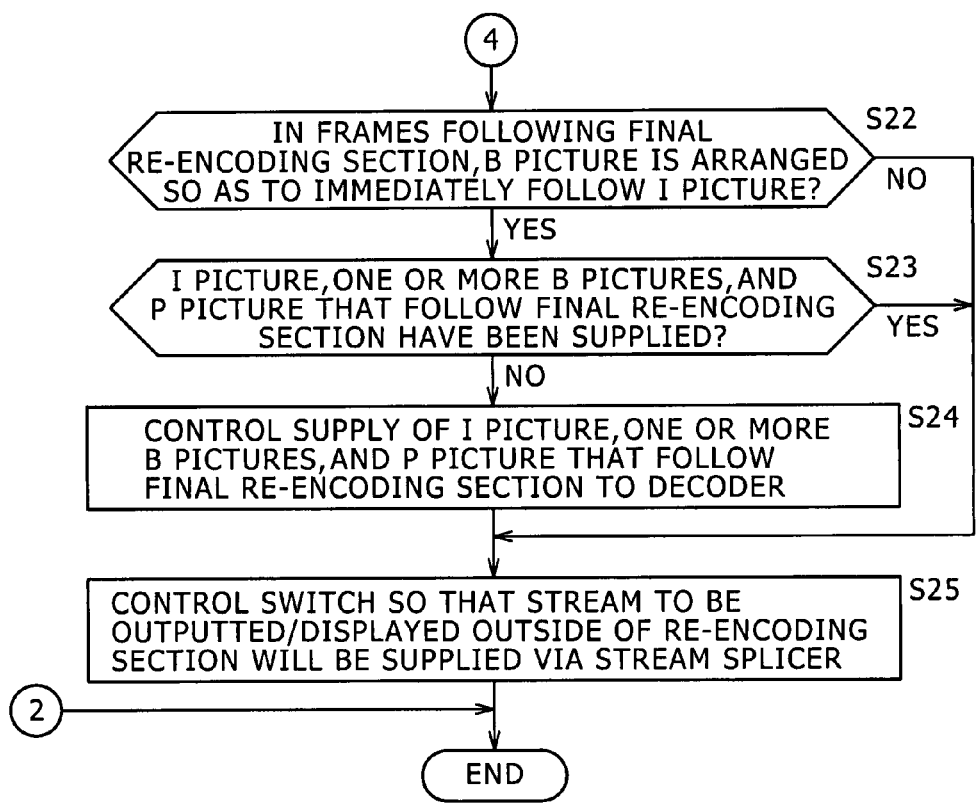

At step S155, the CPU 20 acquires the parameters necessary for the re-encoding process to be performed on the extension re-encoding section and the parameters necessary for the encoding termination process, which have been sent by the CPU 11 at step S17 in FIG. 14.

At step S156, the CPU 20 acquires a VBV starting value V1' and a VBV target value V2' of the extension re-encoding section.

At step S157, the CPU 20 determines whether the re-encoding of the currently set re-encoding section (in a first iteration of a process of step S157, for example, the minimum re-encoding section; and in a subsequent iteration of the process of step S157, the extension re-encoding section) has been completed. If it is determined at step S157 that the re-encoding of the currently set section has not been completed, the process of step S157 is repeated until it is determined that the re-encoding of the currently set section has been completed.

If it is determined at step S157 that the re-encoding of the currently set section has been completed, the CPU 20 determines at step S158 whether the VBV value of the re-encoding end point coincides with the VBV target value.

Figure 27:
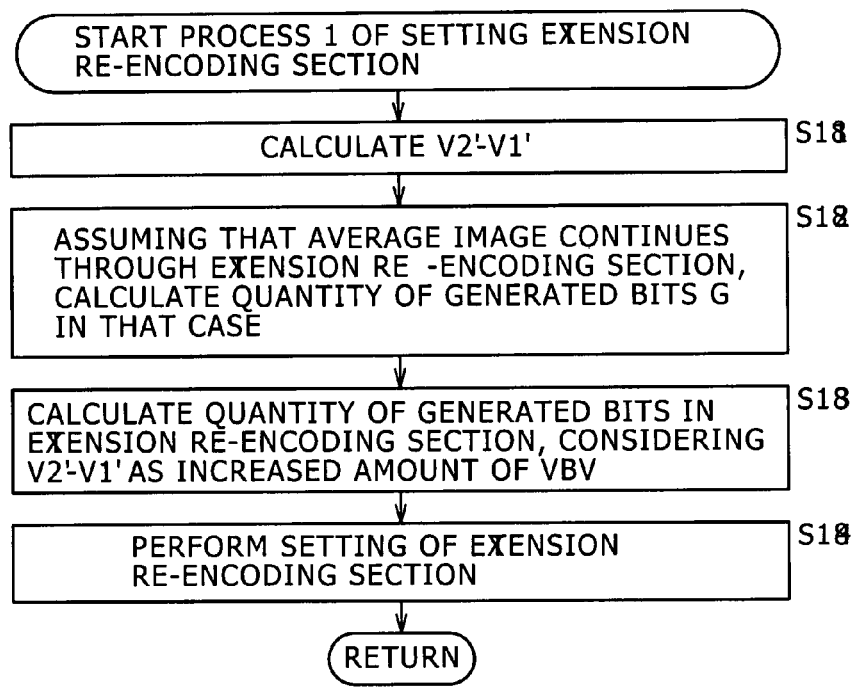
FIG. 27 is a flowchart illustrating first process of setting an extension re-encoding section.
Figure 29:
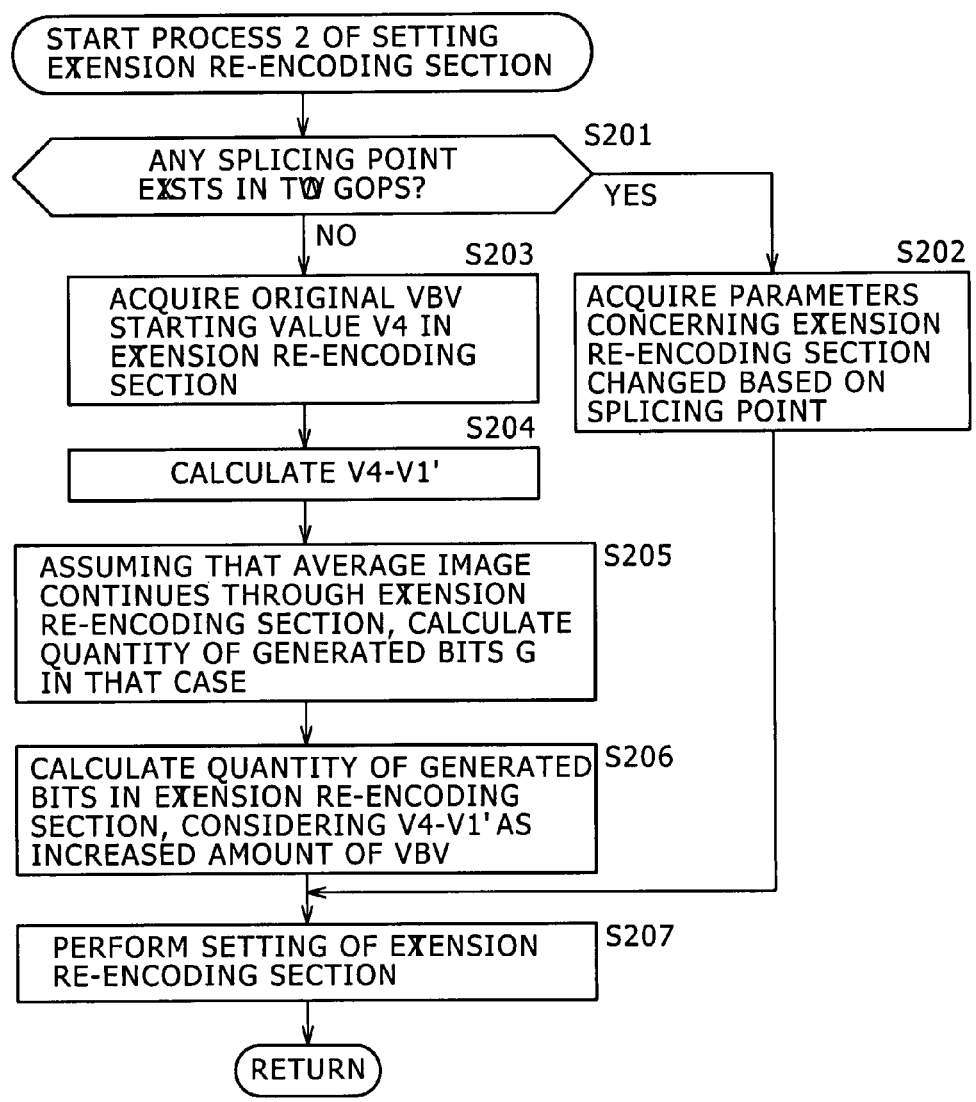
FIG. 29 is a flowchart illustrating second process of setting the extension re-encoding section.

If it is determined at step S158 that the VBV value of the re-encoding end point does not coincide with the VBV target value, a process of setting the extension re-encoding section, which will be described below with reference to FIG. 27 or FIG. 29, is performed at step S159.

At step S160, the CPU 20 controls start of the decoding and encoding of the extension re-encoding section that is to be re-encoded next based on bit allocation for the next extension re-encoding section determined at step S159. Then, control returns to step S155, and the subsequent processes are repeated.

If it is determined at step S158 that the VBV value of the re-encoding end point coincides with the VBV target value, i.e., if it is determined that the continuity in the occupancy has been maintained, the encoding termination process as described above with reference to FIG. 25 is performed at step S161, and the process is finished.

In accordance with the above process, it is determined whether the VBV value at the end point of the re-encoding section coincides with the VBV target value, and when it does not coincide with the VBV target value, the re-encoding section is extended without retrying the re-encoding. Thus, responsivity is improved when the edited image is displayed in real time at the time of editing, for example.

Moreover, because the information necessary for the re-encoding of the extension re-encoding section that is to be re-encoded next is acquired before the process for the previous re-encoding section is completed, the process does not suffer a delay even when the re-encoding section is extended.

Next, process 1 of setting the extension re-encoding section, which is a first example of the process performed at step S159 in FIG. 26, will now be described below with reference to a flowchart of FIG. 27.

In process 1 of setting the extension re-encoding section, the same process is performed regardless of whether any splicing point exists in the current extension re-encoding section or the next GOP.

At step S181, the CPU 20 calculates V2'−V1' based on the VBV starting value V1' and the VBV target value V2' in the extension re-encoding section, which have been acquired at step S156.

At step S182, the CPU 20 assumes that an average image continues through the extension re-encoding section, and calculates the quantity of generated bits G in that case.

Specifically, in the same manner as in the case of the minimum re-encoding section, the CPU 20 calculates the quantity of generated bits G' considering the increased amount of the VBV buffer, based on the quantity of generated bits G on the assumption that the pictures included in the extension re-encoding section represent the average image, i.e., that the VBV value of the re-encoding end point will be V1'.

Then, at step S183, the CPU 20 calculates the quantity of generated bits in the extension re-encoding section, considering V2'−V1' as the increased amount of the VBV.

Figure 28:
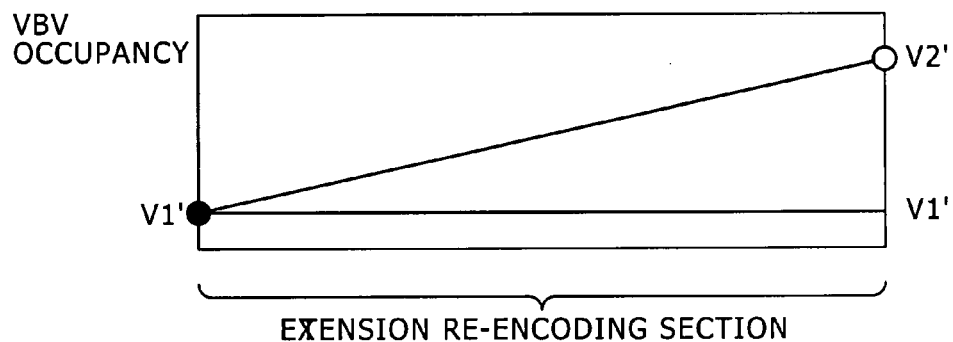
FIG. 28 is a diagram for explaining about the VBV occupancy.

Specifically, on the assumption that the pictures included in the extension re-encoding section represent the average image, the CPU 20 secures V2'−V1', i.e., V2'−V1' as shown in FIG. 28, as the increased amount of the VBV based on the VBV starting value V1' and the VBV target value V2' in the extension re-encoding section acquired at step S156. Then, the CPU 20 obtains G'=G−(V2'−V1')−Δ in calculating the target value of generated bits in TM5. Here, Δ denotes the margin to be considered in each device in consideration of the image quality.

Figure 26:
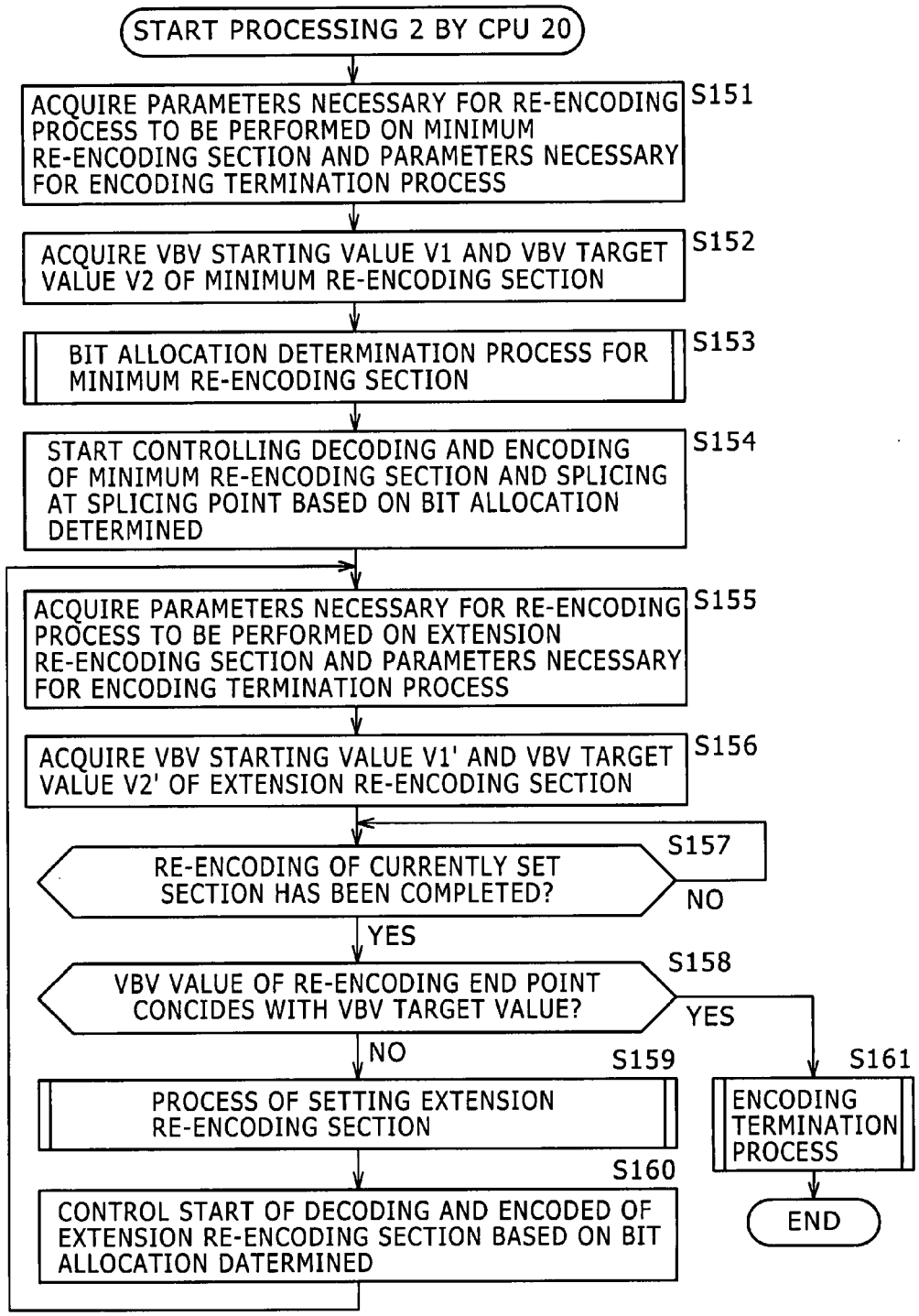
FIG. 26 is a flowchart illustrating second processing by the CPU.

At step S184, based on the parameters necessary for the re-encoding process to be performed on the extension re-encoding section that is to be encoded next, and the parameters necessary for the encoding termination process, which have been acquired at step S155 in FIG. 26, and the quantity of generated bits G' in the extension re-encoding section obtained at step S183, the CPU 20 determines the bit allocation and performs a setting for re-encoding of the extension re-encoding section. Then, control returns to step S159 in FIG. 26, and proceeds to step S160.

In accordance with the above process, the allocation of the quantity of bits in the extension re-encoding section is achieved.

Here, in the case where no splicing point exists in the extension re-encoding section, there is a prior encoding result, from an original VBV start point to an original VBV target point, of encoding a part of original stream B that follows the splicing point. Thus, when no splicing point exists in the extension re-encoding section, it is preferable that this prior encoding result be used to calculate the quantity of generated bits. For example, by making quantization coarser than in the case of the prior encoding result of the original encoding, it is possible to achieve bit allocation such that the buffer occupancy shifts from the start point of the extension re-encoding section, which has a lower value of the VBV occupancy than the original VBV start point, to the original VBV target point. On the other hand, when the splicing point exists in the extension re-encoding section, the prior encoding result of the original encoded stream cannot be used.

Next, process 2 of setting the extension re-encoding section, which is a second example of the process performed at step S159 in FIG. 26, will now be described below with reference to a flowchart of FIG. 29.

In process 2 of setting the extension re-encoding section, in contrast to process 1 of setting the extension re-encoding section, different processes are performed depended on whether any splicing point exists in the current extension re-encoding section or the next GOP.

At step S201, the CPU 20 determines whether any splicing point exists in the two GOPs that immediately follow the end point of the previous re-encoding section, i.e., the GOP provisionally set in the extension re-encoding section and a GOP next thereto. In other words, the CPU 20 determines whether the extension re-encoding section has been set again based on the splicing point. If it is determined at step S201 that no splicing point exists therein, control proceeds to step S203, which will be described below.

If it is determined at step S201 that any splicing point exists therein, the CPU 20, at step S202, acquires parameters concerning the extension re-encoding section that has been newly set based on the splicing point. Then, control proceeds to step S207, which will be described below.

If it is determined at step S201 that no splicing point exists therein, the CPU 20, at step S203, acquires a value V4 of the buffer occupancy of the original VBV start point in the extension re-encoding section from the CPU 11 via the northbridge 12, the PCI bus 14, the PCI bridge 17, and the control bus 19.

Figure 30:
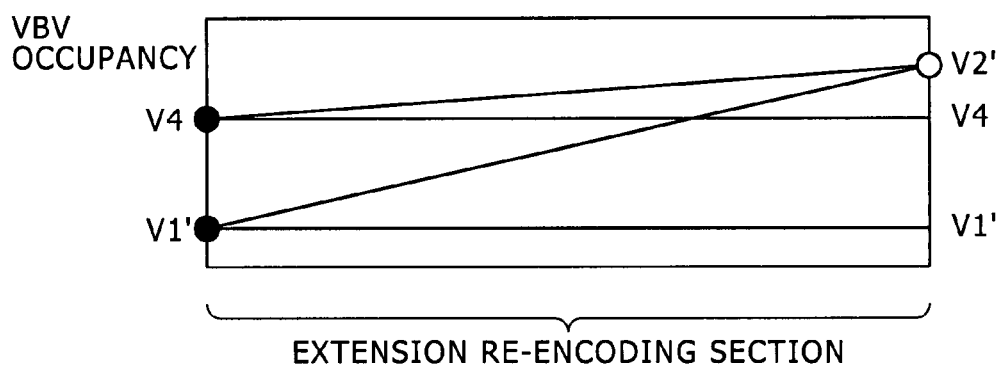
FIG. 30 is a diagram for explaining about the VBV occupancy.

Specifically, referring to FIG. 30, assume that the buffer occupancy of a VBV start point in an original GOP corresponding to the extension re-encoding section, i.e., a corresponding section in the encoded stream that is the editing material following the splicing point, is V4. Also assume that the buffer occupancy of the VBV start point at the time of re-encoding, i.e., the re-encoding end point in the section immediately preceding the extension re-encoding section, is V1'. Also assume that the VBV target point of the GOP that is the extension re-encoding section is V2'. Then, there is a prior result that the buffer occupancy has been changed from V4 to V2' when encoding the corresponding GOP in the original stream corresponding to the extension re-encoding section. In this process, this prior result of encoding is used to set the bit allocation.

At step S204, the CPU 20 calculates V4-V1' based on the VBV starting value V1' of the extension re-encoding section acquired at step S156 and the value V4 of the buffer occupancy of the original VBV start point in the extension re-encoding section acquired at step S203.

At step S205, similarly to the process of step S132 in FIG. 27, the CPU 20 assumes that the average image continues through the extension re-encoding section, and calculates the quantity of generated bits G in that case.

Then, at step S206, the CPU 20 calculates the quantity of generated bits in the extension re-encoding section, considering V4−V1' as the increased amount of the VBV.

Specifically, based on the prior result that the buffer occupancy has been changed from V4 to V2' as a result of encoding the corresponding GOP in the original stream corresponding the extension re-encoding section, i.e., stream B that is the editing material, the CPU 20 secures V4−V1', i.e., V4−V1' as shown in FIG. 30, as the increased amount of the VBV. Then, the CPU 20 calculates G''=G−(V4−V1')−Δ in calculating the target value of generated bits in TM5. Here, Δ denotes a margin to be considered in each device in consideration of the image quality.

After the process of step S202 or step S206, based on the parameters necessary for the re-encoding process to be performed on the extension re-encoding section to be encoded next and the parameters necessary for the encoding termination process, which have been acquired at step S155 in FIG. 26, and the quantity of generated bits G'' in the extension re-encoding section calculated at step S206, the CPU 20 determines the bit allocation and performs the setting for re-encoding the extension re-encoding section at step S207. Then, control returns to step S159 in FIG. 26, and proceeds to step S160.

In accordance with the above process, in the case where the extension re-encoding section is not set again based on the splicing point, i.e., in the case where the extension re-encoding section is composed of only a single stream, the allocation of the quantity of generated bits for the extension re-encoding section is determined using the original VBV values in the extension re-encoding section. Thus, regardless of whether the value of V4−V1' is positive or negative, a more appropriate quantity of generated bits is assigned to the value of G in calculating the target value of generated bits in TM5 than when it is assumed that the pictures included in the minimum re-encoding section represent the average image. This makes it possible to reduce the degradation of image quality while preventing buffer underflow.

Meanwhile, in the case where the extension re-encoding section is set again based on the splicing point, i.e., in the case where the extension re-encoding section is composed of a plurality of streams, the setting of the extension re-encoding section is performed based on the parameters concerning the extension re-encoding section newly set based on the splicing point, such as the VBV occupancy of the end point of the extension re-encoding section, etc.

The foregoing description refers to an exemplary case where MPEG is used as a codec system. However, it is to be appreciated that the present invention is also applicable to a case where a codec process involving frame correlation is performed and a case where a codec process is performed in accordance with buffer modeling. For example, the present invention is applicable to AVC (Advanced Video Coding)/H.264 and the like.

The above-described series of processes can be implemented by software. In this case, a program that constitute the software is installed from a storage medium into a computer that has a dedicated hardware configuration, a general-purpose personal computer that, when various programs are installed therein, becomes capable of performing various functions, or the like. In this case, the editing apparatus 1 as described above with reference to FIG. 3 is formed by a personal computer 301 as illustrated in FIG. 31, for example.

Figure 31:
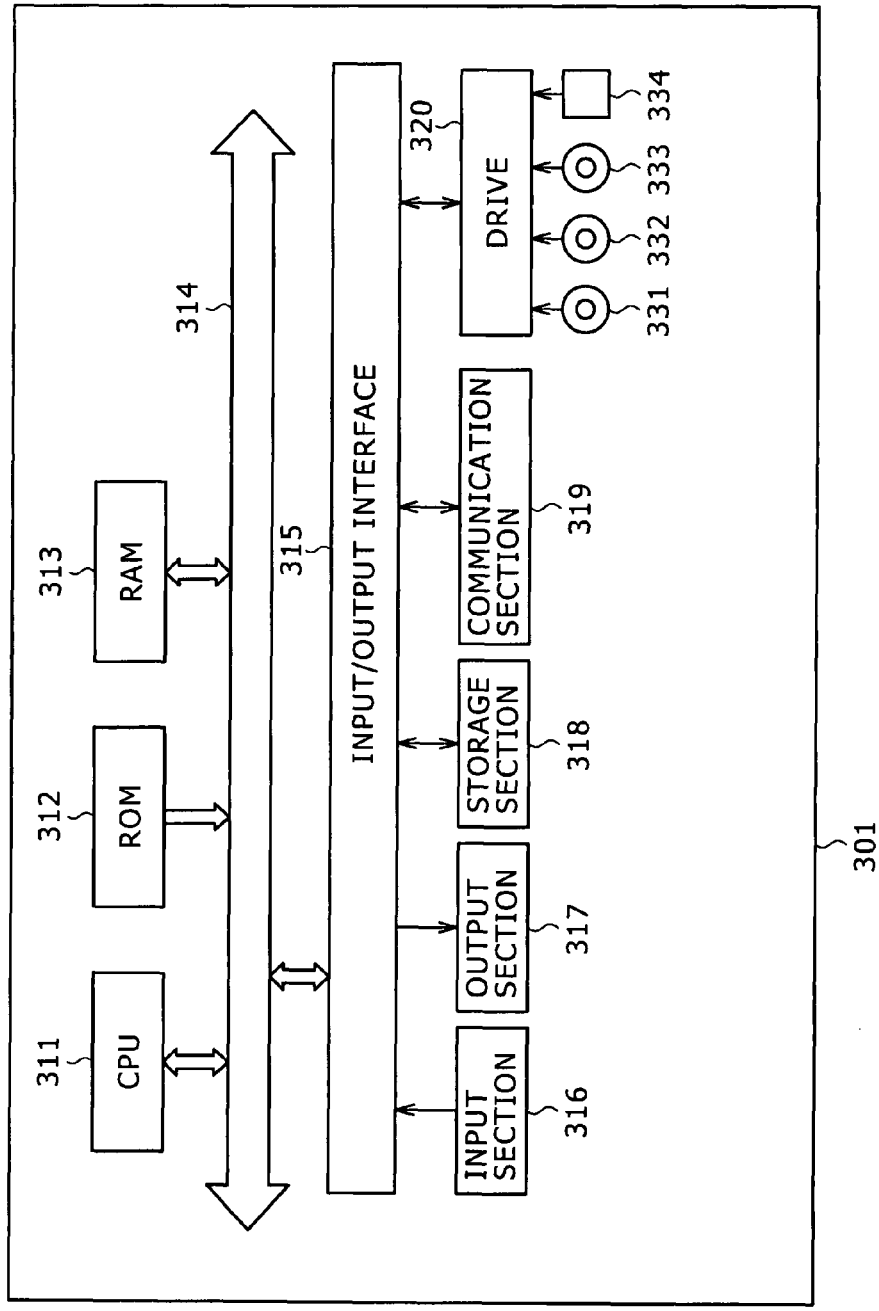
FIG. 31 is a block diagram illustrating a structure of a personal computer.

In FIG. 31, a central processing unit (CPU) 311 performs various processes in accordance with a program stored in a read only memory (ROM) 312, or a program loaded from a storage section 318 to a random access memory (RAM) 313. In the RAM 313, data necessary for the CPU 311 to perform the various processes, and the like are also stored as necessary.

The CPU 311, the ROM 312, and the RAM 313 are connected to one another via a bus 314. An input/output interface 315 is also connected to the bus 314.

To the input/output interface 315 are connected: an input section 316 formed by a keyboard, a mouse, or the like; an output section 317 formed by a display, a loudspeaker, or the like; the storage section 318 formed by a hard disk or the like; and a communication section 319 formed by a modem, a terminal adapter, or the like. The communication section 319 performs a communication process via a network including the Internet.

A drive 320 is also connected to the input/output interface 315 as necessary. A magnetic disk 331, an optical disk 332, a magneto-optical disk 333, a semiconductor memory 334, or the like is mounted on the drive 320 as appropriate, and a computer program read therefrom is installed into the storage section 318 as necessary.

In the case where the series of processes are implemented by the software, the program that constitute the program is installed from the network or the storage medium into the computer that has the dedicated hardware configuration, the general-purpose personal computer that, when the various programs are installed therein, becomes capable of performing the various functions, or the like.

Referring to FIG. 31, this storage medium may be formed by a packaged medium having the program stored therein and which is delivered, separately from a body of the apparatus, to provide the program to the user. Examples of the packaged medium include the magnetic disk 331 (including a floppy disk), the optical disk 332 (including a CD-ROM (Compact Disk-Read Only Memory) and a DVD (Digital Versatile Disk)), the magneto-optical disk 333 (including an MD (Mini-Disk)®, and the semiconductor memory 334. In addition, the storage medium may also be formed by the ROM 312 that stores the program, the hard disk contained in the storage section 318, and the like, which are contained in the body of the apparatus and thus provided to the user.

Note that the steps implemented by the program stored in the storage medium and described in the present specification may naturally be performed chronologically in order of description but need not be performed chronologically. Some steps may be performed in parallel or independently of one another.

Note that in the above-described embodiment, the editing apparatus 1 contains both the decoders and the encoder. However, the present invention is also applicable to the case where the decoders and the encoder are provided as mutually independent devices. For example, as illustrated in FIG. 32, a decoding apparatus 371 that decodes stream data and converts it into a baseband signal, and an encoding apparatus 372 that encodes a baseband signal and converts it into stream data may be provided as mutually independent devices.

In this case, the decoding apparatus 371 is not only capable of decoding the compression-coded data, which is the video material, and supplying it to the encoding apparatus 372, but also capable of accepting supply of edited compression-coded data generated by the encoding apparatus 372 by partial encoding and edition in accordance with the present invention, and decoding the edited compression-coded data to convert it into the baseband signal. The baseband signal obtained from the conversion, i.e., an edited stream, is, for example, supplied to a specified display device for display, or outputted to another device to be subjected to a necessary process.

Also note that the present invention is also applicable to a case where the decoders 22 to 24 do not decode the supplied compression-coded data completely, and the corresponding encoder 27 partially encodes a relevant part of the incompletely decoded data.

For example, in the case where the decoders 22 to 24 have performed only decoding and inverse quantization on a VLC code without performing inverse DCT transform, the encoder 27 performs quantization and variable-length encoding but does not perform DCT transform. Needless to say, the present invention is also applicable to an encoder that performs such partial encoding (i.e., encoding from a midway stage).

Furthermore note that the present invention is also applicable to a case where the encoder 27 encodes the baseband signal completely decoded by the decoders 22 to 24 to a midway stage (for example, a case where the encoder 27 performs the DCT transform and the quantization but does not perform the variable-length encoding). The present invention is still further applicable to a case where data that has been encoded to a midway stage since the decoders 22 to 24 have not decoded the data completely (for example, the decoders 22 to 24 have performed only the decoding and the inverse quantization on the VLC code without performing the inverse DCT transform) is encoded by the encoder 27 to a further midway stage (for example, the quantization is performed without the variable-length encoding being performed).

Also note that the present invention is also applicable to a case where the decoding apparatus 371 as illustrated in FIG. 32 does not decode the supplied stream data completely, and the corresponding encoding apparatus 372 partially encodes a relevant part of the incompletely decoded data.

For example, in the case where the decoding apparatus 371 has performed only the decoding and the inverse quantization on the VLC code without performing the inverse DCT transform, the encoding apparatus 372 performs the quantization and the variable-length encoding without performing the DCT transform. Needless to say, the present invention is also applicable to a decoding process by the decoding apparatus 371 that performs such partial decoding (i.e., decoding up to a midway stage) and an encoding process by the encoding apparatus 372 that performs such partial encoding (i.e., encoding from a midway stage).

Also note that the present invention is also applicable to a case where the encoding apparatus 372 encodes a baseband signal completely decoded by the decoding apparatus 371 to a midway stage (for example, the encoding apparatus 372 performs the DCT transform and the quantization but does not perform the variable-length encoding). The present invention is further applicable to a case where data that has been encoded to a midway stage since the decoding apparatus 371 has not decoded the data completely (for example, the decoding apparatus 371 has performed only the decoding and the inverse quantization on the VLC code without performing the inverse DCT transform) is encoded by the encoding apparatus 372 to a further midway stage (for example, the quantization is performed without the variable-length encoding being performed).

Also note that the present invention is also applicable to a transcoder 381 that includes the decoding apparatus 371 that performs such partial decoding (i.e., performs some of the steps of the decoding process) and the encoding apparatus 372 that performs such partial encoding (i.e., performs some of the steps of the encoding process). The transcoder 381 is used, for example, when an editing apparatus 382 that performs edition such as splicing, i.e., an editing apparatus that has functions executable by the stream splicer 25 and the effect/switch 26 in the above-described editing apparatus 1, is used.

Also note that, in the above-described embodiment, the CPU 11 and the CPU 20 are provided as separate units. However, the CPU 11 and the CPU 20 may be provided as a single CPU that controls the whole of the editing apparatus 1. Similarly, in the above-described embodiment, the memory 13 and the memory 21 are provided as separate units. However, the memory 13 and the memory 21 may be provided as a single memory in the editing apparatus 1.

Also note that, in the above-described embodiment, the HDD 16, the decoders 22 to 24, the stream splicer 25, the effect/switch 26, the encoder 27, the input terminal 28, and the switch 29 are connected to one another via the bridges and the bus to form the editing apparatus as an integrated unit. However, this is not limited to the present invention. Alternatively, some of those components may be provided outside of the editing apparatus and connected thereto in a wired or wireless manner, for example. These components may be connected to one another in other various modes of connection.

Also note that it has been assumed in the above-described embodiment that the compressed materials used for edition are stored in the HDD. However, this is not limited to the present invention. The present invention is also applicable to a case where the editing process is performed using materials to be used for edition stored in various storage media, such as the optical disk, the magneto-optical disk, the semiconductor memory, the magnetic disk, and the like, for example.

Also note that the decoders 22 to 24, the stream splicer 25, the effect/switch 26, the encoder 27, the input terminal 28, and the switch 29 in the above-described embodiment need not be mounted on the same expansion card (e.g., a PCI card, a PCI-Express card, etc.), but may be mounted on separate expansion cards when the rate of transfer between the cards is high because of a technology such as PCI-Express, for example.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus that performs a process of splicing a plurality of encoded streams together at a splicing point, said apparatus comprising:
one or more circuits configured to:
determine a section to be subjected to re-encoding in said plurality of encoded streams;
decode said plurality of encoded streams to generate a plurality of baseband signals; and
encode an edited baseband signal generated by splicing said plurality of baseband signals together at said splicing point to generate an edited encoded stream,
provisionally determine a first section to be subjected to re-encoding in a first encoded stream and a second encoded stream of said plurality of encoded streams to be spliced together at a first splicing point,
when a second splicing point different from said first splicing point exists in said provisionally determined first section or a predetermined section that follows said first section, determine a second section to be subjected to re-encoding based on said second splicing point,
wherein, said first encoded stream and said second encoded stream are spliced together at said first splicing point and said second encoded stream and a third encoded stream are spliced together at said second splicing point;
extend said second section to a predetermined location in said third encoded stream when said second section comprises a third splicing point, wherein a video buffer verifier (VBV) target value in an encoding of said second section is changed to a VBV occupancy corresponding to said predetermined location in said third encoded stream; and
wherein said one or more circuits are configured to perform said encoding in accordance with a moving picture experts group (MPEG) long group of pictures (GOP) format and said predetermined section is a section corresponding to one GOP.

2. The information processing apparatus according to claim 1, wherein when said second splicing point does not exist in said first section or said predetermined section that follows said first section, said one or more circuits are configured to determine said first section as said second section to be subjected to re-encoding.

3. The information processing apparatus according to claim 1, wherein said one or more circuits are configured to:
manage a quantity of bits generated in said encoding; and
control supply of said plurality of encoded streams.

4. The information processing apparatus according to claim 3, wherein said one or more circuits are configured to:
determine whether, in said second section, continuity in said VBV occupancy has been maintained between an end point of said edited encoded stream and a corresponding point in said encoded stream that has not been encoded, and when said one or more circuits determine that said continuity in said VBV occupancy has not been maintained, said one or more circuits are configured to determine said section to be subjected to re-encoding in said encoded streams based on either a first operation mode in which said re-encoding is further performed with a predetermined section that follows said second section set as a third section to be subjected to re-encoding, or a second operation mode in which said encoding is performed again on said second section.

5. The information processing apparatus according to claim 4, wherein when, in said first operation mode, a fourth splicing point different from said first or second splicing point exists in said third section or a predetermined section that follows said third section, said one or more circuits are configured to determine a fourth section to be subjected to re-encoding based on said fourth splicing point, and when, in said first operation mode, said fourth splicing point does not exist in said third section or said predetermined section that follows said third section, said one or more circuits are configured to determine said third section as a fourth section to be subjected to re-encoding.

6. The information processing apparatus according to claim 5, wherein when, in said first operation mode, said fourth splicing point does not exist in said third section or said predetermined section that follows said third section, said one or more circuits are configured to manage said quantity of bits generated in encoding on said fourth section based on said VBV occupancy of a corresponding point in said encoded stream that has not been encoded.

7. The information processing apparatus according to claim 4, wherein in said second operation mode, said one or more circuits are configured to manage said quantity of bits generated in next encoding performed by said one or more circuits on said second section based on said VBV occupancy of said end point of a previous encoding when it has been determined that said continuity in said VBV occupancy has not been maintained.

8. The information processing apparatus according to claim 4, wherein
said one or more circuits are configured to perform said encoding in accordance with a moving picture experts group (MPEG) long group of pictures (GOP) format, and
said third section is a section corresponding to one GOP.

9. The information processing apparatus according to claim 1, wherein said one or more circuits are configured to perform said encoding in accordance with a moving picture experts group (MPEG) long group of pictures (GOP) format, and when said one or more circuits are configured to determine that continuity in said VBV occupancy has been maintained, said one or more circuits are configured to further add, as a fifth section to be subjected to re-encoding, a frame or frames that precede a first forward reference frame in a GOP that immediately follows a second, third, or fourth section that has been subjected to re-encoding.

10. The information processing apparatus according to claim 1, wherein said one or more circuits are configured to:

perform said encoding in accordance with a moving picture coding experts group (MPEG) long group of pictures (GOP) format, and
set a standard section starting with a starting location of a group of pictures (GOP) that includes said splicing point in said first encoded stream and ending with an end location of a GOP that includes said splicing point in said second encoded stream, and determine said first section based on a number of frames included in said standard section.

11. The information processing apparatus according to claim 10, wherein said one or more circuits are configured to set said standard section as said first section when said number of frames, M, included in said standard section satisfies N/2≤M≤N, where N is a number of frames included in one standard GOP.

12. The information processing apparatus according to claim 10, wherein said one or more circuits are configured to set a section composed of said standard section and one additional GOP as said first section when said number of frames, M, included in said standard section satisfies 0≤M≤N/2, where N is a number of frames included in one standard GOP.

13. The information processing apparatus according to claim 10, wherein said one or more circuits are configured to divide said standard section into a plurality of group of pictures (GOPs) and set said standard section as said first section when said number of frames, M, included in said standard section satisfies N−1≤M≤2 N−1, where N is a number of frames included in one standard GOP.

14. The information processing apparatus according to claim 10, wherein said one or more circuits are configured to divide said standard section into two GOPs at said splicing point when said number of frames, M, included in said standard section satisfies N+1≤M≤2N−1, and said number of frames, A, in a part of said standard section that precedes said splicing point satisfies A≥N/2, where N is a number of frames included in one standard GOP.

15. The information processing apparatus according to claim 14, wherein said one or more circuits are configured to encode said edited baseband signal to generate said edited encoded stream such that said latter one of said two GOPs divided at said splicing point starts with an intra-frame coded picture in display order.

16. The information processing apparatus according to claim 14, wherein said one or more circuits are configured to set a section composed of said standard section and one additional GOP as said first section when said number of frames, R, included in said latter one of said two GOPs divided at said splicing point does not satisfy N/2≤R, and set said standard section as said first section when N/2≤R is satisfied.

17. An information processing method, comprising:
in an information processing apparatus that performs a process of splicing a plurality of encoded streams together at a splicing point:
provisionally determining a first section to be subjected to re-encoding in a first encoded stream and a second encoded stream to be spliced together at a first splicing point;
when a second splicing point different from said first splicing point exists in said provisionally determined first section or a predetermined section that follows said first section, determining a second section to be subjected to re-encoding based on said second splicing point;
decoding, utilizing a processor, said plurality of encoded streams including a part of said first and second encoded streams that falls within said second section to generate a plurality of baseband signals, and encoding an edited baseband signal generated by splicing said plurality of baseband signals together at said one or more splicing points to generate an edited encoded stream, wherein, said first encoded stream and said second encoded stream are spliced together at said first splicing point and said second encoded stream and a third encoded stream are spliced together at said second splicing point, extend said second section to a predetermined location in said third encoded stream when said second section comprises a third splicing point, wherein a video buffer verifier (VBV) target value in an encoding of said second section is changed to a VBV occupancy corresponding to said predetermined location in said third encoded stream; and wherein said information processing apparatus is configured to perform said encoding in accordance with a moving picture experts group (MPEG) long group of pictures (GOP) format and said predetermined section is a section corresponding to one GOP.

18. An information processing apparatus that performs a process of splicing a plurality of encoded streams together at a splicing point, said apparatus comprising:

a hardware controller configured to determine a section to be subjected to re-encoding in said plurality of encoded streams;

a hardware or software decoder configured to decode said plurality of encoded streams to generate a plurality of baseband signals; and an hardware or software encoder configured to encode, an edited baseband signal generated by splicing said plurality of baseband signals generated by said decoder together at said splicing point to generate an edited encoded stream, wherein said controller provisionally determines a first section to be subjected to re-encoding in a first encoded stream and a second encoded stream to be spliced together at a first splicing point, and when a second splicing point different from said first splicing point exists in said provisionally determined first section or a predetermined section that follows said first section, determines a second section to be subjected to re-encoding based on said second splicing point, wherein, said first encoded stream and said second encoded stream are spliced together at said first splicing point and said second encoded stream and a third encoded stream are spliced together at said second splicing point;

and a hardware processor configured to extend said second section to a predetermined location in said third encoded stream when said second section comprises a third splicing point, wherein a video buffer verifier (VBV) target value in an encoding of said second section is changed to a VBV occupancy corresponding to said predetermined location in said third encoded stream encode an extension of said first section that is subjected to re encoding and said second section when a value of said VBV occupancy is greater than a target value of said VBV occupancy; and wherein said processor is configured to perform said encoding in accordance with a moving picture experts group (MPEG) long group of pictures (GOP) format and said predetermined section is a section corresponding to one GOP.

* * * * *